US009886887B2

(12) United States Patent
Furihata et al.

(10) Patent No.: US 9,886,887 B2
(45) Date of Patent: Feb. 6, 2018

(54) DEVICE AND METHOD FOR COLOR REDUCTION WITH DITHERING

(71) Applicant: Synaptics Japan GK, Tokyo (JP)

(72) Inventors: Hirobumi Furihata, Tokyo (JP); Takashi Nose, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

(21) Appl. No.: 15/189,615

(22) Filed: Jun. 22, 2016

(65) Prior Publication Data

US 2016/0379543 A1 Dec. 29, 2016

(30) Foreign Application Priority Data

Jun. 26, 2015 (JP) ................................ 2015-128732

(51) Int. Cl.

| | |
|---|---|
| ***G09G 3/20*** | (2006.01) |
| ***G09G 3/36*** | (2006.01) |
| ***G09G 5/02*** | (2006.01) |
| ***G09G 5/06*** | (2006.01) |
| ***H04N 1/60*** | (2006.01) |
| ***H04N 5/202*** | (2006.01) |
| ***H04N 5/57*** | (2006.01) |
| ***H04N 5/445*** | (2011.01) |
| ***H04N 9/73*** | (2006.01) |

(52) U.S. Cl.

CPC ......... *G09G 3/2055* (2013.01); *G09G 3/3648* (2013.01); *G09G 3/3696* (2013.01); *G09G 2330/021* (2013.01); *G09G 2340/0435* (2013.01)

(58) Field of Classification Search

CPC combination set(s) only.
See application file for complete search history.

(56) References Cited

U.S. PATENT DOCUMENTS

| | | | | |
|---|---|---|---|---|
| 5,059,962 | A | 10/1991 | Sekiya et al. | |
| 6,476,781 | B1 * | 11/2002 | Suzuki ................. | G09G 3/2051 345/60 |

(Continued)

FOREIGN PATENT DOCUMENTS

| | | | |
|---|---|---|---|
| JP | H09270923 A | 10/1997 | |
| JP | 3125560 B2 | 1/2001 | |

(Continued)

*Primary Examiner* — Wesner Sajous

(74) *Attorney, Agent, or Firm* — Patterson + Sheridan, LLP

(57) ABSTRACT

Techniques for displaying a quality-improved image with reduced power consumption are provided. In one embodiment, a display panel driver is provided that includes a dithering section configured to receive first m-bit image data and configured to generate second image data by performing dithering on the first image data with n-bit dither values each selected from elements of a dither table, and a driver circuit configured to drive the source lines of a display panel in response to the second image data. In generating the second image data corresponding to first pixels belonging to a first pixel column, the dither values are selected from elements in a first column of the dither table, while the second image data corresponding to second pixels belonging to a second pixel column adjacent to the first pixel column, the dither values are selected from elements in a second column of the dither table.

15 Claims, 29 Drawing Sheets

(56) References Cited

U.S. PATENT DOCUMENTS

| | | | | |
|---|---|---|---|---|
| 6,476,824 | B1 * | 11/2002 | Suzuki | G09G 3/2055 345/690 |
| 2004/0066363 | A1 * | 4/2004 | Yamano | G09G 3/3625 345/98 |
| 2005/0073470 | A1 | 4/2005 | Nose et al. | |
| 2005/0140582 | A1 * | 6/2005 | Lee | G09G 3/2033 345/60 |
| 2005/0248583 | A1 * | 11/2005 | Gotoda | G09G 3/2055 345/596 |
| 2008/0068396 | A1 * | 3/2008 | Ishii | G09G 3/3611 345/601 |
| 2008/0068404 | A1 * | 3/2008 | Ishii | G09G 3/20 345/690 |
| 2008/0079674 | A1 * | 4/2008 | Ooishi | G09G 3/2025 345/87 |

FOREIGN PATENT DOCUMENTS

| | | | |
|---|---|---|---|
| JP | 2010074506 | A | 4/2010 |
| JP | 4646549 | B2 | 3/2011 |
| JP | 5632691 | B2 | 11/2014 |

* cited by examiner

Fig. 7

44

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 159 | 32 | 191 | 64 | 223 | 96 | 255 | 127 | 224 | 95 | 192 | 63 | 160 | 31 | 128 |
| 1 | 216 | 71 | 184 | 39 | 152 | 7 | 135 | 24 | 167 | 56 | 199 | 88 | 231 | 120 | 248 | 103 |
| 2 | 110 | 241 | 113 | 238 | 81 | 206 | 49 | 174 | 17 | 142 | 14 | 145 | 46 | 177 | 78 | 209 |
| 3 | 154 | 5 | 133 | 26 | 165 | 58 | 197 | 90 | 229 | 122 | 250 | 101 | 218 | 69 | 186 | 37 |
| 4 | 83 | 204 | 51 | 172 | 19 | 140 | 12 | 147 | 44 | 179 | 76 | 211 | 108 | 243 | 115 | 236 |
| 5 | 163 | 60 | 195 | 92 | 227 | 124 | 252 | 99 | 220 | 67 | 188 | 35 | 156 | 3 | 131 | 28 |
| 6 | 21 | 138 | 10 | 149 | 42 | 181 | 74 | 213 | 106 | 245 | 117 | 234 | 85 | 202 | 53 | 170 |
| 7 | 225 | 126 | 254 | 97 | 222 | 65 | 190 | 33 | 158 | 1 | 129 | 30 | 161 | 62 | 193 | 94 |
| 8 | 40 | 183 | 72 | 215 | 104 | 247 | 119 | 232 | 87 | 200 | 55 | 168 | 23 | 136 | 8 | 151 |
| 9 | 176 | 47 | 144 | 15 | 143 | 16 | 175 | 48 | 207 | 80 | 239 | 112 | 240 | 111 | 208 | 79 |
| 10 | 70 | 217 | 102 | 249 | 121 | 230 | 89 | 198 | 57 | 166 | 25 | 134 | 6 | 153 | 38 | 185 |
| 11 | 141 | 18 | 173 | 50 | 205 | 82 | 237 | 114 | 242 | 109 | 210 | 77 | 178 | 45 | 146 | 13 |
| 12 | 123 | 228 | 91 | 196 | 59 | 164 | 27 | 132 | 4 | 155 | 36 | 187 | 68 | 219 | 100 | 251 |
| 13 | 203 | 84 | 235 | 116 | 244 | 107 | 212 | 75 | 180 | 43 | 148 | 11 | 139 | 20 | 171 | 52 |
| 14 | 61 | 162 | 29 | 130 | 2 | 157 | 34 | 189 | 66 | 221 | 98 | 253 | 125 | 226 | 93 | 194 |
| 15 | 246 | 105 | 214 | 73 | 182 | 41 | 150 | 9 | 137 | 22 | 169 | 54 | 201 | 86 | 233 | 118 |

DITHER TABLE

44

| | | | | | | | | | | | | | | | |
|---|---|---|---|---|---|---|---|---|---|---|---|---|---|---|---|
| 0 | 159 | 32 | 191 | 64 | 223 | 96 | 255 | 127 | 224 | 95 | 192 | 63 | 160 | 31 | 128 |
| 216 | 71 | 184 | 39 | 152 | 7 | 135 | 24 | 167 | 56 | 199 | 88 | 231 | 120 | 248 | 103 |
| 110 | 241 | 113 | 238 | 81 | 206 | 49 | 174 | 17 | 142 | 14 | 145 | 46 | 177 | 78 | 209 |
| 154 | 5 | 133 | 26 | 165 | 58 | 197 | 90 | 229 | 122 | 250 | 101 | 218 | 69 | 186 | 37 |
| 83 | 204 | 51 | 172 | 19 | 140 | 12 | 147 | 44 | 179 | 76 | 211 | 108 | 243 | 115 | 236 |
| 163 | 60 | 195 | 92 | 227 | 124 | 252 | 99 | 220 | 67 | 188 | 35 | 156 | 3 | 131 | 28 |
| 21 | 138 | 10 | 149 | 42 | 181 | 74 | 213 | 106 | 245 | 117 | 234 | 85 | 202 | 53 | 170 |
| 225 | 126 | 254 | 97 | 222 | 65 | 190 | 33 | 158 | 1 | 129 | 30 | 161 | 62 | 193 | 94 |
| 40 | 183 | 72 | 215 | 104 | 247 | 119 | 232 | 87 | 200 | 55 | 168 | 23 | 136 | 8 | 151 |
| 176 | 47 | 144 | 15 | 143 | 16 | 175 | 48 | 207 | 80 | 239 | 112 | 240 | 111 | 208 | 79 |
| 70 | 217 | 102 | 249 | 121 | 230 | 89 | 198 | 57 | 166 | 25 | 134 | 6 | 153 | 38 | 185 |
| 141 | 18 | 173 | 50 | 205 | 82 | 237 | 114 | 242 | 109 | 210 | 77 | 178 | 45 | 146 | 13 |
| 123 | 228 | 91 | 196 | 59 | 164 | 27 | 132 | 4 | 155 | 36 | 187 | 68 | 219 | 100 | 251 |
| 203 | 84 | 235 | 116 | 244 | 107 | 212 | 75 | 180 | 43 | 148 | 11 | 139 | 20 | 171 | 52 |
| 61 | 162 | 29 | 130 | 2 | 157 | 34 | 189 | 66 | 221 | 98 | 253 | 125 | 226 | 93 | 194 |
| 246 | 105 | 214 | 73 | 182 | 41 | 150 | 9 | 137 | 22 | 169 | 54 | 201 | 86 | 233 | 118 |

Fig. 10A

44A

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 92 | 16 | 119 | 32 | 156 | 50 | 241 | 69 | 157 | 49 | 120 | 31 | 93 | 15 | 70 |
| 1 | 146 | 36 | 113 | 19 | 87 | 4 | 74 | 12 | 98 | 28 | 127 | 45 | 168 | 65 | 204 | 54 |
| 2 | 58 | 186 | 60 | 180 | 41 | 135 | 24 | 104 | 9 | 79 | 7 | 81 | 23 | 106 | 40 | 138 |
| 3 | 88 | 3 | 73 | 13 | 97 | 29 | 125 | 46 | 165 | 66 | 211 | 53 | 149 | 35 | 115 | 18 |
| 4 | 42 | 132 | 25 | 102 | 10 | 78 | 6 | 83 | 22 | 108 | 38 | 140 | 57 | 191 | 61 | 176 |
| 5 | 95 | 30 | 123 | 48 | 161 | 67 | 219 | 52 | 152 | 34 | 116 | 17 | 90 | 2 | 72 | 14 |
| 6 | 10 | 77 | 5 | 84 | 21 | 110 | 37 | 143 | 56 | 196 | 63 | 173 | 44 | 130 | 26 | 101 |
| 7 | 159 | 68 | 231 | 50 | 154 | 33 | 118 | 16 | 91 | 1 | 70 | 15 | 93 | 31 | 121 | 49 |
| 8 | 20 | 112 | 36 | 145 | 55 | 201 | 64 | 169 | 45 | 128 | 27 | 99 | 11 | 75 | 4 | 86 |
| 9 | 106 | 23 | 81 | 8 | 80 | 8 | 105 | 24 | 136 | 41 | 182 | 59 | 184 | 59 | 137 | 40 |
| 10 | 35 | 148 | 53 | 207 | 65 | 166 | 46 | 126 | 28 | 97 | 12 | 74 | 3 | 87 | 19 | 114 |
| 11 | 79 | 9 | 103 | 25 | 134 | 42 | 178 | 61 | 189 | 58 | 139 | 39 | 107 | 22 | 82 | 7 |
| 12 | 66 | 163 | 47 | 124 | 29 | 96 | 13 | 72 | 3 | 89 | 18 | 115 | 34 | 150 | 52 | 215 |
| 13 | 131 | 43 | 175 | 62 | 193 | 56 | 142 | 38 | 109 | 21 | 84 | 6 | 77 | 10 | 101 | 26 |
| 14 | 30 | 94 | 14 | 71 | 2 | 90 | 17 | 117 | 33 | 153 | 51 | 224 | 68 | 160 | 48 | 122 |
| 15 | 198 | 55 | 144 | 37 | 111 | 20 | 85 | 5 | 76 | 11 | 100 | 27 | 129 | 44 | 171 | 63 |

DITHER TABLE FOR GAMMA CORRECTION

44A

| | | | | | | | | | | | | | | | |
|---|---|---|---|---|---|---|---|---|---|---|---|---|---|---|---|
| 1 | 92 | 16 | 119 | 32 | 156 | 50 | 241 | 69 | 157 | 49 | 120 | 31 | 93 | 15 | 70 |
| 146 | 36 | 113 | 19 | 87 | 4 | 74 | 12 | 98 | 28 | 127 | 45 | 168 | 65 | 204 | 54 |
| 58 | 186 | 60 | 180 | 41 | 135 | 24 | 104 | 9 | 79 | 7 | 81 | 23 | 106 | 40 | 138 |
| 88 | 3 | 73 | 13 | 97 | 29 | 125 | 46 | 165 | 66 | 211 | 53 | 149 | 35 | 115 | 18 |
| 42 | 132 | 25 | 102 | 10 | 78 | 6 | 83 | 22 | 108 | 38 | 140 | 57 | 191 | 61 | 176 |
| 95 | 30 | 123 | 48 | 161 | 67 | 219 | 52 | 152 | 34 | 116 | 17 | 90 | 2 | 72 | 14 |
| 10 | 77 | 5 | 84 | 21 | 110 | 37 | 143 | 56 | 196 | 63 | 173 | 44 | 130 | 26 | 101 |
| 159 | 68 | 231 | 50 | 154 | 33 | 118 | 16 | 91 | 1 | 70 | 15 | 93 | 31 | 121 | 49 |
| 20 | 112 | 36 | 145 | 55 | 201 | 64 | 169 | 45 | 128 | 27 | 99 | 11 | 75 | 4 | 86 |
| 106 | 23 | 81 | 6 | 80 | 8 | 105 | 24 | 136 | 41 | 182 | 59 | 184 | 59 | 137 | 40 |
| 35 | 148 | 53 | 207 | 65 | 166 | 46 | 126 | 28 | 97 | 12 | 74 | 3 | 87 | 19 | 114 |
| 79 | 9 | 103 | 25 | 134 | 42 | 178 | 61 | 189 | 58 | 139 | 39 | 107 | 22 | 82 | 7 |
| 66 | 163 | 47 | 124 | 29 | 96 | 13 | 72 | 3 | 89 | 18 | 115 | 34 | 150 | 52 | 215 |
| 131 | 43 | 175 | 62 | 193 | 56 | 142 | 38 | 109 | 21 | 84 | 6 | 77 | 10 | 101 | 26 |
| 30 | 94 | 14 | 71 | 2 | 90 | 17 | 117 | 33 | 153 | 51 | 224 | 68 | 160 | 48 | 122 |
| 198 | 55 | 144 | 37 | 111 | 20 | 85 | 5 | 76 | 11 | 100 | 27 | 129 | 44 | 171 | 63 |

Fig. 16

44C

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 121 | 38 | 140 | 63 | 167 | 84 | 237 | 103 | 168 | 84 | 140 | 63 | 121 | 37 | 103 |
| 1 | 160 | 68 | 135 | 44 | 117 | 11 | 107 | 30 | 125 | 58 | 145 | 79 | 176 | 99 | 206 | 89 |
| 2 | 93 | 191 | 95 | 186 | 75 | 151 | 52 | 129 | 23 | 111 | 19 | 113 | 50 | 131 | 73 | 153 |
| 3 | 118 | 7 | 106 | 32 | 124 | 59 | 144 | 81 | 173 | 100 | 212 | 87 | 161 | 67 | 136 | 43 |
| 4 | 76 | 149 | 54 | 128 | 25 | 110 | 17 | 114 | 48 | 132 | 72 | 155 | 92 | 195 | 96 | 183 |
| 5 | 123 | 61 | 142 | 82 | 171 | 101 | 220 | 86 | 163 | 66 | 138 | 41 | 119 | 4 | 105 | 34 |
| 6 | 27 | 109 | 14 | 115 | 47 | 133 | 70 | 157 | 90 | 199 | 97 | 180 | 77 | 148 | 55 | 127 |
| 7 | 169 | 102 | 229 | 85 | 166 | 64 | 139 | 39 | 120 | 2 | 104 | 37 | 122 | 62 | 141 | 83 |
| 8 | 45 | 135 | 69 | 159 | 89 | 203 | 98 | 177 | 79 | 146 | 57 | 126 | 29 | 108 | 12 | 116 |
| 9 | 130 | 51 | 112 | 21 | 112 | 22 | 130 | 51 | 152 | 74 | 188 | 94 | 189 | 93 | 152 | 74 |
| 10 | 68 | 161 | 88 | 209 | 99 | 175 | 80 | 145 | 58 | 125 | 32 | 107 | 9 | 118 | 44 | 136 |
| 11 | 111 | 24 | 129 | 53 | 150 | 75 | 184 | 95 | 193 | 92 | 154 | 72 | 131 | 49 | 113 | 18 |
| 12 | 100 | 172 | 81 | 143 | 60 | 124 | 34 | 106 | 6 | 119 | 42 | 137 | 66 | 162 | 87 | 216 |
| 13 | 148 | 77 | 181 | 96 | 197 | 91 | 156 | 71 | 133 | 48 | 115 | 16 | 110 | 26 | 128 | 55 |
| 14 | 61 | 123 | 35 | 104 | 3 | 120 | 40 | 138 | 65 | 165 | 86 | 224 | 102 | 170 | 82 | 142 |
| 15 | 201 | 90 | 158 | 70 | 134 | 46 | 116 | 13 | 108 | 29 | 127 | 56 | 147 | 78 | 179 | 98 |

Fig. 20

44

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 159 | 32 | 191 | 64 | 223 | 96 | 255 | 127 | 224 | 95 | 192 | 63 | 160 | 31 | 128 |
| 1 | 71 | 216 | 39 | 184 | 7 | 152 | 24 | 135 | 56 | 167 | 88 | 199 | 120 | 231 | 103 | 248 |
| 2 | 110 | 241 | 113 | 238 | 81 | 206 | 49 | 174 | 17 | 142 | 14 | 145 | 46 | 177 | 78 | 209 |
| 3 | 5 | 154 | 26 | 133 | 58 | 165 | 90 | 197 | 122 | 229 | 101 | 250 | 69 | 218 | 37 | 186 |
| 4 | 83 | 204 | 51 | 172 | 19 | 140 | 12 | 147 | 44 | 179 | 76 | 211 | 108 | 243 | 115 | 236 |
| 5 | 60 | 163 | 92 | 195 | 124 | 227 | 99 | 252 | 67 | 220 | 35 | 188 | 3 | 156 | 28 | 131 |
| 6 | 21 | 138 | 10 | 149 | 42 | 181 | 74 | 213 | 106 | 245 | 117 | 234 | 85 | 202 | 53 | 170 |
| 7 | 126 | 225 | 97 | 254 | 65 | 222 | 33 | 190 | 1 | 158 | 30 | 129 | 62 | 161 | 94 | 193 |
| 8 | 40 | 183 | 72 | 215 | 104 | 247 | 119 | 232 | 87 | 200 | 55 | 168 | 23 | 136 | 8 | 151 |
| 9 | 47 | 176 | 15 | 144 | 16 | 143 | 48 | 175 | 80 | 207 | 112 | 239 | 111 | 240 | 79 | 208 |
| 10 | 70 | 217 | 102 | 249 | 121 | 230 | 89 | 198 | 57 | 166 | 25 | 134 | 6 | 153 | 38 | 185 |
| 11 | 18 | 141 | 50 | 173 | 82 | 205 | 114 | 237 | 109 | 242 | 77 | 210 | 45 | 178 | 13 | 146 |
| 12 | 123 | 228 | 91 | 196 | 59 | 164 | 27 | 132 | 4 | 155 | 36 | 187 | 68 | 219 | 100 | 251 |
| 13 | 84 | 203 | 116 | 235 | 107 | 244 | 75 | 212 | 43 | 180 | 11 | 148 | 20 | 139 | 52 | 171 |
| 14 | 61 | 162 | 29 | 130 | 2 | 157 | 34 | 189 | 66 | 221 | 98 | 253 | 125 | 226 | 93 | 194 |
| 15 | 105 | 246 | 73 | 214 | 41 | 182 | 9 | 150 | 22 | 137 | 54 | 169 | 86 | 201 | 118 | 233 |

Fig. 21

44A

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 92 | 16 | 119 | 32 | 156 | 50 | 241 | 69 | 157 | 49 | 120 | 31 | 93 | 15 | 70 |
| 1 | 36 | 146 | 19 | 113 | 4 | 87 | 12 | 74 | 28 | 98 | 45 | 127 | 65 | 168 | 54 | 204 |
| 2 | 58 | 186 | 60 | 180 | 41 | 135 | 24 | 104 | 9 | 79 | 7 | 81 | 23 | 106 | 40 | 138 |
| 3 | 3 | 88 | 13 | 73 | 29 | 97 | 46 | 125 | 66 | 165 | 53 | 211 | 35 | 149 | 18 | 115 |
| 4 | 42 | 132 | 25 | 102 | 10 | 78 | 6 | 83 | 22 | 108 | 38 | 140 | 57 | 191 | 61 | 176 |
| 5 | 30 | 95 | 48 | 123 | 67 | 161 | 52 | 219 | 34 | 152 | 17 | 116 | 2 | 90 | 14 | 72 |
| 6 | 10 | 77 | 5 | 84 | 21 | 110 | 37 | 143 | 56 | 196 | 63 | 173 | 44 | 130 | 26 | 101 |
| 7 | 68 | 159 | 50 | 231 | 33 | 154 | 16 | 118 | 1 | 91 | 15 | 70 | 31 | 93 | 49 | 121 |
| 8 | 20 | 112 | 36 | 145 | 55 | 201 | 64 | 169 | 45 | 128 | 27 | 99 | 11 | 75 | 4 | 86 |
| 9 | 23 | 106 | 8 | 81 | 8 | 80 | 24 | 105 | 41 | 136 | 59 | 182 | 59 | 184 | 40 | 137 |
| 10 | 35 | 148 | 53 | 207 | 65 | 166 | 46 | 126 | 28 | 97 | 12 | 74 | 3 | 87 | 19 | 114 |
| 11 | 9 | 79 | 25 | 103 | 42 | 134 | 61 | 178 | 58 | 189 | 39 | 139 | 22 | 107 | 7 | 82 |
| 12 | 66 | 163 | 47 | 124 | 29 | 96 | 13 | 72 | 3 | 89 | 18 | 115 | 34 | 150 | 52 | 215 |
| 13 | 43 | 131 | 62 | 175 | 56 | 193 | 38 | 142 | 21 | 109 | 6 | 84 | 10 | 77 | 26 | 101 |
| 14 | 30 | 94 | 14 | 71 | 2 | 90 | 17 | 117 | 33 | 153 | 51 | 224 | 68 | 160 | 48 | 122 |
| 15 | 55 | 198 | 37 | 144 | 20 | 111 | 5 | 85 | 11 | 76 | 27 | 100 | 44 | 129 | 63 | 171 |

Fig. 22

44C

X[3:0] (columns), Y[3:0] (rows)

| Y \ X | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 121 | 38 | 140 | 63 | 167 | 84 | 237 | 103 | 168 | 84 | 140 | 63 | 121 | 37 | 103 |
| 1 | 68 | 160 | 44 | 135 | 11 | 117 | 30 | 107 | 58 | 125 | 79 | 145 | 99 | 176 | 89 | 206 |
| 2 | 93 | 191 | 95 | 186 | 75 | 151 | 52 | 129 | 23 | 111 | 19 | 113 | 50 | 131 | 73 | 153 |
| 3 | 7 | 118 | 32 | 106 | 59 | 124 | 81 | 144 | 100 | 173 | 87 | 212 | 67 | 161 | 43 | 136 |
| 4 | 76 | 149 | 54 | 128 | 25 | 110 | 17 | 114 | 48 | 132 | 72 | 155 | 92 | 195 | 96 | 183 |
| 5 | 61 | 123 | 82 | 142 | 101 | 171 | 86 | 220 | 66 | 163 | 41 | 138 | 4 | 119 | 34 | 105 |
| 6 | 27 | 109 | 14 | 115 | 47 | 133 | 70 | 157 | 90 | 199 | 97 | 180 | 77 | 148 | 55 | 127 |
| 7 | 102 | 169 | 85 | 229 | 64 | 166 | 39 | 139 | 2 | 120 | 37 | 104 | 62 | 122 | 83 | 141 |
| 8 | 45 | 135 | 69 | 159 | 89 | 203 | 98 | 177 | 79 | 146 | 57 | 126 | 29 | 108 | 12 | 116 |
| 9 | 51 | 130 | 21 | 112 | 22 | 112 | 51 | 130 | 74 | 152 | 94 | 188 | 93 | 189 | 74 | 152 |
| 10 | 68 | 161 | 88 | 209 | 99 | 175 | 80 | 145 | 58 | 125 | 32 | 107 | 9 | 118 | 44 | 136 |
| 11 | 24 | 111 | 53 | 129 | 75 | 150 | 95 | 184 | 92 | 193 | 72 | 154 | 49 | 131 | 18 | 113 |
| 12 | 100 | 172 | 81 | 143 | 60 | 124 | 34 | 106 | 6 | 119 | 42 | 137 | 66 | 162 | 87 | 216 |
| 13 | 77 | 148 | 96 | 181 | 91 | 197 | 71 | 156 | 48 | 133 | 16 | 115 | 26 | 110 | 55 | 128 |
| 14 | 61 | 123 | 35 | 104 | 3 | 120 | 40 | 138 | 65 | 165 | 86 | 224 | 102 | 170 | 82 | 142 |
| 15 | 90 | 201 | 70 | 158 | 46 | 134 | 13 | 116 | 29 | 108 | 56 | 127 | 78 | 147 | 98 | 179 |

Fig. 25

44

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 32 | 159 | 191 | 64 | 96 | 223 | 255 | 127 | 95 | 224 | 192 | 63 | 31 | 160 | 128 |
| 1 | 71 | 39 | 216 | 184 | 7 | 24 | 152 | 135 | 56 | 88 | 167 | 199 | 120 | 103 | 231 | 248 |
| 2 | 110 | 113 | 241 | 238 | 81 | 49 | 206 | 174 | 17 | 14 | 142 | 145 | 46 | 78 | 177 | 209 |
| 3 | 5 | 26 | 154 | 133 | 58 | 90 | 165 | 197 | 122 | 101 | 229 | 250 | 69 | 37 | 218 | 186 |
| 4 | 83 | 51 | 204 | 172 | 19 | 12 | 140 | 147 | 44 | 76 | 179 | 211 | 108 | 115 | 243 | 236 |
| 5 | 60 | 92 | 163 | 195 | 124 | 99 | 227 | 252 | 67 | 35 | 220 | 188 | 3 | 28 | 156 | 131 |
| 6 | 21 | 10 | 138 | 149 | 42 | 74 | 181 | 213 | 106 | 117 | 245 | 234 | 85 | 53 | 202 | 170 |
| 7 | 126 | 97 | 225 | 254 | 65 | 33 | 222 | 190 | 1 | 30 | 158 | 129 | 62 | 94 | 161 | 193 |
| 8 | 40 | 72 | 183 | 215 | 104 | 119 | 247 | 232 | 87 | 55 | 200 | 168 | 23 | 8 | 136 | 151 |
| 9 | 47 | 15 | 176 | 144 | 16 | 48 | 143 | 175 | 80 | 112 | 207 | 239 | 111 | 79 | 240 | 208 |
| 10 | 70 | 102 | 217 | 249 | 121 | 89 | 230 | 198 | 57 | 25 | 166 | 134 | 6 | 38 | 153 | 185 |
| 11 | 18 | 50 | 141 | 173 | 82 | 114 | 205 | 237 | 109 | 77 | 242 | 210 | 45 | 13 | 178 | 146 |
| 12 | 123 | 91 | 228 | 196 | 59 | 27 | 164 | 132 | 4 | 36 | 155 | 187 | 68 | 100 | 219 | 251 |
| 13 | 84 | 116 | 203 | 235 | 107 | 75 | 244 | 212 | 43 | 11 | 180 | 148 | 20 | 52 | 139 | 171 |
| 14 | 61 | 29 | 162 | 130 | 2 | 34 | 157 | 189 | 66 | 98 | 221 | 253 | 125 | 93 | 226 | 194 |
| 15 | 105 | 73 | 246 | 214 | 41 | 9 | 182 | 150 | 22 | 54 | 137 | 169 | 86 | 118 | 201 | 233 |

Fig. 26

44A

X[3:0] (columns), Y[3:0] (rows)

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 16 | 92 | 119 | 32 | 50 | 156 | 241 | 69 | 49 | 157 | 120 | 31 | 15 | 93 | 70 |
| 1 | 36 | 19 | 146 | 113 | 4 | 12 | 87 | 74 | 28 | 45 | 98 | 127 | 65 | 54 | 168 | 204 |
| 2 | 58 | 60 | 186 | 180 | 41 | 24 | 135 | 104 | 9 | 7 | 79 | 81 | 23 | 40 | 106 | 138 |
| 3 | 3 | 13 | 88 | 73 | 29 | 46 | 97 | 125 | 66 | 53 | 165 | 211 | 35 | 18 | 149 | 115 |
| 4 | 42 | 25 | 132 | 102 | 10 | 6 | 78 | 83 | 22 | 38 | 108 | 140 | 57 | 61 | 191 | 176 |
| 5 | 30 | 48 | 95 | 123 | 67 | 52 | 161 | 219 | 34 | 17 | 152 | 116 | 2 | 14 | 90 | 72 |
| 6 | 10 | 5 | 77 | 84 | 21 | 37 | 110 | 143 | 56 | 63 | 196 | 173 | 44 | 26 | 130 | 101 |
| 7 | 68 | 50 | 159 | 231 | 33 | 16 | 154 | 118 | 1 | 15 | 91 | 70 | 31 | 49 | 93 | 121 |
| 8 | 20 | 36 | 112 | 145 | 55 | 64 | 201 | 169 | 45 | 27 | 128 | 99 | 11 | 4 | 75 | 86 |
| 9 | 23 | 8 | 106 | 81 | 8 | 24 | 80 | 105 | 41 | 59 | 136 | 182 | 59 | 40 | 184 | 137 |
| 10 | 35 | 53 | 148 | 207 | 65 | 46 | 166 | 126 | 28 | 12 | 97 | 74 | 3 | 19 | 87 | 114 |
| 11 | 9 | 25 | 79 | 103 | 42 | 61 | 134 | 178 | 58 | 39 | 189 | 139 | 22 | 7 | 107 | 82 |
| 12 | 66 | 47 | 163 | 124 | 29 | 13 | 96 | 72 | 3 | 18 | 89 | 115 | 34 | 52 | 150 | 215 |
| 13 | 43 | 62 | 131 | 175 | 56 | 38 | 193 | 142 | 21 | 6 | 109 | 84 | 10 | 26 | 77 | 101 |
| 14 | 30 | 14 | 94 | 71 | 2 | 17 | 90 | 117 | 33 | 51 | 153 | 224 | 68 | 48 | 160 | 122 |
| 15 | 55 | 37 | 198 | 144 | 20 | 5 | 111 | 85 | 11 | 27 | 76 | 100 | 44 | 63 | 129 | 171 |

Fig. 27

44C

| Y[3:0] \ X[3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 38 | 121 | 140 | 63 | 84 | 167 | 237 | 103 | 84 | 168 | 140 | 63 | 37 | 121 | 103 |
| 1 | 68 | 44 | 160 | 135 | 11 | 30 | 117 | 107 | 58 | 79 | 125 | 145 | 99 | 89 | 176 | 206 |
| 2 | 93 | 95 | 191 | 186 | 75 | 52 | 151 | 129 | 23 | 19 | 111 | 113 | 50 | 73 | 131 | 153 |
| 3 | 7 | 32 | 118 | 106 | 59 | 81 | 124 | 144 | 100 | 87 | 173 | 212 | 67 | 43 | 161 | 136 |
| 4 | 76 | 54 | 149 | 128 | 25 | 17 | 110 | 114 | 48 | 72 | 132 | 155 | 92 | 96 | 195 | 183 |
| 5 | 61 | 82 | 123 | 142 | 101 | 86 | 171 | 220 | 66 | 41 | 163 | 138 | 4 | 34 | 119 | 105 |
| 6 | 27 | 14 | 109 | 115 | 47 | 70 | 133 | 157 | 90 | 97 | 199 | 180 | 77 | 55 | 148 | 127 |
| 7 | 102 | 85 | 169 | 229 | 64 | 39 | 166 | 139 | 2 | 37 | 120 | 104 | 62 | 83 | 122 | 141 |
| 8 | 45 | 69 | 135 | 159 | 89 | 98 | 203 | 177 | 79 | 57 | 146 | 126 | 29 | 12 | 108 | 116 |
| 9 | 51 | 21 | 130 | 112 | 22 | 51 | 112 | 130 | 74 | 94 | 152 | 188 | 93 | 74 | 189 | 152 |
| 10 | 68 | 88 | 161 | 209 | 99 | 80 | 175 | 145 | 58 | 32 | 125 | 107 | 9 | 44 | 118 | 136 |
| 11 | 24 | 53 | 111 | 129 | 75 | 95 | 150 | 184 | 92 | 72 | 193 | 154 | 49 | 18 | 131 | 113 |
| 12 | 100 | 81 | 172 | 143 | 60 | 34 | 124 | 106 | 6 | 42 | 119 | 137 | 66 | 87 | 162 | 216 |
| 13 | 77 | 96 | 148 | 181 | 91 | 71 | 197 | 156 | 48 | 16 | 133 | 115 | 26 | 55 | 110 | 128 |
| 14 | 61 | 35 | 123 | 104 | 3 | 40 | 120 | 138 | 65 | 86 | 165 | 224 | 102 | 82 | 170 | 142 |
| 15 | 90 | 70 | 201 | 158 | 46 | 13 | 134 | 116 | 29 | 56 | 108 | 127 | 78 | 98 | 147 | 179 |

DEVICE AND METHOD FOR COLOR REDUCTION WITH DITHERING

CROSS REFERENCE

This application claims priority of Japanese Patent Application No. 2015-128732, filed on Jun. 26, 2015, the disclosure which is incorporated herein by reference.

TECHNICAL FIELD

The present invention relates to a display panel driver, display device and display panel driving method, more particularly, to a display panel driver and display device adapted to color reduction and a display panel driving method suitably performed in the same.

BACKGROUND ART

A system including a display device is often required to reduce power consumption. Power consumption reduction is one of the most important issues especially in portable terminals, such as smart phones, tablets and PDAs (personal digital assistants), and therefore a display device incorporated in a portable terminal (e.g. a liquid crystal display device) is strongly desired to reduce power consumption.

To achieve power consumption reduction, a system including a display device, e.g. a portable terminal, may be placed in a low power consumption operation state (e.g. a standby state) in accordance with the necessity. In this case, the display device may stop operating, or perform an operation to show a simple display screen (e.g. a display screen only showing the present time).

The inventors are, however, considering that the usability of a system, e.g. a portable terminal, is enhanced if the system is capable of displaying an image with an improved image quality to some extent in a low power consumption state. For example, the usability of a portable terminal would be largely improved if the portable terminal is capable of display a wallpaper with an improved image quality to some extent when the portable terminal is placed in the standby state.

Accordingly, there is a need for a technique for displaying an image with an improved image quality with reduced power consumption.

The following is a list of prior arts which may be related to the present invention. Japanese Patent Application Publication No. 2010-74506 A discloses image processing in which image data of a block composed of 8×8 pixels are color-reduced (or compressed) to three or four-color images.

Japanese Patent Application Publication No. H09-270923 A discloses a binarization process in which a threshold value is determined by using values of a dither matrix and input data of a pixel of interest are compared with the threshold value.

Japanese Examined Patent Application Publication No. H06-50522 B2 discloses a technique in which one of four tables are selected by using lower two bits of a first graylevel signal as an address, and a second graylevel signal is generated by adding an amendment value contained in the selected table to the upper four bits.

Japanese Patent Gazette No. 3,125,560 B2 discloses a technique for obtaining a pseudo graylevel output, the technique involving separating an x-bit input signal into upper n bits (where n is the bit width of a display device) and lower m bits (m=x−n), transforming the lower m bits into an one-bit output through pseudo graylevel processing, and sequentially adding the one-bit output to the upper n bits.

Japanese Patent Gazette No. 4,601,279 B2 discloses a technique for achieving an image display with an improved image quality by using a frame rate control as well as a dithering process.

Japanese Patent Gazette No. 4,646,549 B2 discloses a technique of displaying an image corresponding to display data, wherein selected one of first and second operations is performed, the first operation including storing upper and lower bits of first image data as the display data in a display memory, and the second operation including storing upper bits of first and second image data as the display data in the display memory.

Japanese Patent Gazette No. 5,632,691 B2 discloses a technique in which the graylevel of each color is modified by uniformly performing a bit shift on RGB data to thereby adjust the brightness.

SUMMARY OF INVENTION

Accordingly, one objective of the present invention is to provide a technique for displaying a quality-improved image with reduced power consumption. A person skilled in the art would understand other objectives and new features of the present invention from the disclosure given below.

In one embodiment, a display panel driver is provided which drives a display panel which includes a plurality of source lines and a plurality of pixel columns each comprising a plurality of pixels arrayed in a first direction in which the source lines are extended, the pixels including subpixels respectively connected to associated one of the source lines. The display panel driver includes: a dithering section receiving first m-bit image data and generating second image data by performing dithering on the first image data with n-bit dither values, wherein m is an integer of three or more and n is an integer from 2 to m; and a driver circuit driving the plurality of source lines of the display panel in response to the second image data. The dither values are each selected from elements of a dither table, each of the elements is an n-bit value. In calculating the second image data corresponding to first pixels belonging to a first pixel column of the plurality of pixel columns, the dither values are selected from elements in a first column of the dither table in response to addresses of the first pixels. In calculating the second image data corresponding to second pixels belonging to a second pixel column adjacent to the first pixel column in a second direction perpendicular to the first direction, the dither values are selected from elements in a second column of the dither table in response to addresses of the second pixels. All the elements of the first column of the dither table belong to a half of the elements of the dither table having smaller values, and all the elements of the second column of the dither table belong to the other half of the elements of the dither table having larger values.

In another embodiment, a display panel driver is provided which drives a display panel including a plurality of pixels. The display panel driver includes: a dithering section receiving first m-bit image data and generating second image data by performing dithering on the first image data with n-bit dither values, wherein m is an integer of three or more and n is an integer from 2 to m; and a driver circuit driving the plurality of source lines of the display panel in response to the second image data. The dither values are each selected from elements of a dither table, each of the elements is an n-bit value. In calculating the second image data for the respective pixels of the display panel, the dither values are each selected from the elements of the dither table in response to addresses of the pixels. The frequency distribution of values of the elements of the dither table is uneven.

In still another embodiment, a display panel driver is provided which drives a display panel including a plurality of pixels each comprising a given number of subpixels. The display panel driver includes: a brightness calculation circuit generating m-bit corrected image data by performing a gamma correction on input image data, m being an integer three or more; a dithering section receiving the corrected image data and generating binary image data representing each of graylevels of the subpixels of the plurality of pixels as a first value or a second value, by performing dithering on the corrected image data with n-bit dither values, n being an integer from 2 to m; and a driver circuit driving the display panel in response to the binary image data.

The above-described display panel driver may be incorporated in a display device including a display panel.

The present invention allows displaying a quality-improved image with reduced power consumption.

BRIEF DESCRIPTION OF THE DRAWINGS

The above and other advantages and features of the present invention will be more apparent from the following description taken in conjunction with the accompanied drawings, in which:

FIG. 7 is a diagram illustrating one example of the contents of a dither table in the first embodiment;

FIG. 10A is a diagram illustrating one example of the values of respective elements of a dither table in the case when a gamma correction is performed with a gamma value $\gamma$ of 2.2;

FIG. 16 is a diagram illustrating one example of the values of respective elements of a dither table in the case when a contrast correction is performed;

FIG. 20 is a diagram illustrating contents of a dither table for reducing the power consumption in the case when the eight-color halftoning circuit section illustrated in FIG. 6 is used;

FIG. 21 is a diagram illustrating contents of a dither table for reducing the power consumption in the case when the eight-color halftoning circuit section illustrated in FIG. 9 is used;

FIG. 22 is a diagram illustrating contents of a dither table for reducing the power consumption in the case when the eight-color halftoning circuit section illustrated in FIG. 14 is used;

FIG. 25 is a diagram illustrating contents of a dither table when the eight-color halftoning circuit section illustrated in FIG. 6 is used;

FIG. 26 is a diagram illustrating contents of a dither table when the eight-color halftoning circuit section illustrated in FIG. 9 is used; and FIG. 27 is a diagram illustrating contents of a dither table when the eight-color halftoning circuit section illustrated in FIG. 14 is used.

DESCRIPTION OF EMBODIMENTS

Figure 1:
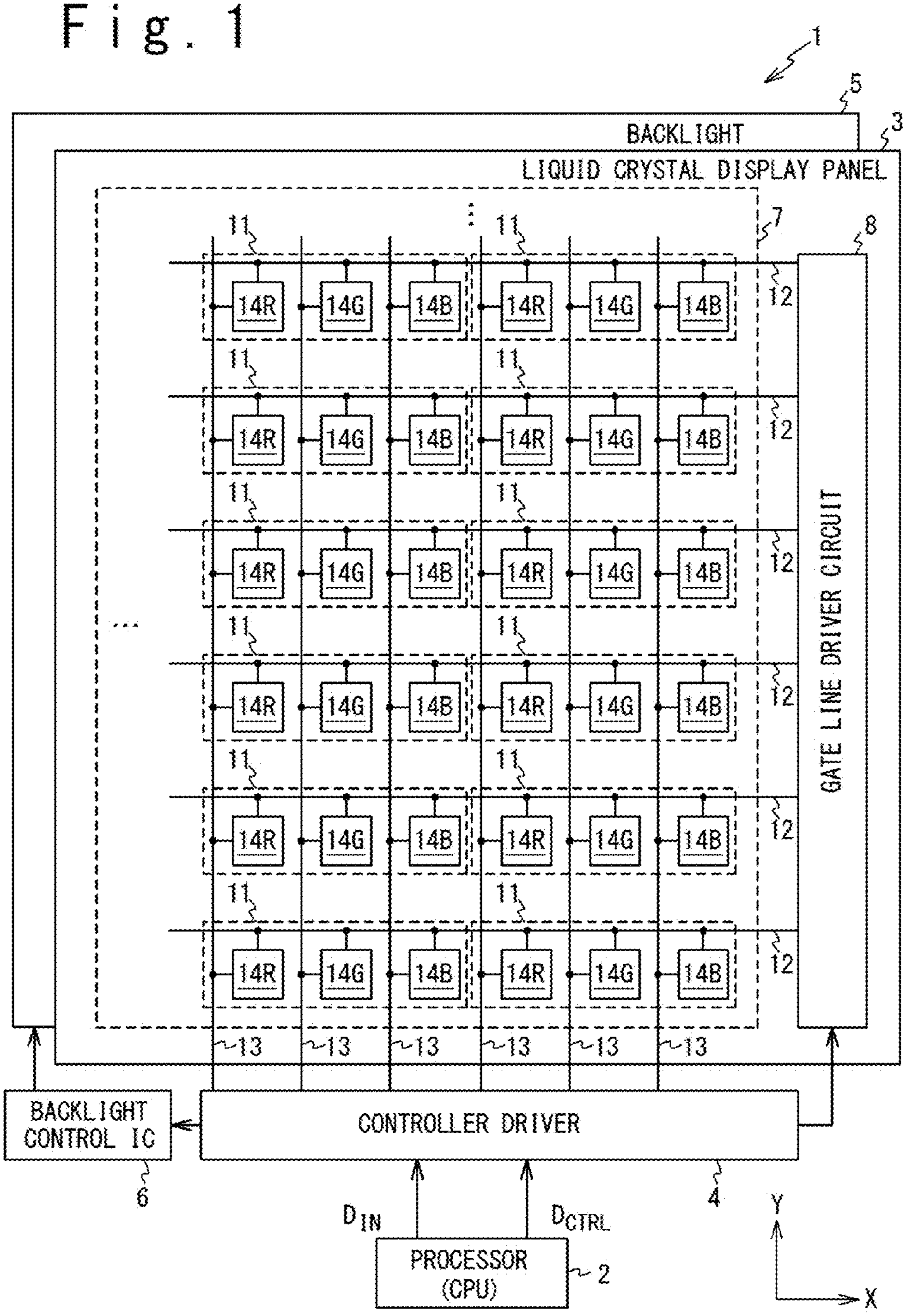
FIG. 1 is a block diagram illustrating an exemplary configuration of a display device in a first embodiment.

The invention will be now described herein with reference to illustrative embodiments. Those skilled in the art would recognize that many alternative embodiments can be accomplished using the teachings of the present invention and that the invention is not limited to the embodiments illustrated for explanatory purposed. It will be appreciated that for simplicity and clarity of illustration, elements in the Figures have not necessary drawn to scale. For example, the dimensions of some of the elements are exaggerated relative to other elements.

Various embodiments of the present invention will be described in the following. It should be noted that the same or similar elements may be denoted by the same or corresponding reference numerals in the disclosure given below.

First Embodiment

FIG. 1 is a block diagram illustrating an exemplary configuration of a display device 1 in a first embodiment. The display device 1 of the present embodiment is configured as a liquid crystal display device that illustrates images in response to image data $D_{IN}$ and control data $D_{CTRL}$ received from a processor 2. The display device 1 includes a liquid crystal display panel 3, a controller driver 4, a backlight 5 and a backlight control IC (integrated circuit) 6.

The liquid crystal display panel 3 includes a display region 7 in which images are displayed, and a gate line driver circuit 8. Arranged in the display region 7 are a plurality of pixels 11, a plurality of gate lines 12 and a plurality of source lines 13. The gate line driver circuit 8 drives the gate lines 12 under a control by the controller driver 4. In the present embodiment, the gate line driver circuit 8 is formed on a glass substrate of the liquid crystal display panel 3 with a GIP (gate in panel) technique.

In the following description, an XY coordinate system is defined in the display region 7 of the liquid crystal display panel 3. The X-axis direction of the XY coordinate system is defined in the direction in which the gate lines 12 are extended and the Y-axis direction is defined in the direction in which the source lines 13 are extended. In the following, the position of each pixel 11 may be represented by addresses X and Y, where the address X specifies the X coordinate of the XY coordinate system and the address Y defines the Y coordinate.

The pixels 11 are arrayed in rows and columns in the display region 7. In the following, an array of pixels 11 arrayed in one column in the Y axis direction may be referred to as a pixel column. Although two pixel columns (more strictly, some of pixels 11 of the two pixel columns) are illustrated in FIG. 1, a person skilled in the art would appreciate that many pixel columns are provided in the display region 7 in an actual implementation.

Each pixel 11 includes an R subpixel 14R, a G subpixel 14G and a B subpixel 14B, which display the red (R), green (G) and blue (B) colors, respectively. In the present embodiment, the R subpixels 14R of pixels 11 arrayed in the same pixel column are connected to the same source line 13. Similarly, the G subpixels 14G of pixels 11 arrayed in the same pixel column are connected to the same source line 13 and the B subpixels 14B of pixels 11 arrayed in the same pixel column are connected to the same source line 13. It should be noted that the R, G and B subpixels 14R, 14G and 14B may be collectively referred to as the subpixels 14 if the corresponding colors thereof are not distinguished.

In the present embodiment, the image data $D_{IN}$ received from the processor 2 are generated as data indicating the graylevel of each subpixel 14 with eight bits. This means that the number of allowed graylevels of the R, G and B subpixels 14R, 14G and 14B are 256 in the present embodiment, and the image data $D_{IN}$ represents the color of each pixel 11 with 24 bits. It should be noted however that the number of bits used to indicate the graylevel of each subpixel 14 of each pixel 11 is not limited to eight.

In the following, a part of image data $D_{IN}$ indicating the graylevel of an R subpixel 14R may be referred to as R data $D_{IN}^R$. Similarly, a part of the image data $D_{IN}$ indicating the graylevel of a G subpixel 14G may be referred to as the G data $D_{IN}^G$ and a part of the image data $D_{IN}$ indicating the graylevel of a B subpixel 14B may be referred to as the B data $D_{IN}^B$.

The controller driver 4 operates as a display panel driver that drives the liquid crystal display panel 3 and also as a controller that performs various controls in the display device 1. First, the controller driver 4 drives the source lines 13 of the liquid crystal display panel 3 in response to the image data $D_{IN}$ and the control data $D_{CTRL}$ received from the processor 2. Furthermore, the controller driver 4 controls the backlight control IC 6 and the gate line driver circuit 8 in response to the control data $D_{CTRL}$.

The backlight 5 is driven by the backlight control IC 6 to illuminate the liquid crystal display panel 3. The backlight control IC 6 drives the backlight 5 under a control of the controller driver 4. When driving the backlight 5, the backlight control IC 6 controls the brightness of the backlight 5 in response to a control signal received from the controller driver 4.

Figure 2:
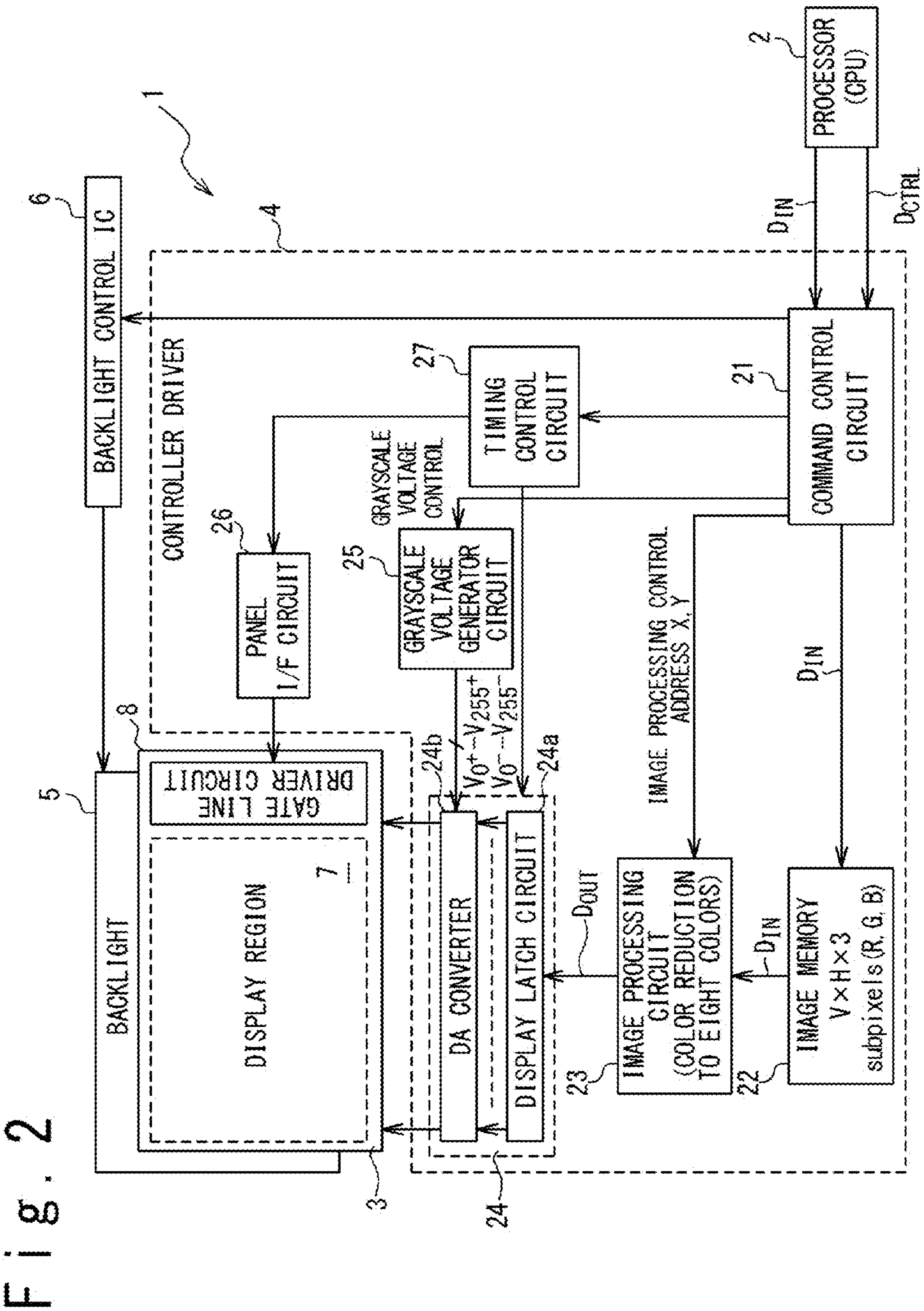
FIG. 2 is a block diagram illustrating an exemplary configuration of a controller driver in the present embodiment.

FIG. 2 is a block diagram illustrating an exemplary configuration of the controller driver 4 in the present embodiment. The controller driver 4 includes a command control circuit 21, an image memory 22, an image processing circuit 23, a source line driver circuit 24, a grayscale voltage generator circuit 25, a panel interface circuit 26 and a timing control circuit 27.

The command control circuit 21 forwards the image data $D_{IN}$ received from the processor 2 to the image memory 22. Additionally, the command control circuit 21 controls various circuits of the controller driver 4 in response to the control data $D_{CTRL}$ received from the processor 2. Examples of the controls performed by the command control circuit 21 are as follows: First, the command control circuit 21 generates an image processing control signal indicating the image processing to be performed by the image processing circuit 23. Second, the command control circuit 21 controls grayscale voltages generated by the grayscale voltage generator circuit 25. Third, the command control circuit 21 feeds commands and control parameters included in the control data $D_{CTRL}$ to the timing control circuit 27 to thereby control the timing control circuit 27. Furthermore, the command control circuit 21 controls the backlight control IC 6.

The image memory 22 temporarily stores therein the image data $D_{IN}$ received from the processor 2 through the command control circuit 21. In the present embodiment, the image memory 22 has a capacity enough to store image data $D_{IN}$ corresponding to one frame image. When V×H pixels 11 are provided in the display region 7 of the liquid crystal display panel 3 and each pixel 11 includes three subpixels 14, for example, image data $D_{IN}$ indicating the graylevels of V×H×3 subpixels 14 are stored in the image memory 22.

The image processing circuit 23 is responsive to the image processing control signal received from the command control circuit 21 for performing desired image processing on the image data $D_{IN}$ received from the image memory 22. To achieve image processing depending on the position of a target pixel (the pixel 11 of interest of the image processing of the image data $D_{IN}$), the image processing circuit 23 receives address data indicating the addresses X and Y of the target pixel. The image data output from the image processing circuit 23 may be referred to as processed image data $D_{OUT}$, hereinafter. Also, parts of the processed image data $D_{OUT}$ indicating the graylevels of the R, G and B subpixels 14R, 14G and 14B may be referred to as processed R data $D_{OUT}^{R}$, processed G data $D_{OUT}^{G}$ and processed B data $D_{OUT}^{B}$, respectively, hereinafter. The processed image data $D_{OUT}$ are transferred to the source line driver circuit 24.

In the present embodiment, the image processing circuit 23 is configured to perform "eight-color halftoning" on the image data $D_{IN}$. The "eight-color halftoning" referred to herein is image processing for transforming original image data (in the present embodiment, the image data $D_{IN}$ read out from the image memory 22) into image data in which the number of allowed colors of each pixel 11 is eight, that is, the number of allowed graylevels of each of the R, G and B subpixels 14R, 14B and 14B is two. When the "eight-color halftoning" is performed, the processed image data $D_{OUT}$ are generated as three-bit data indicating "turn-on" and "turn-off" of the R, G and B subpixel 14R, 14G and 14B; the "turn-on" referred to herein means a state in which the subpixel 14 of interest is driven with a drive voltage corresponding to the highest graylevel, and the "turn-off" referred to herein means a state in which the subpixel 14 of interest is driven with a drive voltage corresponding to the lowest graylevel. In other words, when the eight-color halftoning is performed, the processed image data $D_{OUT}$ are generated as binary image data indicating each of the graylevels of the R, G and B subpixels 14R, 14G and 14B with selected one of the highest graylevel (first value) and the lowest graylevel (second value). As described later in detail, the display device 1 of the present embodiment is configured to perform specially-designed eight-color halftoning in the image processing circuit 23, thereby reducing the power consumption of the display device 1 with a sufficient image quality.

Hereinafter, the operation mode in which the image processing circuit 23 performs the eight-color halftoning may be referred to as the eight-color halftoning mode. When the controller driver 4 is placed into the eight-color halftoning mode, the image processing circuit 23 performs the eight-color halftoning. It should be noted that the image processing circuit 23 may be configured to perform different image processing in addition to the eight-color halftoning. In this case, the image processing circuit 23 performs image processing specified by the image processing control signal received from the command control circuit 21 in accordance with the necessity.

The source line driver circuit 24 drives the source lines 13 of the liquid crystal display panel 3 in response to the processed image data $D_{OUT}$ received from the image processing circuit 23. In detail, the source line driver circuit 24 includes a display latch section 24*a* and a DA converter 24*b*. The display latch section 24*a* sequentially latches the processed image data $D_{OUT}$ output from the image processing circuit 23 and temporarily stores therein the latched image data. The display latch section 24*a* has a capacity enough to store processed image data $D_{OUT}$ corresponding to pixels 11 of one horizontal line (that is, pixels 11 connected to one gate line 12). The display latch section 24*a* forwards the processed image data $D_{OUT}$ latched from the image processing circuit 23 to the DA converter 24*b*.

The DA converter 24*b* performs a digital-analog conversion on the processed image data $D_{OUT}$ received from the display latch section 24*a* to generate drive voltages corresponding to the graylevels of the respective subpixels 14 specified in the processed image data $D_{OUT}$. The DA converter 24*b* output the generated drive voltages to the corresponding source lines 13 to thereby drive the source lines 13.

In generating the drive voltages, grayscale voltages supplied from the grayscale voltage generator circuit 25 are used. In the present embodiment, grayscale voltages $V_0^+$-$V_{255}^+$ and $V_0^-$-$V_{255}^-$ are supplied from the grayscale voltage generator circuit 25; the grayscale voltages $V_0^+$-$V_{255}^+$ are a set of voltages from which a "positive" drive voltage is selected and the grayscale voltages $V_0^+$-$V_{255}^+$ are a set of voltages from which a "negative" drive voltage is selected. In the present Specification, the polarity of a drive voltage is defined in comparison with the voltage on the common electrode of the liquid crystal display panel 3, which is referred to as the common level $V_{COM}$. A "positive" drive voltage has a voltage level higher than the common level $V_{COM}$ and a "negative" drive voltage has a voltage level lower than the common level $V_{COM}$. When subpixels 14 of pixels 11 in a certain horizontal line are driven, grayscale voltages corresponding to the polarities of the drive voltages and the graylevels of the respective subpixels 14 specified by the processed image data $D_{OUT}$ are selected from the grayscale voltages received from the grayscale voltage generator circuit 25 and the selected grayscale voltages are output to the corresponding source lines 13.

Figure 3:
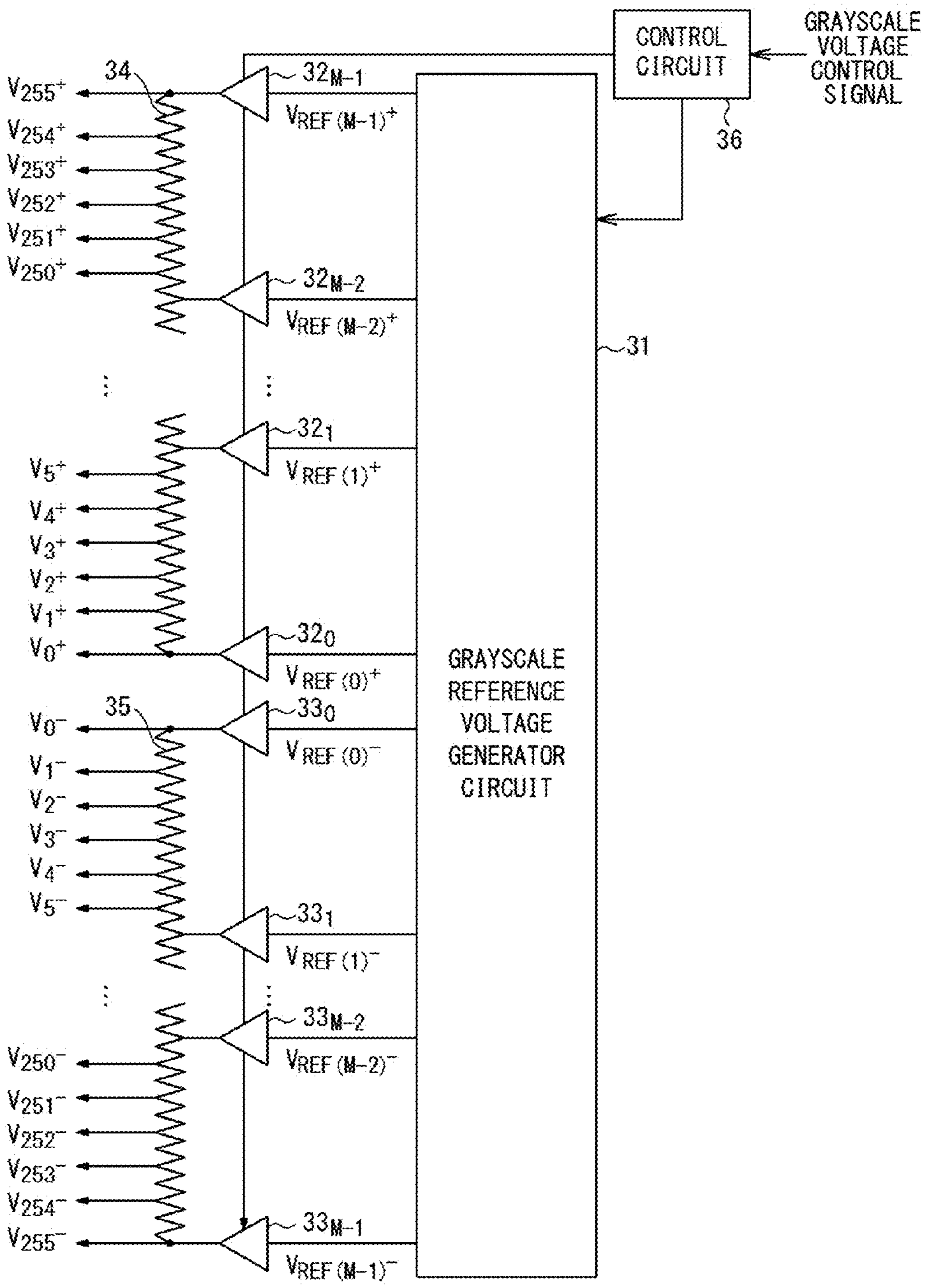
FIG. 3 is a block diagram illustrating an exemplary configuration of a grayscale voltage generator circuit in the present embodiment.

The grayscale voltage generator circuit 25 supplies the grayscale voltages $V_0^+$-$V_{255}^+$ and $V_0^-$-$V_{255}^-$ to the DA converter 24*b*. FIG. 3 is a circuit diagram illustrating an exemplary configuration of the grayscale voltage generator circuit 25 in the present embodiment.

The grayscale voltage generator circuit 25 includes a grayscale reference voltage generator circuit 31, M positive-side gamma amplifiers $\mathbf{32}_0$ to $\mathbf{32}_{M-1}$, M negative-side gamma amplifiers $\mathbf{33}_0$ to $\mathbf{33}_{M-1}$, a positive-side ladder resistor 34, a negative-side ladder resistor 35 and a control circuit 36.

The grayscale reference voltage generator circuit 31 generates grayscale reference voltages $V_{REF(0)}^+$ to $V_{REF(M-1)}^+$ and $V_{REF(0)}^-$ to $V_{REF(M-1)}^-$. The grayscale reference voltages $V_{REF(0)}^+$ to $V_{REF(M-1)}^+$ are a set of voltages used to generate the grayscale voltages $V_0^+$ to $V_{255}^+$. The grayscale reference voltage $V_{REF(0)}^+$, which is the lowest voltage among the grayscale reference voltages $V_{REF(0)}^+$ to $V_{REF(M-1)}^+$, is set to the same voltage level as the positive grayscale voltage $V_0^+$, which corresponds to the lowest graylevel, and the grayscale reference voltage $V_{REF(M-1)}^+$, which is the highest voltage among the grayscale reference voltages $V_{REF(0)}^+$ to $V_{REF(M-1)}^+$, is set to the same voltage level as the positive grayscale voltage $V_{255}^+$, which corresponds to the highest graylevel. Similarly, the grayscale reference voltages $V_{REF(0)}^-$ to $V_{REF(M-1)}^-$ are a set of voltages used to generate the grayscale voltages $V_0^-$ to $V_{255}^-$. The grayscale reference voltage $V_{REF(0)}^-$, which is the highest voltage among the grayscale reference voltages $V_{REF(0)}^-$ to $V_{REF(M-1)}^-$, is set to the same voltage level as the negative grayscale voltage $V_0^-$, which corresponds to the lowest graylevel, and the grayscale reference voltage $V_{REF(M-1)}^-$, which is the lowest voltage among the grayscale reference voltages $V_{REF(0)}^-$ to $V_{REF(M-1)}^-$, is set to the same voltage level as the negative grayscale voltage $V_{255}^-$, which corresponds to the highest graylevel. The gamma characteristics of the controller driver 4 can be adjusted by controlling the grayscale reference voltages $V_{REF(0)}^+$ to $V_{REF(M-1)}^+$ and $V_{REF(0)}^-$ to $V_{REF(M-1)}^-$.

The positive-side gamma amplifiers $\mathbf{32}_0$ to $\mathbf{32}_{M-1}$ are each configured as a voltage follower. The positive-side gamma amplifiers $\mathbf{32}_0$ to $\mathbf{32}_{M-1}$ respectively output the same voltages as the grayscale reference voltages $V_{REF(0)}^+$ to $V_{REF(M-1)}^+$ received from the grayscale reference voltage generator circuit 31. The output of the positive-side gamma amplifier $32_0$, which outputs the grayscale reference voltage $V_{REF(0)}^+$, is connected to one end of the positive-side ladder resistor 34 and the output of the positive-side gamma amplifier $32_{M-1}$, which outputs the grayscale reference voltage $V_{REF(M-1)}^+$, is connected to the other end of the positive-side ladder resistor 34. The positive-side gamma amplifiers $32_1$ to $32_{M-1}$ are connected to intermediate positions of the positive-side ladder resistor 34.

Similarly, the negative-side gamma amplifiers $33_0$ to $33_{M-1}$ are each configured as a voltage follower. The negative-side gamma amplifiers $33_0$ to $33_{M-1}$ respectively outputs the same voltages as the grayscale reference voltages $V_{REF(0)}^-$ to $V_{REF(M-1)}^-$ received from the grayscale reference voltage generator circuit 31. The output of negative-side gamma amplifier $33_0$, which outputs the grayscale reference voltage $V_{REF(0)}^-$ is connected to one end of the negative-side ladder resistor 35 and the output of the negative-side gamma amplifier $33_{M-1}$, which outputs the grayscale reference voltage $V_{REF(M-1)}$, is connected to the other end of the negative-side ladder resistor 35. The negative-side gamma amplifiers $33_1$ to $33_{M-2}$ are connected to intermediate positions of the negative-side ladder resistor 35.

The positive-side ladder resistor 34 generates the grayscale voltages $V_0^+$ to $V_{255}^+$ from the grayscale reference voltages $V_{REF(0)}^+$ to $V_{REF(M-1)}^+$ received from the positive-side gamma amplifiers $32_0$ to $32_{M-1}$ through voltage dividing. The voltages generated on the both ends of the positive-side ladder resistor 34, that is, the grayscale reference voltages $V_{REF(0)}^+$ and $V_{REF(M-1)}^+$ are output as the grayscale voltages $V_0^+$ and $V_{255}^+$ as they are and the voltages generated on intermediate positions of the positive-side ladder resistor 34 are output as the grayscale voltages $V_1^+$ to $V_{254}^+$.

Similarly, the negative-side ladder resistor 35 generates the grayscale voltages $V_0^-$ to $V_{255}^-$ from the grayscale reference voltages $V_{REF(0)}^-$ to $V_{REF(M-1)}^-$ received from the negative-side gamma amplifiers $33_0$ to $33_{M-1}$ through voltage dividing. The voltages generated on the both ends of the negative-side ladder resistor 35, that is, the grayscale reference voltages $V_{REF(0)}^-$ and $V_{REF(M-1)}^-$ are output as the grayscale voltages $V_0^-$ and $V_{255}^-$ as they are and the voltages generated on intermediate positions of the negative-side ladder resistor 35 are output as the grayscale voltages $V_1^-$ to $V_{254}^-$.

The control circuit 36 controls the grayscale reference voltage generator circuit 31, the positive-side gamma amplifiers $32_0$ to $32_{M-1}$ and the negative-side gamma amplifiers $33_0$ to $33_{M-1}$ in response to the grayscale voltage control signal received from the command control circuit 21. More specifically, the control circuit 36 controls the voltage levels of the grayscale reference voltages $V_{REF(0)}^+$ to $V_{REF(M-1)}^+$ and $V_{REF(0)}^-$ to $V_{REF(M-1)}^-$, which are output from the grayscale reference voltage generator 31, in response to the grayscale voltage control signal.

Additionally, the control circuit 36 controls the start and stop of the operations of the positive-side gamma amplifiers $32_0$ to $32_{M-1}$ and the negative-side gamma amplifiers $33_0$ to $33_{M-1}$. In the present embodiment, as described later in detail, when the controller driver 4 is placed into the eight-color halftoning mode (that is, when the eight-color halftoning is performed by the image processing circuit 23), the operations of the gamma amplifiers other than the gamma amplifiers $32_0$, $32_{M-1}$, $33_0$ and $33_{M-1}$, which outputs the grayscale voltage $V_0^+$ and $V_0^-$ corresponding to the lowest graylevel and the grayscale voltage $V_{255}^+$ and $V_{255}^-$ corresponding to the highest graylevel, are stopped. This effectively reduces the power consumption in the eight-color halftoning mode.

Referring back to FIG. 2, the panel interface circuit 26 controls the gate line driver circuit 8 integrated in the liquid crystal display panel 3. The gate line driver circuit 8 drives the gate lines 12 of the display region 7 under the control of the panel interface circuit 26.

The timing control circuit 27 supplies timing control signals to various circuits of the controller driver 4 in response to commands and control parameters received from the command control circuit 21 to thereby achieve a timing control of the controller driver 4.

It should be noted that the gamma characteristics of the source line driver circuit 24 are determined by the distribution of the grayscale voltages $V_0^+$ to $V_{255}^+$ and $V_0^-$ to $V_{255}^-$ generated by the grayscale voltage generator circuit 25 when multiple-graylevel image data are supplied to the source line driver circuit 24 (that is, when the controller driver 4 is not placed in the eight-color halftoning mode). Desired gamma characteristics can be achieved in the source line driver circuit 24 by adjusting the distribution of the voltage levels of the grayscale voltages $V_0^+$ to $V_{255}^+$ and $V_0^-$ to $V_{255}^-$ in accordance with the desired gamma characteristics. It is possible to set the source line driver circuit 24 to desired gamma characteristics by controlling the grayscale reference voltages $V_{REF(0)}^+$ to $V_{REF(M-1)}^+$ and $V_{REF(0)}^-$ to $V_{REF(M-1)}^-$ since the grayscale voltages $V_0^+$ to $V_{255}^+$ and $V_0^-$ to $V_{255}^-$ are generated from the grayscale reference voltages $V_{REF(0)}^+$ to $V_{REF(M-1)}$+ and $V_{REF(0)}^-$ to $V_{REF(M-1)}^-$ as described above.

When image processing is performed in the image processing circuit 23, the gamma characteristics of the controller driver 4 as a whole are determined as the superposition of the gamma characteristics of the image processing performed in the image processing circuit 23 and the gamma characteristics of the source line driver circuit 24. To display an image with proper brightness, it would be desired to set the gamma characteristics of the controller driver 4 as a whole so that the gamma characteristics of the controller driver 4 matches with the voltage-transmittance characteristics of the liquid crystal display panel 3.

In the display device 1 of the present embodiment, when a normal operation is performed, image processing is performed on the image data $D_{IN}$ read out from the image memory 22 by the image processing circuit 23 in accordance with the necessity and the liquid crystal display panel 3 is driven in response to the processed image data $D_{OUT}$ obtained by this image processing. It should be noted that the image processing by the image processing circuit 23 may be omitted if not necessary.

When power consumption reduction is desired, on the other hand, the controller driver 4 is placed into the eight-color halftoning mode. When the controller driver 4 is placed in the eight-color halftoning mode, the image processing circuit 23 generates the processed image data $D_{OUT}$ through the eight-color halftoning. The eight-color halftoning mode effectively contributes the power consumption reduction as discussed in the following.

First, it is possible to reduce the power consumption by stopping unnecessary ones of the gamma amplifiers included in the grayscale voltage generator circuit 25 (operational amplifiers used to generate the grayscale voltages) in the eight-color halftoning mode. In the configuration of the grayscale voltage generator circuit 25 illustrated in FIG. 3, for example, the operations of the positive-side and negative-side gamma amplifiers 32 and 33 other than the gamma amplifiers $32_0$, $32_{M-1}$, $33_0$ and $33_{M-1}$, which generate the grayscale voltages $V_0^+$ and $V_0^-$ corresponding to the lowest graylevel and the grayscale voltages $V_{255}^+$ and $V_{255}^-$ corresponding to the highest graylevel, are stopped when the controller driver 4 is placed in the eight-color halftoning mode. In other words, the operations of the positive-side gamma amplifiers $\mathbf{32}_1$ to $\mathbf{32}_{M-2}$ and the negative-side gamma amplifiers $\mathbf{33}_1$ to $\mathbf{33}_{M-2}$ are stopped when the controller driver 4 is placed in the eight-color halftoning mode. In the eight-color halftoning mode, the graylevels other than the highest and lowest graylevels are not specified as the graylevel of each subpixel 14 of each pixel 11 in the processed image data $D_{OUT}$ supplied to the source line driver circuit 24. Accordingly, in the eight-color halftoning mode, generation of the intermediate graylevels (the graylevels other than the highest and lowest graylevels) is not required, and it is therefore possible to generate the grayscale voltages $V_0^+$ and $V_0^-$, which correspond to the lowest graylevel, and the grayscale voltages $V_{255}^+$ and $V_{255}^-$, which correspond to the highest graylevel, even when the operations of the positive-side gamma amplifiers $\mathbf{32}_1$ to $\mathbf{32}_{M-2}$ and the negative-side gamma amplifiers $\mathbf{33}_1$ to $\mathbf{33}_{M-2}$ are stopped. The controller driver 4 of the present embodiment is designed to reduce power consumption by stopping the operations of the positive-side gamma amplifiers $\mathbf{32}_1$ to $\mathbf{32}_{M-2}$ and the negative-side gamma amplifiers $\mathbf{33}_1$ to $\mathbf{33}_{M-2}$ when the controller driver 4 is placed in the eight-color halftoning mode. The command control circuit 21 stops the operations of the positive-side gamma amplifiers $\mathbf{32}_1$ to $\mathbf{32}_{M-2}$ and the negative-side gamma amplifiers $\mathbf{33}_1$ to $\mathbf{33}_{M-2}$ by the grayscale voltage control signal, when the controller driver 4 is placed in the eight-color halftoning mode.

Figure 4:
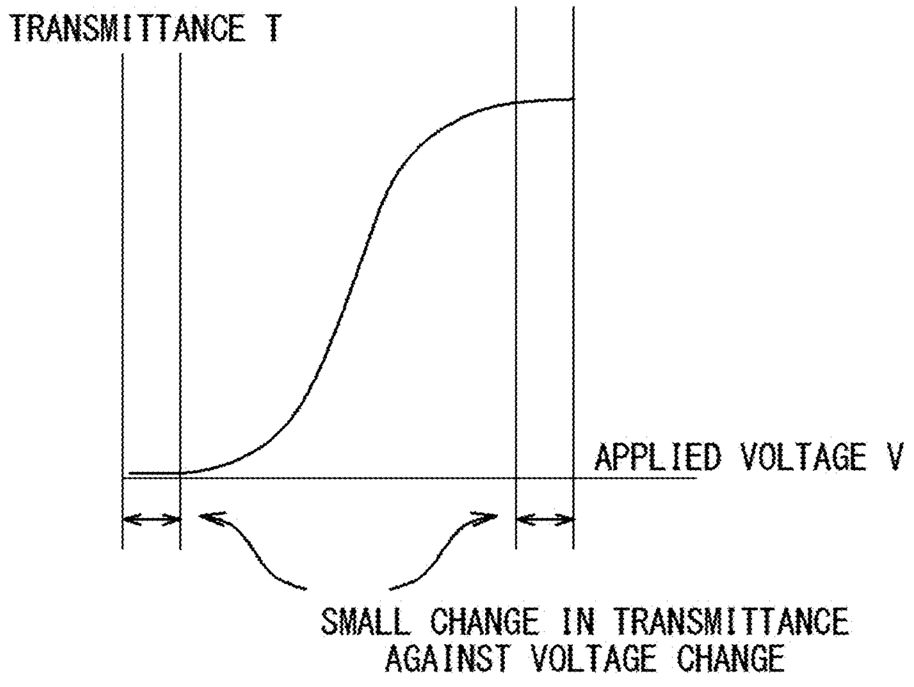
FIG. 4 is a graph illustrating an example of the transmittance-voltage curve of liquid crystal.

Second, the power consumption can be effectively reduced by reducing the frame rate when the controller driver 4 is placed in the eight-color halftoning mode. In the eight-color halftoning mode, the reduction of the frame rate does not so affect the image quality due to the nature of liquid crystal used in the liquid crystal display panel 3. FIG. 4 is a graph illustrating a typical transmittance-voltage curve of liquid crystal. In general, liquid crystal exhibits a property in which the change in the transmittance against the applied voltage is small in a higher voltage range and a lower voltage range, and the change in the transmittance is large in an intermediate voltage range. In the eight-color halftoning mode, in which only the highest and lowest graylevels are used, the changes in the voltages on the pixel electrodes of the respective subpixels caused by the reduction of the frame rate do not affect the image quality, because only the higher and lower voltage ranges of the transmittance-voltage curve are used. This implies that the use of the eight-color halftoning mode allows reducing the power consumption through reducing the frame rate.

The eight-color halftoning mode is especially useful when the portable terminal incorporating the display device 1 is placed in the standby state. In the standby state, the reduction in the power consumption is strongly desired, and it is therefore effective for power consumption reduction to place the controller driver 4 in the eight-color halftoning mode. It should be also noted that it is not usually required to display a moving picture in the standby state, and the image quality is therefore hard to be deteriorated when the controller driver 4 is placed into the eight-color halftoning mode and the frame rate is reduced.

One feature of the display device 1 of the present embodiment lies in the eight-color halftoning performed in the image processing circuit 23. In the following, a description is given of the eight-color halftoning performed in the present embodiment.

Figure 5A:
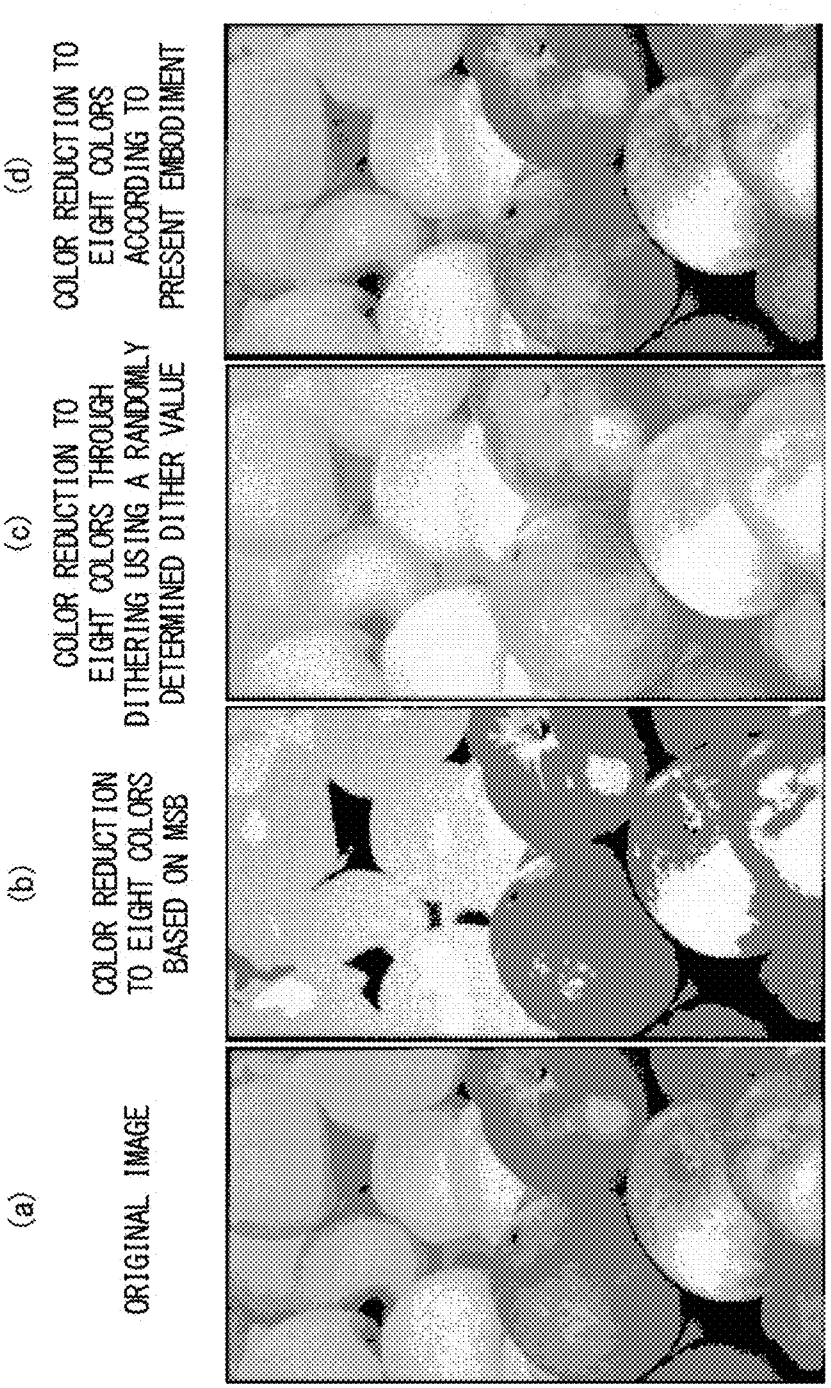
FIG. 5A illustrates one example of an original image (which is not subjected to eight-color halftoning), an image obtained by eight-color halftoning based on the most significant bits, an image obtained by eight-color halftoning based on dithering with a dither value that is randomly determined, and an image obtained by eight-color halftoning of the present embodiment.

The simplest way to achieve eight-color halftoning for many-graylevel image data is to determine the "turn-on" or "turn-off" of each subpixel depending on the most significant bit of data indicating the graylevel of each pixel. It is possible to display an image in which the number of allowed colors of each pixel is eight, by "turning on" a subpixel of each pixel when the most significant bit of the data indicating the graylevel of the subpixel is "1" and "turning off" a subpixel of each pixel when the most significant bit of the data indicating the graylevel of the subpixel is "0". Such eight-color halftoning, however, largely deteriorates the image quality as understood from FIG. 5A, since the changes in the graylevel cannot be sufficiently represented in the displayed image. It should be noted that the column (a) of FIG. 5A illustrates an original image which is not subjected to eight-color halftoning and the column (b) illustrates the image obtained through the eight-color halftoning depending on the most significant bits.

The eight-color halftoning may be considered as color reduction processing which truncates an increased number of bits from image data. Accordingly, dithering, which is one of the known color reduction techniques with reduced deterioration of image quality, is one of promising techniques as eight-color halftoning. In general, dithering is achieved by adding a dither value that is randomly determined to image data and truncating a desired number of lower bits. For example, eight-color halftoning with respect to image data that represent the graylevel of each subpixel with eight bits may be achieved by adding an eight-bit dither value to image data of each subpixel (the resultant value obtained by the addition is a nine-bit value) and truncating lower eight bits.

One problem which has been discovered through an inventors' study of eight-color halftoning based on such dithering is that the brightness of the image displayed on the basis of the image data obtained by the eight-color halftoning undesirably differs from that of the original image. In the following, a description is given of the origin of this phenomenon.

Figure 5B:
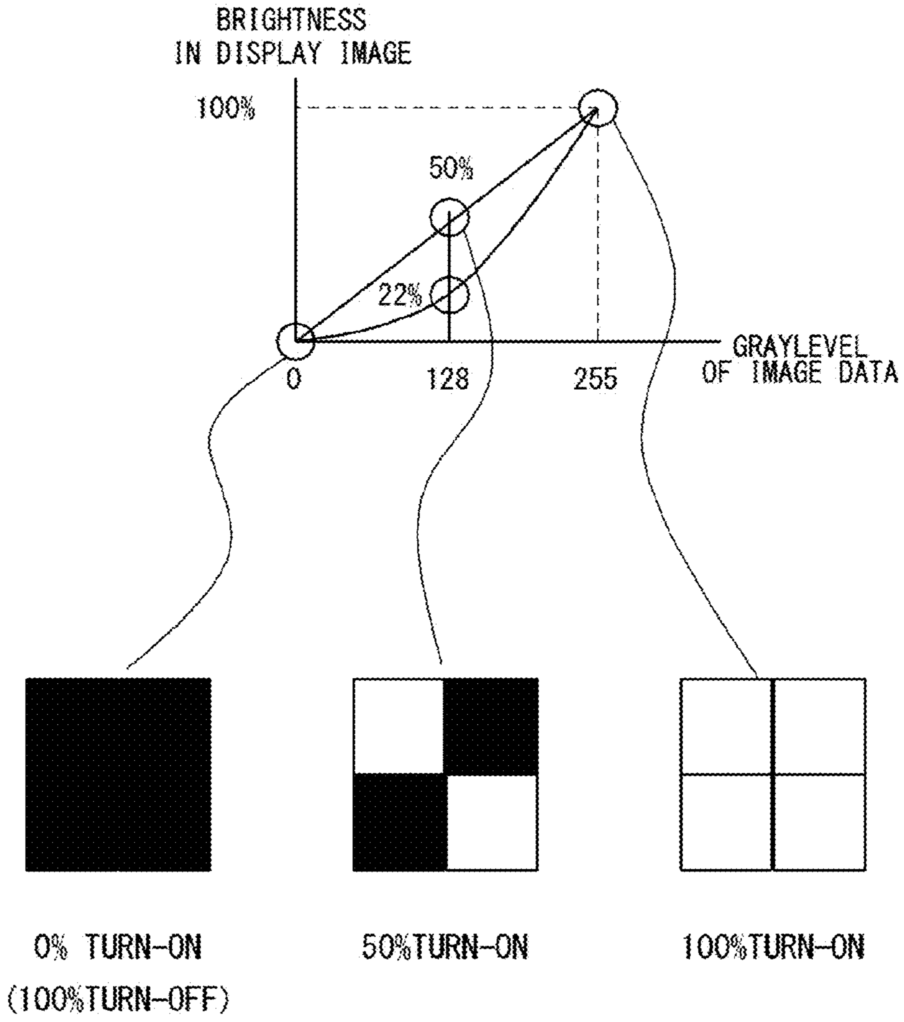
FIG. 5B is a diagram schematically illustrating the gamma characteristics of eight-color halftoning based on dithering with dither values that are randomly-determined.

According to an inventors' consideration, eight-color halftoning based on dithering using a dither value that is randomly-determined corresponds to image processing with a gamma value $\gamma$ of one. FIG. 5B is a diagram schematically illustrates the gamma characteristics of eight-color halftoning based on dithering with a dither value that is randomly-determined. Note that it is assumed herein that the graylevel of each subpixel is represented by an eight-bit value (0 to 255).

When dithering is performed on image data of a certain subpixel with a dither value that is randomly determined, the probability that the subpixel is "turned on" increases proportionally to the graylevel of the subpixel specified by the image data increases. The probability that the subpixel is "turned on" is 0% when the graylevel specified for a certain subpixel is zero, 100% when the graylevel specified for a certain subpixel is 255. When the graylevel specified for a certain subpixel is 128, the subpixel is turned off for a dither value from zero to 127 and turned on for a dither value from 128 to 255. In other words, the subpixel is turned on with a probability of 50% and turned off with a probability of 50%, when the graylevel is 128. Accordingly, the effective brightness of the subpixel in the displayed image is 50% of the allowed highest brightness. As thus discussed, the probability that a certain subpixel is turned on increases proportionally to the graylevel specified for the subpixel and the effective brightness of the subpixel in the displayed image also increases proportionally to the graylevel specified for the subpixel. This implies that the gamma value is one with respect to the dithering with a dither value that is randomly determined.

Meanwhile, the above-described setting of the gamma characteristics of the source line driver circuit 24 with the grayscale voltages does not work when an image is displayed on the basis of image data obtained by the eight-color halftoning, because there are only subpixels of the highest graylevel and the lowest graylevel in the image. Since the intermediate grayscale voltages $V_1+$ to $V_{254}^+$ and $V_1^-$ to $V_{254}^-$ are not used in the eight-color halftoning mode, the setting of the grayscale voltages $V_1^+$ to $V_{254}^+$ and $V_1^-$ to $V_{254}^-$ does not influence the gamma characteristics of the source line driver circuit 24.

This results in that the gamma characteristics of the controller driver 4 as a whole do not match the gamma characteristics of the liquid crystal display panel 3 in the eight-color halftoning mode, and the brightness of the image actually displayed on the liquid crystal display panel 3 undesirably differs from that of the original image. In general, the gamma characteristics of a driver that drives a liquid crystal display panel should be set to a gamma value of 2.2; however, the gamma value of the eight-color halftoning based on dithering with a dither value that is randomly determined is one, and therefore the displayed image is made too bright in the eight-color halftoning mode. For gamma characteristics of a gamma value of 2.2, for example, the brightness of a subpixel should be about 22% of the allowed highest brightness when the graylevel specified in image data for the subpixel is 128; however, the brightness of the subpixel is set to 50% of the allowed highest brightness, when the eight-color halftoning is performed based on dithering with a dither value that is randomly determined. The same applies to the remaining graylevels. The column (c) of FIG. 5A illustrates an example of an image obtained by the eight-color halftoning based on dithering with dither values that are randomly determined. As is understood from the column (c) of FIG. 5A, the image obtained by the eight-color halftoning based on dithering with the dither values that are randomly determined is brighter than the original image illustrated in the column (a) of FIG. 5A.

To address this problem, the image processing circuit 23 of the present embodiment is configured to perform a gamma correction (brightness correction) and dithering in eight-color halftoning and to thereby improve the quality of an image displayed on the liquid crystal display panel 3 in response to the processed image data $D_{OUT}$ obtained by the eight-color halftoning. In the following, a description is given of an exemplary configuration of the image processing circuit 23 and eight-color halftoning performed in the image processing circuit 23 in the present embodiment.

Figure 6:
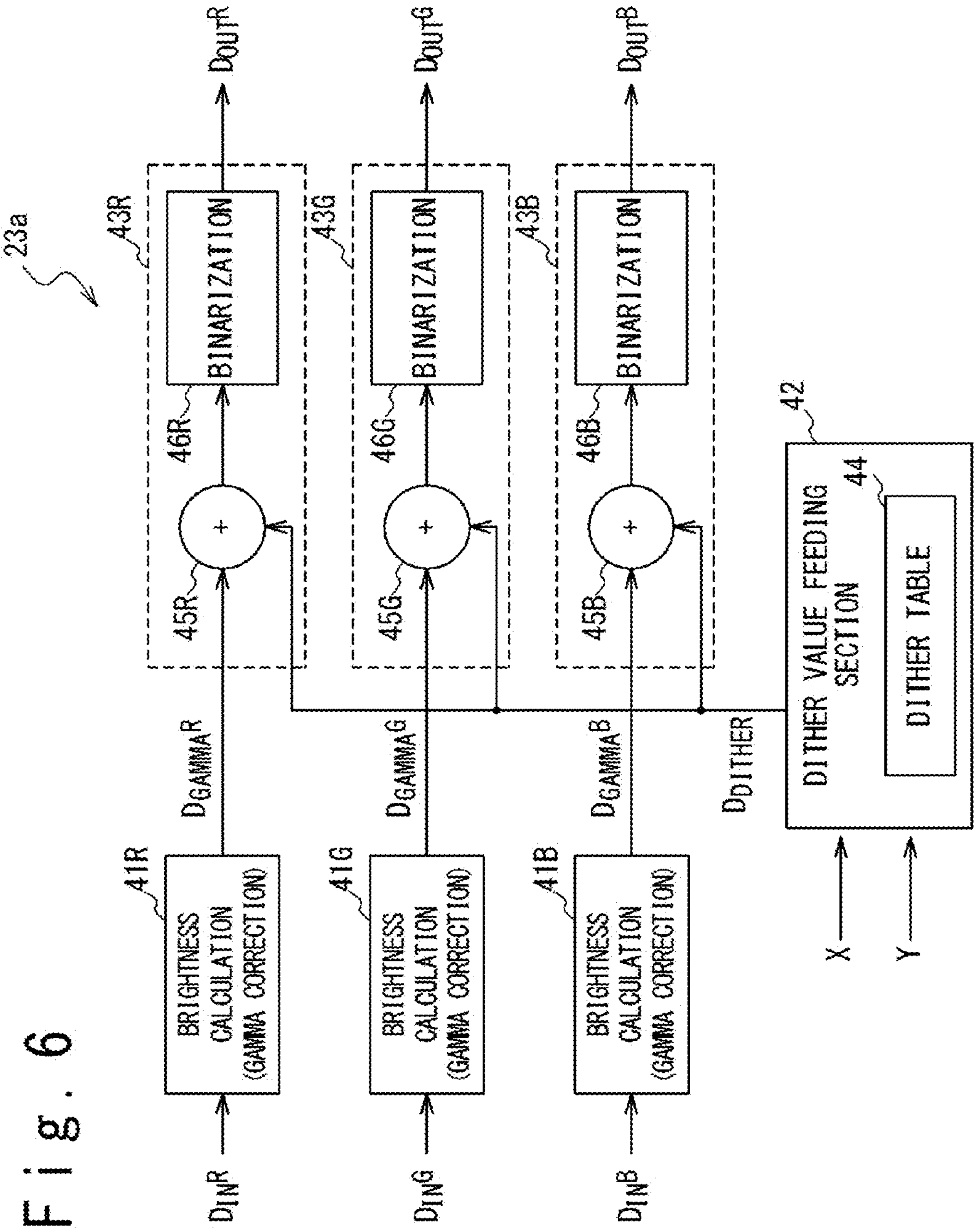
FIG. 6 is a block diagram illustrating an exemplary configuration of an eight-color halftoning circuit section of an image processing circuit in the first embodiment.

FIG. 6 is a block diagram illustrating an exemplary configuration of a circuit section of the image processing circuit 23, which performs eight-color halftoning (hereinafter, referred to as eight-color halftoning circuit section 23*a*). The eight-color halftoning circuit section 23*a* includes brightness calculation sections 41R, 41G, 41B, a dither value feeding section 42 and dithering sections 43R, 43G and 43B.

The brightness calculation sections 41R, 41G and 41B respectively perform a gamma correction on R data $D_{IN}^R$, G data $D_{IN}^G$ and B data $D_{IN}^B$ of the image data $D_{IN}$ received from the image memory 22, to thereby generates corrected R data $D_{GAMMA}^R$, corrected G data $D_{GAMMA}^G$ and corrected B data $D_{GAMMA}^B$, respectively. When the gamma value of the gamma correction is γ, corrected R data $D_{GAMMA}^R$, corrected G data $D_{GAMMA}^G$ and corrected B data $D_{GAMMA}^B$ are ideally calculated in accordance with the following expressions (1a) to (1c), respectively:

$$D_{GAMMA}^R = (2^m - 1)\cdot\left(\frac{D_{IN}^R}{2^m - 1}\right)^\gamma, \tag{1a}$$

$$D_{GAMMA}^G = (2^m - 1)\cdot\left(\frac{D_{IN}^G}{2^m - 1}\right)^\gamma, \text{ and} \tag{1b}$$

$$D_{GAMMA}^B = (2^m - 1)\cdot\left(\frac{D_{IN}^B}{2^m - 1}\right)^\gamma. \tag{1c}$$

Note that expressions (1a) to (1c) are in accordance with the strict expression of the gamma correction. The parameter m is the number of bits of the R data $D_{IN}^R$, G data $D_{IN}^G$ and B data $D_{IN}^B$. When m=8, expressions (1a) to (1c) can be rewritten as follows:

$$D_{GAMMA}^R = 255\cdot\left(\frac{D_{IN}^R}{255}\right)^\gamma, \tag{2a}$$

$$D_{GAMMA}^G = 255\cdot\left(\frac{D_{IN}^G}{255}\right)^\gamma, \text{ and} \tag{2b}$$

$$D_{GAMMA}^B = 255\cdot\left(\frac{D_{IN}^B}{255}\right)^\gamma. \tag{2c}$$

In one embodiment, the brightness calculation sections 41R, 41G and 41B performs a gamma correction with a gamma value γ of 2.2.

Since the gamma correction involves exponentiation as described above, the circuit sizes of the brightness calculation sections 41R, 41G and 41B are undesirably increased when the gamma correction is performed in accordance with the strict expression of the gamma correction. To reduce the circuit size of the brightness calculation sections 41R, 41G and 41B, the brightness calculation sections 41R, 41G and 41B may be configured to generate the corrected R data $D_{GAMMA}^R$, corrected G data $D_{GAMMA}^G$ and corrected B data $D_{GAMMA}^B$ through table lookup to a lookup table describing the values of the corrected R data $D_{GAMMA}^R$, corrected G data $D_{GAMMA}^G$ and corrected B data $D_{GAMMA}^B$ data D for each of the allowed values of the R data $D_{IN}^R$, G data $D_{IN}^G$ and B data $D_{IN}^B$.

The brightness calculation sections 41R, 41G and 41B may be configured to calculate the corrected R data $D_{GAMMA}^R$, corrected G data $D_{GAMMA}^G$ and corrected B data $D_{GAMMA}^B$ by using a polynomial expression approximating the strict expression of the gamma correction. Since the circuit size of hardware implementing a calculation in accordance with a polynomial expression can be reduced compared with that implementing an exponential calculation, the circuit sizes of the brightness calculation sections 41R, 41G and 41B can be effectively reduced by calculating the corrected R data $D_{GAMMA}^R$, corrected G data $D_{GAMMA}^G$ and corrected B data $D_{GAMMA}^B$ by using a polynomial expression approximating the strict expression of the gamma correction.

The gamma values of the gamma corrections performed by the brightness calculation sections 41R, 41G and 41B may be configured individually for the respective colors (that is, individually for the brightness calculation sections 41R, 41G and 41B) when color adjustment is further performed.

The dither value feeding section 42 feeds a dither value $D_{DITHER}$ to each of the dithering sections 43R, 43G and 43B. In the present embodiment, the number of bits of the dither value $D_{DITHER}$ is m, which is the same as the number of bits of the corrected R data $D_{GAMMA}$R, corrected G data $D_{GAMMA}^G$ and corrected B data $D_{GAMMA}^B$. The dither value feeding section 42 contains a dither table 44 in which allowed values of the dither value $D_{DITHER}$ are described as the elements. The dither value feeding section 42 selects the dither value $D_{DITHER}$ from the elements of the dither table 44 in response to the addresses X and Y of the target pixel (that is, the pixel 11 of interest of the eight-color halftoning). In the present embodiment, the dither table 44 includes 16×16 elements. The number of bits of the dither value $D_{DITHER}$ is eight and therefore each element takes a value from "0" to "255". The elements of the dither table 44 are determined to be different from each other. In other words, the dither table 44 includes one element that takes each of the values from "0" to "255".

FIG. 7 is a diagram illustrating one example of the contents of the dither table 44. The dither value $D_{DITHER}$ is selected from the elements of the dither table 44 in response to the lower four bits of the addresses X and Y of the target pixel. More specifically, when the value of the lower four bits X[3:0] of the address X is i and the value of the lower four bits Y[3:0] of the address Y is j, the dither value $D_{DITHER}$ is selected as the element in the i-th column and j-th row of the dither table 44. The thus-selected dither value $D_{DITHER}$ is transmitted to the dithering sections 43R, 43G and 43B.

The dithering sections 43R, 43G and 43B respectively perform dithering on the corrected R data $D_{GAMMA}^R$, corrected G data $D_{GAMMA}^G$ and corrected B data $D_{GAMMA}^B$ to thereby generate the processed R data processed G data $D_{OUT}^G$ and processed B data $D_{OUT}^R$. The processed R data $D_{OUT}^R$, processed G data $D_{OUT}^G$ and processed B data $D_{OUT}^B$, which are data obtained through eight-color halftoning by the eight-color halftoning circuit section 23*a*, are one-bit data.

The dithering section 43R includes an adder 45R and a binarization circuit 46R. The adder 45R performs an addition of the corrected R data $D_{GAMMA}^R$, the most significant bit MSB [$D_{GAMMA}^R$] of the corrected R data $D_{GAMMA}^R$ and the dither value $D_{DITHER}$ received from the dither value feeding section 42. The binarization circuit 46R determines the value of the processed R data $D_{OUT}$ depending on whether or not a carry occurs in the addition performed by the adder 45R. When a carry occurs in the addition performed by the adder 45R, the binarization circuit 46R sets the processed R data $D_{OUT}^R$ to a value of "1", and otherwise to a value of "0".

In other words, the dithering section 43R calculates the processed R data $D_{OUT}^R$ as follows:

$$D_{OUT}^R=1,\text{when } D_{GAMMA}^R+\text{MSB}[D_{GAMMA}^R]+D_{DITHER} \text{ is 256 or more, and} \quad (1)$$

$$D_{OUT}^R=0,\text{ when } D_{GAMMA}^R+\text{MSB}[D_{Gamma}^R]+D_{DITHER} \text{ is less than 256.} \quad (2)$$

It should be noted that the reason why the most significant bit MSB [$D_{GAMMA}^R$] is added is that $D_{OUT}^R$ should be unconditionally set to "1", when the corrected R data $D_{GAMMA}^R$ is 255 and $D_{OUT}^R$ should be unconditionally set to value "0", when the corrected R data $D_{GAMMA}^R$ is "0".

The dithering sections 43G and 43B are configured and operated similarly to the dithering section 43R, except for that the dithering sections 43G and 43B respectively receive the corrected G data $D_{GAMMA}^G$ and corrected B data $D_{GAMMA}^B$ in place of the corrected R data $D_{GAMMA}^R$. More specifically, the dithering section 43G includes an adder 45G and a binarization circuit 46G and the dithering section 43B includes an adder 45B and a binarization circuit 46B.

The adder 45G performs an addition of the corrected G data $D_{GAMMA}^G$, the most significant bit MSB [$D_{GAMMA}^G$] of the corrected G data $D_{GAMMA}^G$ and the dither value $D_{DITHER}$ received from the dither value feeding section 42. The binarization circuit 47 determines the value of the processed G data $D_{OUT}^G$ depending on whether or not a carry occurs in the addition performed by the adder 45G. When a carry occurs in the addition performed by the adder 45G, the binarization circuit 46G sets the processed G data $D_{OUT}^G$ to a value of "1", and otherwise to a value of "0".

Similarly, the adder 45B performs an addition of the corrected B data $D_{GAMMA}^B$, the most significant bit MSB [$D_{GAMMA}^B$] of the corrected B data $D_{GAMMA}^B$ and the dither value $D_{DITHER}$ received from the dither value feeding section 42. The binarization circuit 46B determines the value of the processed B data $D_{OUT}^B$ depending on whether or not a carry occurs in the addition performed by the adder 45B. When a carry occurs in the addition performed by the adder 45B, the binarization circuit 46B sets the processed B data $D_{OUT}^B$ to a value of "1", and otherwise to a value of "0".

The R subpixel 14R of the target pixel is "turned on" when the processed R data $D_{OUT}^R$ is calculated as the value "1" for the R subpixel 14R and the R subpixel 14R is "turned off", when the processed R data $D_{OUT}^R$ is calculated as the value "0". Similarly, the G subpixel 14G of the target pixel is "turned on" when the processed G data $D_{OUT}^G$ is calculated as the value "1" for the G subpixel 14G and the G subpixel 14G is "turned off", when the processed G data $D_{OUT}^G$ is calculated as the value "0". Furthermore, the B subpixel 14B of the target pixel is "turned on" when the processed B data $D_{OUT}^B$ is calculated as the value "1" for the B subpixel 14B and the B subpixel 14B is "turned-off", when the processed B data $D_{OUT}^B$ is calculated as the value "0".

Figure 8:
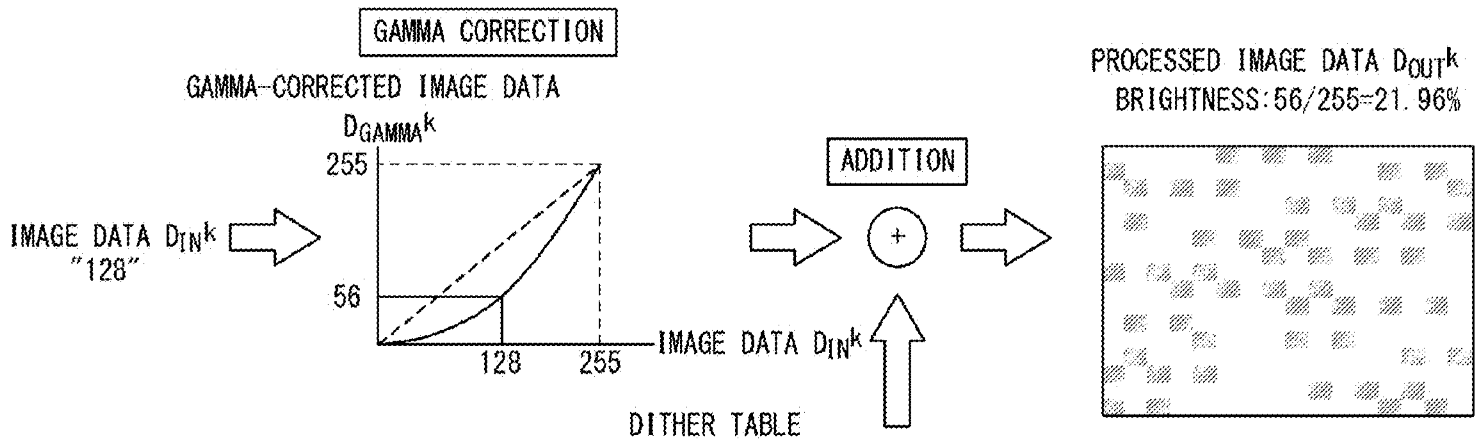
FIG. 8 is a diagram illustrating an exemplary operation of the eight-color halftoning circuit section in the first embodiment.

FIG. 8 is a diagram illustrating one example of the operation of the eight-color halftoning circuit section 23*a*. In FIG. 8, the R data $D_{IN}^R$, G data $D_{IN}^G$ and B data $D_{IN}^B$ of image data $D_{IN}$ are collectively referred to as image data $D_{IN}^k$ and the corrected R data $D_{GAMMA}^R$, corrected G data $D_{GAMMA}^G$ and corrected B data $D_{GAMMA}^B$ are collectively referred to as corrected image data $D_{GAMMA}^k$, where k is any of "R", "G" and "B", indicating the color. Similarly, the processed R data $D_{OUT}^R$, processed G data $D_{OUT}^G$ and processed B data D are collectively referred to as processed image data $D_{OUT}^k$.

Illustrated in FIG. 8 is an example of eight-color halftoning in the case when the value of the image data $D_{IN}^k$ of the subpixel 14 of color k is 128. The objective of the eight-color halftoning illustrated in FIG. 8 is to achieve gamma characteristics of a gamma value of 2.2 to achieve matching with the characteristics of the liquid crystal display panel 3, when each subpixel 14 is turned on or off in response to the processed image data $D_{OUT}$. In the gamma characteristics of a gamma value of 2.2, the brightness of a subpixel 14 is to be set to 22% of the allowed maximum brightness (=56/255), when the value of the corresponding image data $D_{IN}^k$ is 128.

When the value of the image data $D_{IN}^k$ is 128, the corrected image data $D_{GAMMA}^k$ is calculated as 56 in the gamma correction by the brightness calculation section 41*k*. It should be noted that the value of "56" is obtained as a result of the gamma correction with a gamma value of 2.2.

Furthermore, the addition of the corrected image data $D_{GAMMA}^{k}$, the most significant bit MSB $[D_{GAMMA}^{k}]$ of the corrected image data $D_{GAMMA}^{k}$ and the dither value $D_{DITHER}$ received from the dither value feeding section 42 is performed by the adder 45*k*. When a carry occurs in this addition, that is, when the sum of the corrected image data $D_{GAMMA}^{k}$, the most significant bit MSB $[D_{GAMMA}^{k}]$ and the dither value $D_{DITHER}$ is 256 or more, the processed image data $D_{OUT}^{k}$ is calculated as "1". When no carry occurs in the addition, that is, when the sum of the corrected image data $D_{GAMMA}^{k}$, the most significant bit MSB $[D_{GAMMA}^{k}]$ and the dither value $D_{DITHER}$ is less than 256, the processed image data $D_{OUT}^{k}$ is calculated as "0".

Discussed below is the case when the above-described processing is performed on image data $D_{IN}^{k}$ of the subpixels 14 of the color "k" for pixels 11 arrayed in 16 columns and 16 rows. When the value of the corrected image data $D_{GAMMA}^{k}$ is 56, the processed image data $D_{OUT}^{k}$ is calculated as "1" for 56 of the 16×16 pixels 11. This is because the dither values $D_{DITHER}$ are selected as different values from 0 to 255 for the 16×16 pixels 11, and therefore a carry occurs in the addition by the adder 45*k* for the 56 of the 16×16 pixels 11. Accordingly, the subpixels 14 of color k are turned on in 56 of the pixels 11 arrayed in 16 rows and 16 columns. This implies that the effective brightness of the subpixels 14 of color k of the 16×16 pixels 11 is substantially 22% of the allowed maximum brightness in the displayed image. As thus discussed, the eight-color halftoning of the present embodiment effectively achieves the gamma characteristics of a gamma value of 2.2, which matches the characteristics of the liquid crystal display panel 3. The column (d) of FIG. 5A illustrates one example of an image obtained by the eight-color halftoning of the present embodiment. As is understood from the column (d) of FIG. 5A, the eight-color halftoning of the present embodiment allows obtaining an image having substantially the same brightness as the original image illustrated in the column (a) of FIG. 5A.

As thus described, the eight-color halftoning of the present embodiment based on dithering allows obtaining a quality-improved image which represents the spatial changes in the graylevel. The eight-color halftoning of the present embodiment further achieve matching of the gamma characteristics of the controller driver 4 as a whole with the characteristics of the liquid crystal display panel 3, since the image data $D_{IN}$ are subjected to the gamma correction to obtain corrected image data $D_{GAMMA}$ and dithering is performed on the corrected image data $D_{GAMMA}$. This implies that the eight-color halftoning of the present embodiment allows displaying an image having substantially the same brightness as the original image on the liquid crystal display panel 3.

Although embodiments of eight-color halftoning are described in the above, attention should be paid to the fact that the problem that the gamma characteristics setting of the source line driver circuit 24 through the adjustment of the grayscale voltages does not work also applies to color reduction processing which truncates an increased number of bits from image data. Also in the case when image data that represent the graylevel of each subpixel 14 with eight bits are color-reduced to image data that represent the graylevel of each subpixel 14 with two bits, for example, the gamma characteristics cannot be sufficiently controlled by adjusting the grayscale voltages, because only four of the positive grayscale voltages and four of the negative grayscale voltages are used.

Also with respect to color reduction reducing an increased number of bits from image data other than eight-color halftoning, it is effective to perform a gamma correction by the brightness calculation sections 41R, 41G and 41B and subsequently perform dithering by the dithering sections 43R, 43G and 43B. In this case, in one embodiment, the brightness calculation sections 41R, 41G and 41B performs a gamma correction on the R data $D_{IN}^{R}$, G data $D_{IN}^{G}$ and B data $D_{IN}^{B}$ of the image data $D_{IN}$ to thereby generate corrected R data $D_{GAMMA}^{R}$, corrected G data $D_{GAMMA}^{G}$ and corrected B data $D_{GAMMA}^{B}$ which represent the graylevel of each subpixel 14 with m bits. The dithering sections 43R, 43G and 43B perform dithering on the corrected R data $D_{GAMMA}^{R}$, corrected G data $D_{GAMMA}^{G}$ and corrected B data $D_{GAMMA}^{B}$ with a dither value $D_{DITHER}$ of n bits, n being an integer from two to m, to thereby generate processed R data $D_{OUT}^{R}$, processed G data $D_{OUT}^{G}$ and processed B data $D_{OUT}$.

It should be noted however that the approach of the present embodiment, which involves a gamma correction and subsequent dithering, are especially useful for eight-color halftoning, since the eight-color halftoning severely suffers from the problem that the setting of the gamma characteristics of the source line driver circuit 24 with the grayscale voltages does not work effectively.

Second Embodiment

Figure 9:
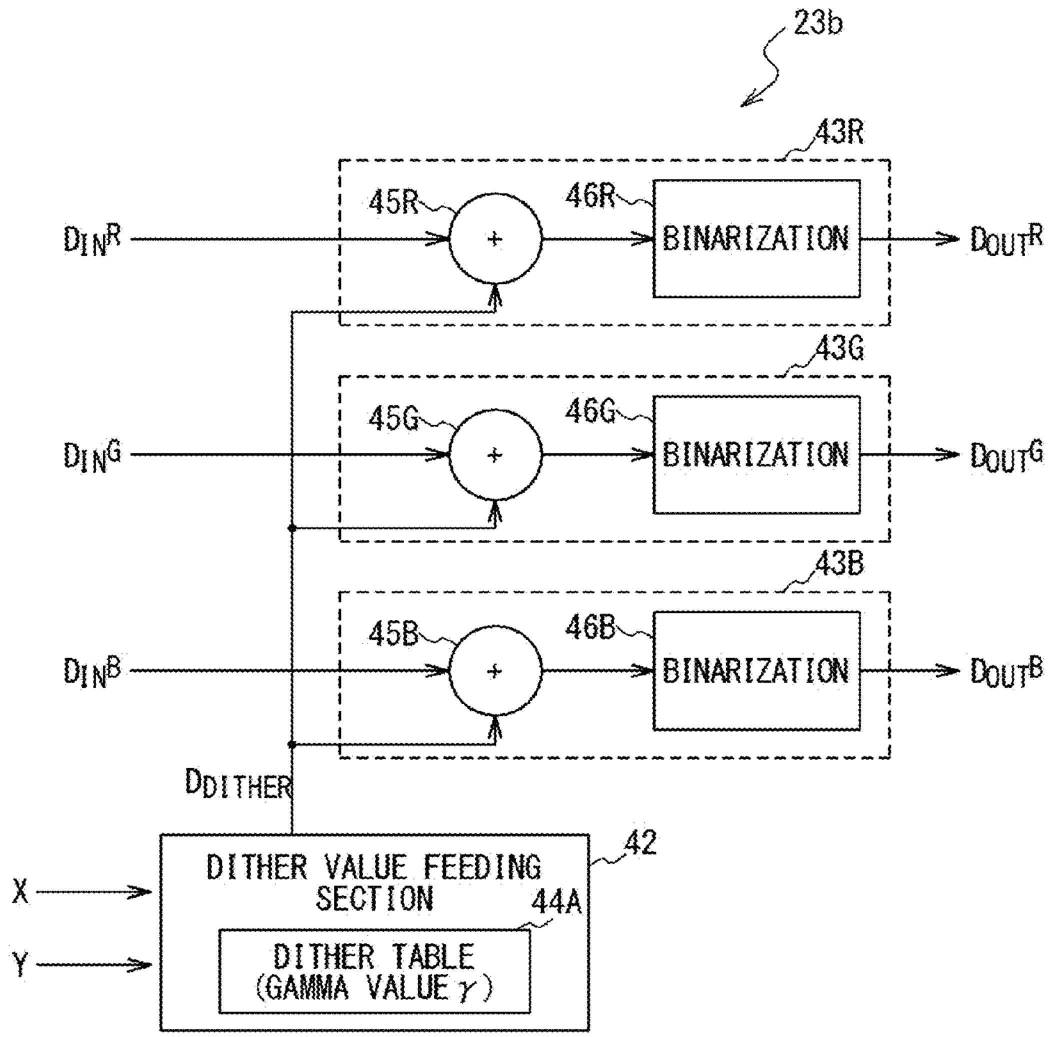
FIG. 9 is a block diagram illustrating an exemplary configuration of a display device in a second embodiment.

FIG. 9 is a block diagram illustrating an exemplary configuration of an eight-color halftoning circuit section in a second embodiment. In FIG. 9, the eight-color halftoning circuit section is denoted by the numeral 23*b*. In the second embodiment, eight-color halftoning is achieved by the eight-color halftoning circuit section 23*b* in a different way from that in the first embodiment.

The eight-color halftoning circuit section 23*b* includes a dither value feeding section 42 and dithering sections 43R, 43G and 43B. The dither value feeding section 42 includes a dither table 44A and selects a dither value $D_{DITHER}$ from the elements of the dither table 44A in response to the addresses X and Y of the target pixel (the pixel 11 of interest of the eight-color halftoning). The dither table 44A includes 16×16 elements and each element takes a value from "0" to "255". It should be noted however that, as described later in detail, two of the elements of the dither table 44A may take the same value in the present embodiment.

The dithering sections 43R, 43G and 43B respectively perform dithering on the R data $D_{IN}^{R}$, G data $D_{IN}^{G}$ and B data $D_{IN}^{B}$ of the image data $D_{IN}$ to generate processed R data $D_{OUT}^{R}$, processed G data $D_{OUT}^{G}$, and processed B data $D_{OUT}^{B}$, respectively. It should be noted that the eight-color halftoning circuit section 23*b* illustrated in FIG. 9 fails to include the brightness calculation sections 41R, 41G and 41B, differently from the eight-color halftoning circuit section 23*a* illustrated in FIG. 6. The R data $D_{IN}^{R}$, G data $D_{IN}^{G}$ and B data $D_{IN}^{B}$ of the image data $D_{IN}$ are supplied to the adders 45R, 45G and 45B of the dithering sections 43R, 43G and 43B, respectively.

The adder 45R performs an addition of the R data $D_{IN}^{R}$, the most significant bit MSB$[D_{IN}^{R}]$ of the R data $D_{IN}^{R}$ and the dither value $D_{DITHER}$ received from the dither value feeding section 42. The binarization circuit 46R determines the value of the processed R data $D_{OUT}^{R}$ depending on whether or not a carry occurs in the addition performed by the adder 45R. When a carry occurs in the addition performed by the adder 45R, the binarization circuit 46R sets the processed R data $D_{OUT}^{R}$ to a value of "1", and otherwise to a value of "0".

The adder 45G performs an addition of the G data $D_{IN}^{G}$, the most significant bit MSB $[D_{IN}^{G}]$ of the G data $D_{IN}^{G}$ and the dither value $D_{DITHER}$ received from the dither value feeding section 42. The binarization circuit 46G determines the value of the processed G data $D_{OUT}^{G}$ depending on whether or not a carry occurs in the addition performed by the adder 45G. When a carry occurs in the addition performed by the adder 45G, the binarization circuit 46G sets the processed G data $D_{OUT}^{G}$ to a value of "1", and otherwise to a value of "0".

The adder 45B performs an addition of the B data $D_{IN}^{B}$, the most significant bit MSB$[D_{IN}^{B}]$ of the B data $D_{IN}^{B}$ and the dither value $D_{DITHER}$ received from the dither value feeding section 42. The binarization circuit 46B determines the value of the processed B data $D_{OUT}^{B}$ depending on whether or not a carry occurs in the addition performed by the adder 45B. When a carry occurs in the addition performed by the adder 45B, the binarization circuit 46B sets the processed B data $D_{OUT}^{B}$ to a value of "1", and otherwise to a value of "0".

The eight-color halftoning circuit section 23*b* illustrated in FIG. 9, instead of incorporating the brightness calculation sections 41R, 41G and 41B, achieves eight-color halftoning with gamma characteristics of a desired gamma value by properly determining the frequency distribution of the values of the elements of the dither table 44A contained in the dither value feeding section 42.

One discovery of the inventors is that it is possible to achieve various brightness corrections (e.g., a gamma correction and a contrast correction) through dithering with a dither table in which the frequency distribution of the values of elements is properly determined. In the following disclosure, the frequency distribution of the values of the elements of the dither table means the distribution of the number N(p) of elements which take a value of p. In general, a dither table (dither matrix) used in dithering is determined so that the number of elements taking each of the allowed values is one, that is, N(p)=1 for any p. For a 16×16 dither table including 256 elements, for example, the values of the 256 elements are determined as different values from 0 to 255 in general. As discussed above, dithering with a thus-configured dither table exhibits gamma characteristics of a gamma value of one. On the other hand, using a dither table with an uneven frequency distribution (that is, a dither table in which the number N(p) of the elements of a value of p depends on p) allows performing various image processing concurrently with the dithering. It should be noted that, when the frequency distribution is uneven, this implies that there exist integers $p_1$ and $p_2$ from 0 to $2^k-1$ for which the number $N(p_1)$ of the elements of the value of $p_1$ in the dither table is different from the number $N(p_2)$ of the elements of the value of $p_2$.

Discussed below is the case when eight-color halftoning is performed on image data that represent the graylevel of each subpixel 14 with m bits, through dithering with an m-bit dither value. More specifically, discussed below is the case when the "turn-on" and "turn-off" of a specific subpixel 14 is determined depending on occurrence of a carry in the addition to calculate the sum $D_{IN}^{k}$+MSB $[D_{IN}^{k}]+D_{DITHER}$. In this case, if the values of the respective elements of the dither table are determined so that the following requirements (a) and (b) are satisfied for the allowed values of p of the image data $D_{IN}^{k}$ of the specific subpixel 14, the brightness of the specific subpixel 14 becomes q (that is, $q/(2^m-1)$ times of the allowed maximum brightness) in the displayed image:

Requirement (a): for $p<(2^m-1)/2$, q elements of $2^m$ elements of the dither table are equal to or larger than $2^m-p$, and Requirement (b): for $p>(2^m-1)/2$, q elements of $2^m$ elements of the dither table are equal to or larger than $2^m-p-1$. This scheme effectively allows achieving a desired brightness correction.

Discussed below is an example in which, for 8-bit image data $D_{IN}^{k}$ of a certain subpixel 14, the value of the image data $D_{IN}^{k}$ is 128 and the desired brightness of the subpixel 14 in the display image is (that is, 56/255 times of the allowed maximum brightness). In this case, it is possible to set the subpixel 14 to the desired brightness if the dither table is determined so that 56 elements of the 256 elements of the dither table have a value of 127 or more.

FIG. 10A illustrates one example of the values of the respective elements of the dither table 44A in the case when a gamma correction with a gamma value γ of 2.2 is performed. The dither table 44A is determined so that the above-described requirements (a) and (b) are satisfied when q is defined by the following expression (3):

$$q = \mathrm{floor}\left(255\left(\frac{p}{255}\right)^{2.2} + 0.5\right), \tag{3}$$

where floor(x) is the floor function, which is the largest integer less than or equal to x. The addition of a value of 0.5 and the floor function (x) are introduced only for rounding; a different rounding technique may be used instead.

More specifically, the dither table 44A illustrated in FIG. 10A is obtained by performing a transformation on the dither table 44 illustrated in FIG. 7 in accordance with the following expression (4):

$$\beta(i, j) = \mathrm{floor}\left[256 - 255 \cdot \left(\frac{\alpha(i, j)}{255}\right)^{(1/2.2)} + 0.5\right], \tag{4}$$

where α(i, j) is the value of the element in the i-th rows and j-th column of the dither table 44 illustrated in FIG. 7 and β(i, j) is the value of the element in the i-th rows and j-th column of the dither table 44A illustrated in FIG. 10A. As described above, floor(x) is the follow function, which is the largest integer less than or equal to x. The use of the dither table 44A illustrated in FIG. 10A allows the eight-color halftoning circuit section 23*b* illustrated in FIG. 9 to achieve a gamma correction with a gamma value γ of 2.2 concurrently with dithering.

In general, the dither table 44A for performing a gamma correction with a gamma value γ can be generated through the following procedure:

(1) Generate a first dither table in which the number of elements taking each allowed values is one (that is, N(p)=1 for any p), through a commonly-used method.

(2) Perform a transformation on the first dither table in accordance with the following expression (5):

$$\beta(i, j) = \mathrm{floor}\left[256 - 255 \cdot \left(\frac{\alpha(i, j)}{255}\right)^{(1/\gamma)} + 0.5\right], \tag{4}$$

where $\alpha(i, j)$ is the value of the element in the i-th row and the j-th column of the first dither table, and $\beta(i, j)$ is the value of the element in the i-th row and the j-th column of the second dither table obtained by this transformation.

Figure 10B:
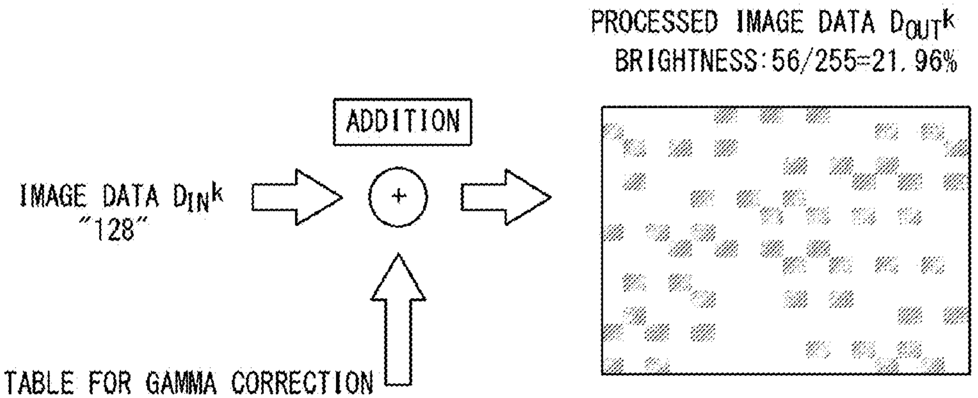
FIG. 10B is a diagram illustrating an exemplary operation of the eight-color halftoning circuit section in the second embodiment.

FIG. 10B illustrates one example of the eight-color halftoning of the present embodiment in the case when the value of image data $D_{IN}^k$ of a subpixel 14 of color k is 128. The eight-color halftoning illustrated in FIG. 10B also aims at achieving gamma characteristics of a gamma value of 2.2, which matches the characteristics of the liquid crystal display panel 3. As described above, in the gamma characteristics of the gamma value of 2.2, the brightness of the subpixel 14 becomes 22% of the allowed maximum brightness (≈56/255) when the value of the image data $D_{IN}^k$ is 128.

In the present embodiment, the addition of the image data $D_{IN}^k$, the most significant bit $MSB[D_{IN}^k]$ and the dither value $D_{DITHER}$ received from the dither value feeding section 42A is performed by the adder 45*k* and when a carry occurs in this addition, that is, when the sum of the image data $D_{IN}^k$, the most significant bit $MSB[D_{IN}^k]$ and the dither value $D_{DITHER}$ is 256 or more, the processed image data $D_{OUT}^k$ is calculated as a value of "1". When no carry occurs in this addition, that is, when the sum of the image data $D_{IN}^k$, the most significant bit $MSB[D_{IN}^k]$ and the dither value $D_{DITHER}$ is less than 256, the processed image data $D_{OUT}^k$ is calculated as a value of "0".

In the present embodiment, the dither value feeding section 42A selects the dither value $D_{DITHER}$ to be supplied to the adder 45*k* from the elements of the dither table 44A illustrated in FIG. 10A. As described above, the values of the respective elements of the dither table 44A illustrated in FIG. 10A are determined with a frequency distribution which achieves a gamma correction of a gamma value of 2.2.

Discussed below is the case when the above-described image processing is performed on image data $Din^k$ of the subpixels 14 of color k for 16×16 pixels 11. When the dither table 44A illustrated in FIG. 10A is used and the values of the image data $Din^k$ are 128, the processed image data $D_{OUT}^k$ are calculated as the value of "1" for 56 pixels of the 16×16 pixels. This is because a carry occurs in the addition performed by the adder 45*k* for 56 pixels of the 16×16 pixels, when the dither value $D_{DITHER}$ is selected from the elements of the dither table 44A illustrated in FIG. 10A. Accordingly, the subpixels 14 of color k are "turned on" in the 56 pixels of the 16×16 pixels 11. This implies that the effective brightness of the subpixels 14 of color k of the pixels 11 becomes 22% of the allowed maximum brightness in the displayed image. As thus discussed, the eight-color halftoning of the present embodiment also achieves the gamma characteristics of a gamma value of 2.2, which matches the characteristics of the liquid crystal display panel 3.

Figure 11:
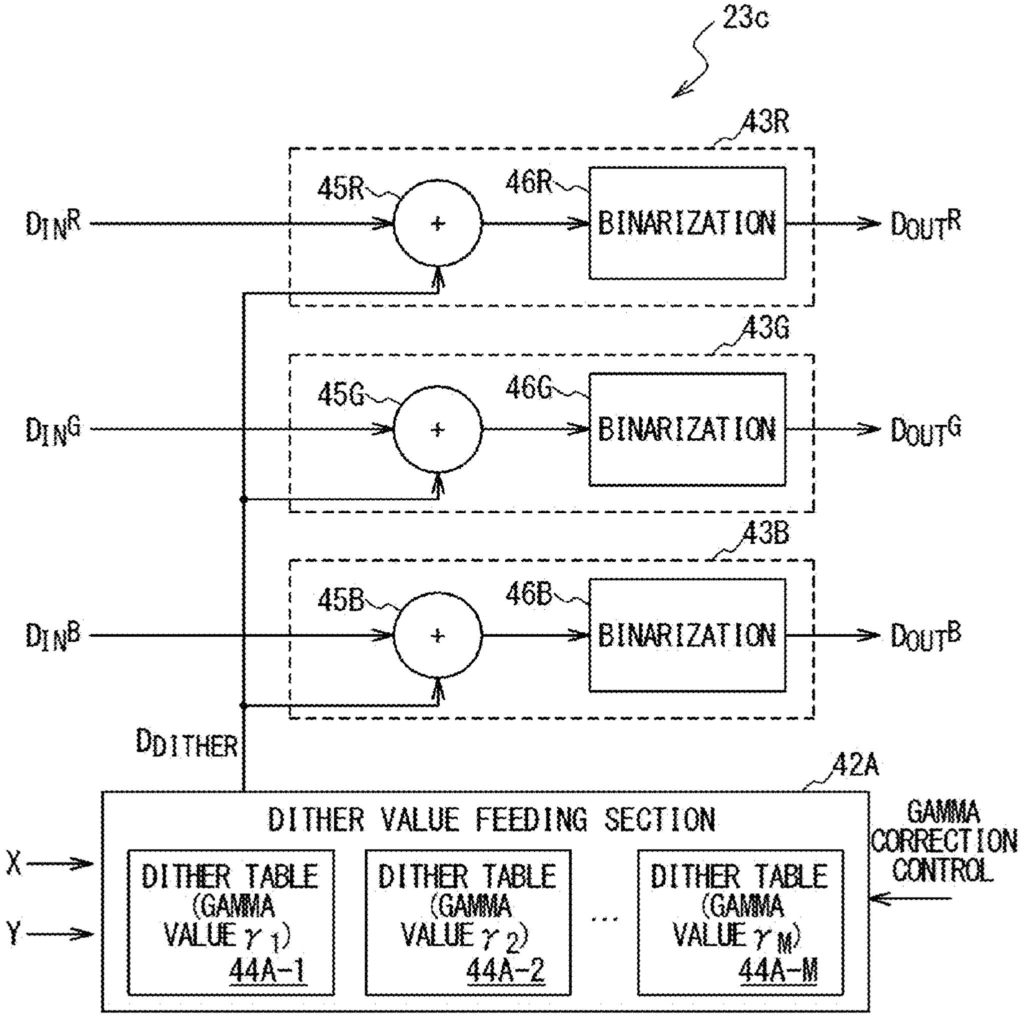
FIG. 11 is a block diagram illustrating another exemplary configuration of an eight-color halftoning circuit section of an image processing circuit in the second embodiment.

In an alternative embodiment, a plurality of dither tables corresponding to different gamma values are prepared and selected one of the dither tables is used to supply a dither value. In this case, the gamma value $\gamma$ can be switched by switching the dither table used to supply the dither value. FIG. 11 is a block diagram illustrating an exemplary configuration of an eight-color halftoning circuit section 23*c* thus configured.

The configuration of the eight-color halftoning circuit section 23*c* illustrated in FIG. 11 is similar to that of the eight-color halftoning circuit section 23*b* illustrated in FIG. 9. The difference is that a dither value feeding section 42A is used which contains a plurality of dither tables 44A-1 to 44A-M. The dither tables 44A-1 to 44A-M correspond to gamma values $\gamma_1$ to $\gamma_M$, respectively.

The dither value feeding section 42A receives a gamma correction control signal from the command control circuit 21 and selects a dither table corresponding to a gamma value specified by the gamma correction control signal from the dither table 44A-1 to 44A-M. For example, when a gamma value of $\gamma_t$ is specified by the gamma correction control signal, the dither value feeding section 42A selects the dither table 44A-t. The dither value feeding section 42A selects a dither value $D_{DITHER}$ from the elements of the selected dither table. The dither value $D_{DITHER}$ is selected from the elements of the selected dither table in response to the addresses X, Y of the target pixel (the pixel 11 of interest of the eight-color halftoning). The configuration of FIG. 11 allows switching the gamma value used in the gamma correction performed concurrently with the dithering.

Figure 12:
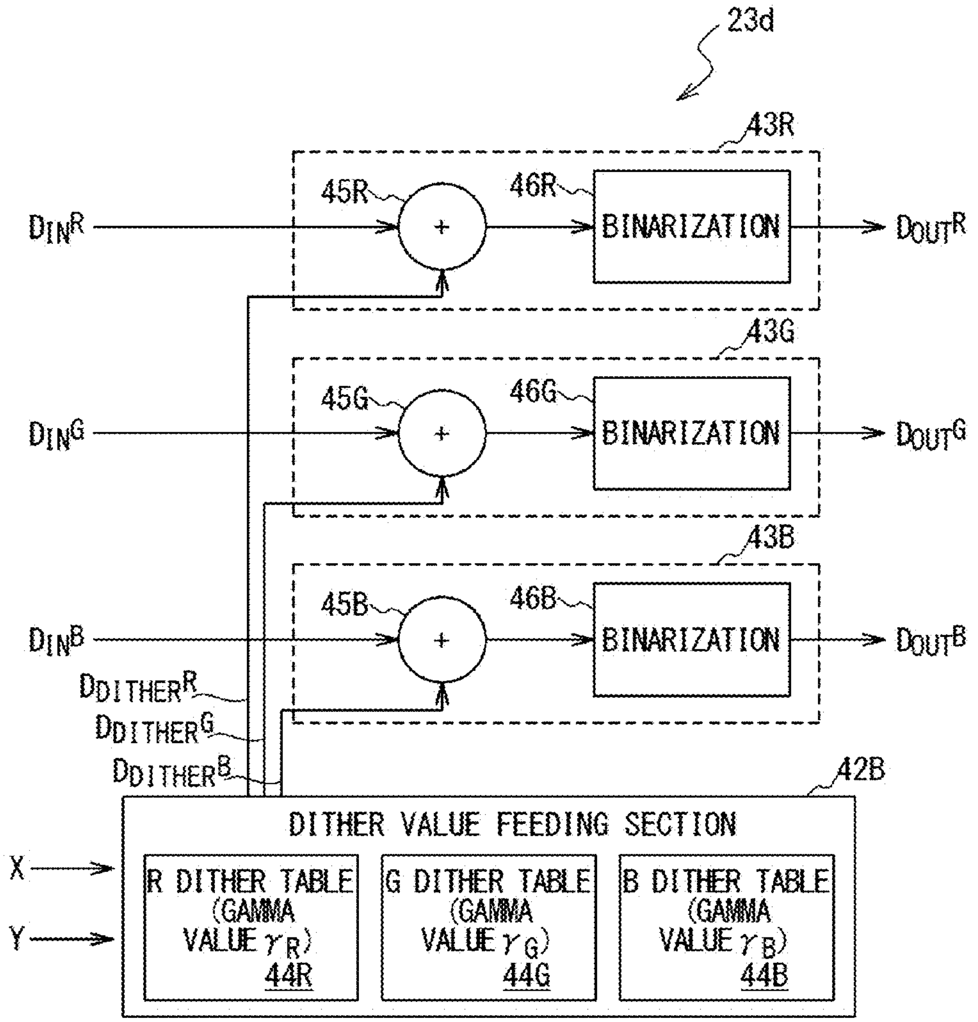
FIG. 12 is a block diagram illustrating still another exemplary configuration of an eight-color halftoning circuit section of an image processing circuit in the second embodiment.

In another alternative embodiment, dither tables are individually prepared for the respective colors and dither values are individually supplied to the dithering sections 43R, 43G and 43B. This allows individually setting the gamma values of the gamma corrections performed on image data $D_{IN}$ for the respective colors. FIG. 12 is a block diagram illustrating an exemplary configuration of an eight-color halftoning circuit section 23*d* thus configured.

The dither value feeding section 42B supplies dither values $D_{DITHER}^R$, $D_{DITHER}^G$, $D_{DITHER}^B$ to the dithering sections 43R, 43G and 43B, respectively. In the configuration illustrated in FIG. 12, the dither value feeding section 42B includes an R dither table 44R, G dither table 44G and B dither table 44B and uses these dither tables to supply the dither values $D_{DITHER}^R$, $D_{DITHER}^G$ and $D_{DITHER}^B$. The R dither table 44R, G dither table 44G and B dither table 44B correspond to gamma values $\gamma_R$, $\gamma_G$ and $\gamma_B$ of gamma corrections to be performed with respect to red (R), green (G) and blue (B), respectively.

The dither value feeding section 42B is responsive to the addresses X and Y of the target pixel (the pixel 11 of interest of the eight-color halftoning) for selecting the dither value $D_{DITHER}^R$ from the elements of the R dither table 44R, selecting the dither value $D_{DITHER}^G$ from the elements of the G dither table 44G and selecting the dither value $D_{DITHER}^B$ from the elements of the B dither table 44B.

The dithering sections 43R, 43G and 43B respectively perform dithering on the R data $D_{IN}^R$, G data $D_{IN}^G$ and B data $D_{IN}^B$ of the image data $D_{IN}$ by using the dither values $D_{DITHER}^R$, $D_{DITHER}^G$ and $D_{DITHER}^B$ received from the dither value feeding section 42B, respectively, to thereby generate processed R data $D_{OUT}^R$, processed G data $D_{OUT}^G$ and processed B data $D_{OUT}^B$, respectively.

In detail, the adder 45R of the dithering section 43R performs an addition of the R data $D_{IN}^R$, the most significant bit $MSB[D_{IN}^R]$ of the R data $D_{IN}^R$ and the dither value $D_{DITHER}^R$ received from the dither value feeding section 42B. The binarization circuit 46R determines the value of the processed R data $D_{OUT}^R$ depending on whether or not a carry occurs in the addition performed by the adder 45R. When a carry occurs in the addition performed by the adder 45R, the binarization circuit 46R sets the processed R data $D_{OUT}^R$ to a value of "1", and otherwise to a value of "0".

The adder 45G of the dithering section 43G performs an addition of the G data $D_{IN}^G$, the most significant bit $MSB[D_{IN}^G]$ of the G data $D_{IN}^G$ and the dither value $D_{DITHER}^G$ received from the dither value feeding section 42B. The binarization circuit 46G determines the value of the processed G data $D_{OUT}^G$ depending on whether or not a carry occurs in the addition performed by the adder 45G. When a carry occurs in the addition performed by the adder 45G, the binarization circuit 46G sets the processed G data $D_{OUT}^{G}$ to a value of "1", and otherwise to a value of "0".

The adder 45B of the dithering section 43B performs an addition of the B data $D_{IN}^{R}$, the most significant bit MSB $[D_{IN}^{B}]$ of the B data $D_{IN}^{B}$ and the dither value $D_{DITHER}^{B}$ received from the dither value feeding section 42B. The binarization circuit 46B determines the value of the processed B data $D_{OUT}^{B}$ depending on whether or not a carry occurs in the addition performed by the adder 45B. When a carry occurs in the addition performed by the adder 45B, the binarization circuit 46B sets the processed B data $D_{OUT}^{B}$ to a value of "1", and otherwise to a value of "0".

The eight-color halftoning circuit section 23*d* thus configured can perform gamma corrections on the image data $D_{IN}$ in accordance with the gamma values $\gamma_R$, $\gamma_G$ and $\gamma_B$, which are individually specified for the respective colors.

Figure 13:
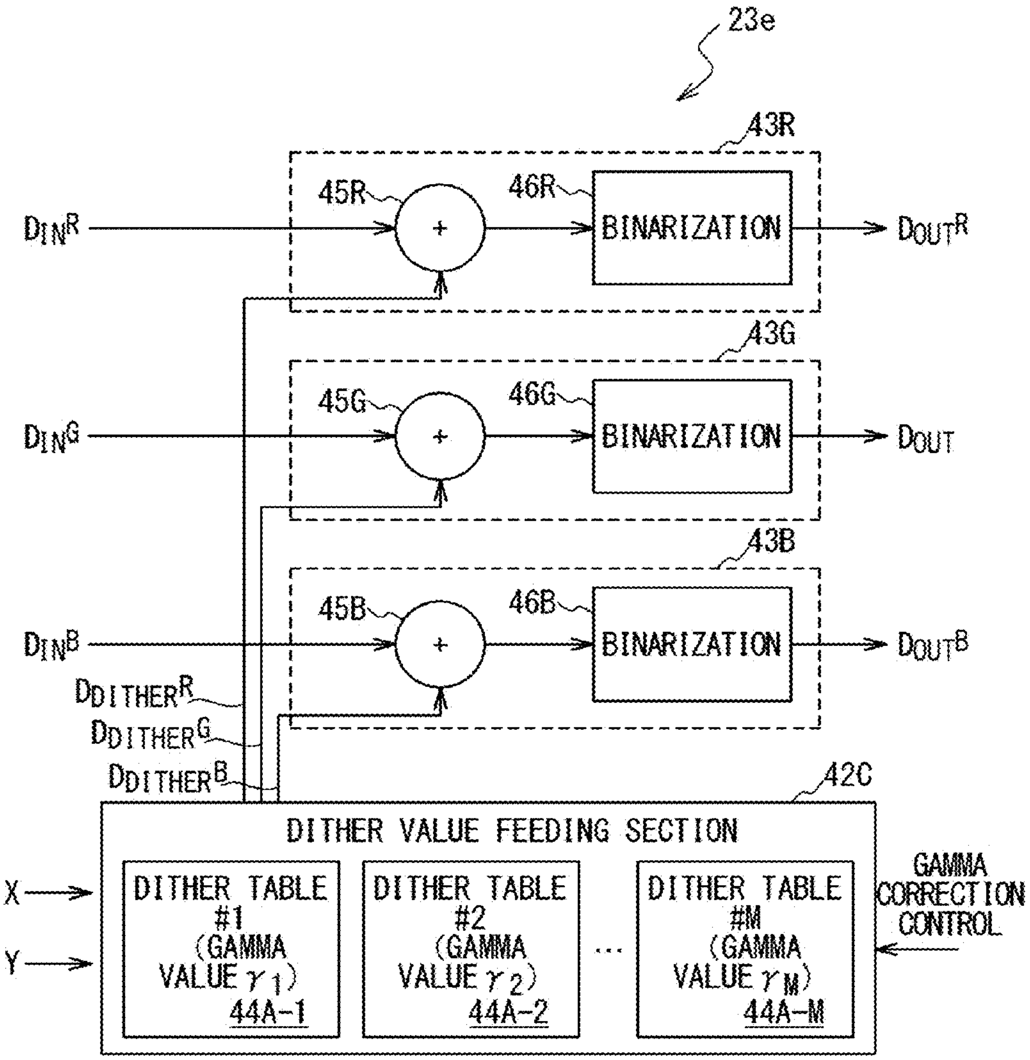
FIG. 13 is a block diagram illustrating still another exemplary configuration of an eight-color halftoning circuit section of an image processing circuit in the second embodiment.

Each of the dither tables used to generate the dither values $D_{DITHER}^{R}$, $D_{DITHER}^{G}$ and $D_{DITHER}^{B}$ may be selected from a plurality of dither tables. FIG. 13 is a block diagram illustrating an exemplary configuration of an eight-color halftoning circuit section 23*e* thus configured. The configuration of the eight-color halftoning circuit section 23*e* illustrated in FIG. 13 is almost similar to that of the eight-color halftoning circuit section 23*d* illustrated in FIG. 12. Also in the eight-color halftoning circuit section 23*e* illustrated in FIG. 13, a dither value feeding section 42C supplies dither values $D_{DITHER}^{R}$, $D_{DITHER}^{G}$ and $D_{DITHER}^{B}$, to the dithering sections 43R, 43G and 43B, respectively. The difference is that, in the eight-color halftoning circuit section 23*e* illustrated in FIG. 13, the dither value feeding section 42C selects one of the dither tables 44A-1 to 44A-M for each of the dither values $D_{DITHER}^{R}$, $D_{DITHER}^{G}$ and $D_{DITHER}^{B}$, and selects the dither values $D_{DITHER}^{R}$, $D_{DITHER}^{G}$ and $D_{DITHER}^{B}$ from the elements of the selected dither tables.

More specifically, the dither value feeding section 42C selects one of the plurality of dither tables 44A-1 to 44-M for each of red (R), green (G) and blue (B), in response to the gamma values $\gamma_R$, $\gamma_G$ and $\gamma_B$ of the gamma corrections to be performed for red (R), green (G) and blue (B), respectively. For red, for example, the dither value feeding section 42C selects a dither table corresponding to the gamma value $\gamma_R$ from the dither tables 44A-1 to 44A-M. The same goes for green and blue. The dither value feeding section 42C further selects the dither values $D_{DITHER}^{R}$, $D_{DITHER}^{G}$ and $D_{DITHER}^{B}$ from the dither tables selected for red, green and blue, respectively. The dither values $D_{DITHER}^{R}$, $D_{DITHER}^{G}$ and $D_{DITHER}^{B}$ are selected from the elements of the corresponding dither tables in response to the addresses X and Y of the target pixel (the pixel of interest of the eight-color halftoning). Such configuration allows individually setting and switching the gamma values γ of the gamma corrections of image data $D_{IN}$ for the respective colors.

Although embodiments of eight-color halftoning are specifically described in the above, attention should be paid to the fact that the problem that the gamma characteristics setting of the source line driver circuit 24 through the adjustment of the grayscale voltages does not work generally applies to color reduction processing which truncates an increased number of bits from image data. Also with respect to color reduction reducing an increased number of bits from image data other than eight-color halftoning, it is effective to perform dithering in the dithering sections 43R, 43G and 43B by using a dither table generated so as to achieve a gamma correction. In this case, in one embodiment, the dithering sections 43R, 43G and 43B perform dithering on the R data $D_{IN}^{R}$, G data $D_{IN}^{G}$ and B data $D_{IN}^{B}$ which represent the graylevels of the respective subpixels 14 with m bits, by using a dither value $D_{DITHER}$ of n bits, n being an integer from two to m. It should be noted however that the approach of the present embodiment, which involves gamma correction and dithering with a dither table having a properly-determined frequency distribution, are especially useful for eight-color halftoning, since the eight-color halftoning severely suffers from the problem that the setting of the gamma characteristics of the source line driver circuit 24 with the grayscale voltages does not work effectively.

Although the above-described disclosure is directed to gamma correction, various image processing, including contrast corrections, may be achieved in general by properly determining the frequency distribution of the values of the elements of a dither table. Especially, when a dither table including elements of m-bit values is used to accommodate m-bit image data $D_{IN}^{k}$ (that is, when n is equal to m), it is possible to achieve desired image processing by preparing the dither table so as to satisfy the following requirements:

Requirement (a): for $p<(2^m-1)/2$, f(q) elements of $2^m$ elements of the dither table are equal to or larger than $2^m-p$, and Requirement (b): for $p>(2^m-1)/2$, f(q) elements of $2^m$ elements of the dither table are equal to or larger than $2^m-p-1$, where f(p) is the desired brightness of a subpixel 14 of color k in the displayed image in the case when the graylevel of the subpixel 14 is specified as p in the image data $D_{IN}^{k}$. It should be noted that f(p) is the function corresponding to the desired image processing.

Figure 14:
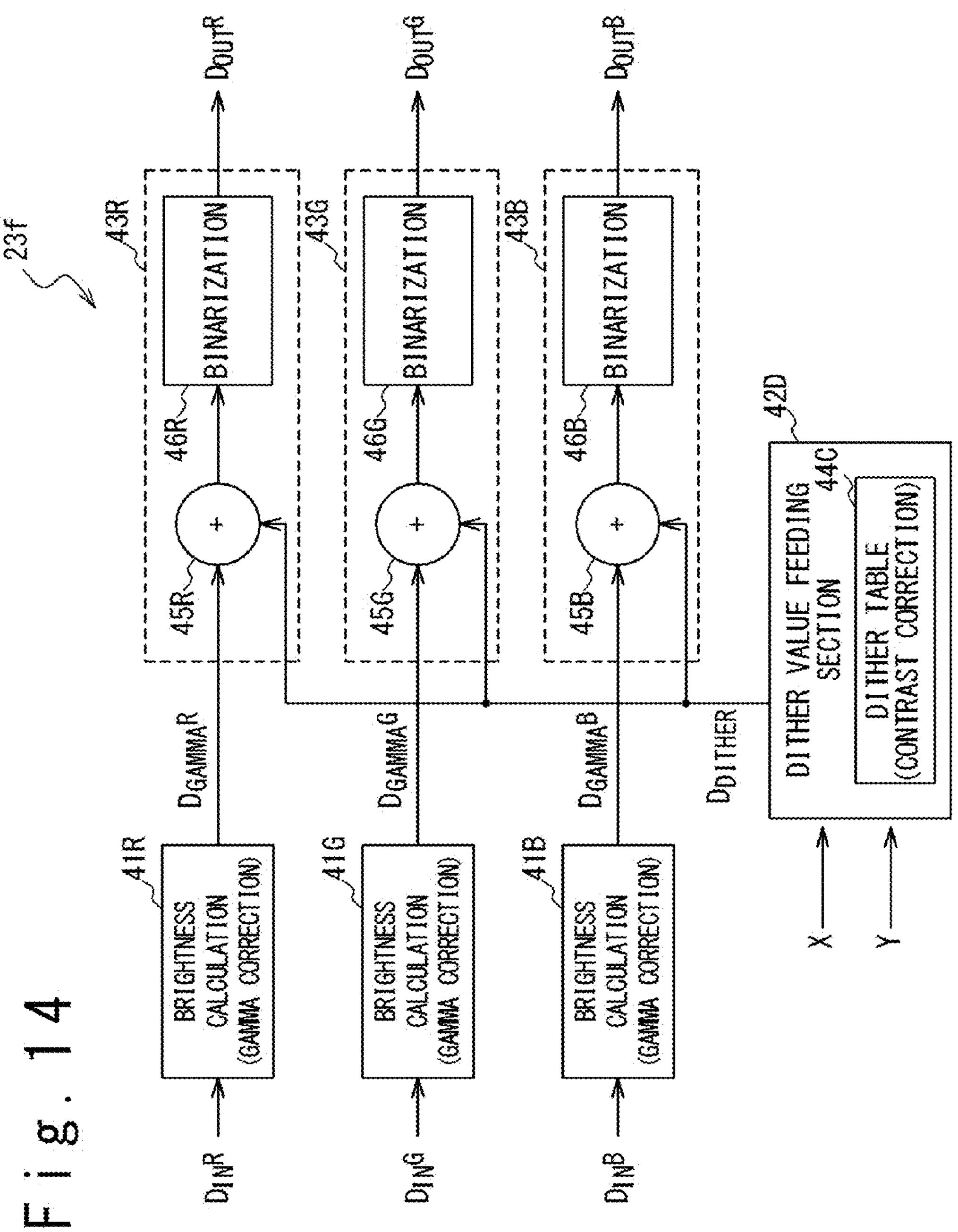
FIG. 14 is a block diagram illustrating still another exemplary configuration of an eight-color halftoning circuit section of an image processing circuit in the second embodiment.

In one embodiment, a gamma correction may be performed by the brightness calculation sections 41R, 41G and 41B while a contrast correction is achieved concurrently with the dithering performed by the dithering sections 43R, 43G and 43B. FIG. 14 is a block diagram illustrating an exemplary configuration of an eight-color halftoning circuit section 23*f* thus configured. The eight-color halftoning circuit section 23*f* illustrated in FIG. 14 is configured similarly to the eight-color halftoning circuit section 23*a* illustrated in FIG. 6. The difference is that the eight-color halftoning circuit section 23*f* illustrated in FIG. 14 includes a dither value feeding section 42D containing a dither table 44C adapted to a contrast correction. The dither value feeding section 42D selects the dither value $D_{DITHER}$ from the elements of the dither table 44C in response to the addresses X and Y of the target pixel (the pixel 11 of interest of the eight-color halftoning).

Figure 15:
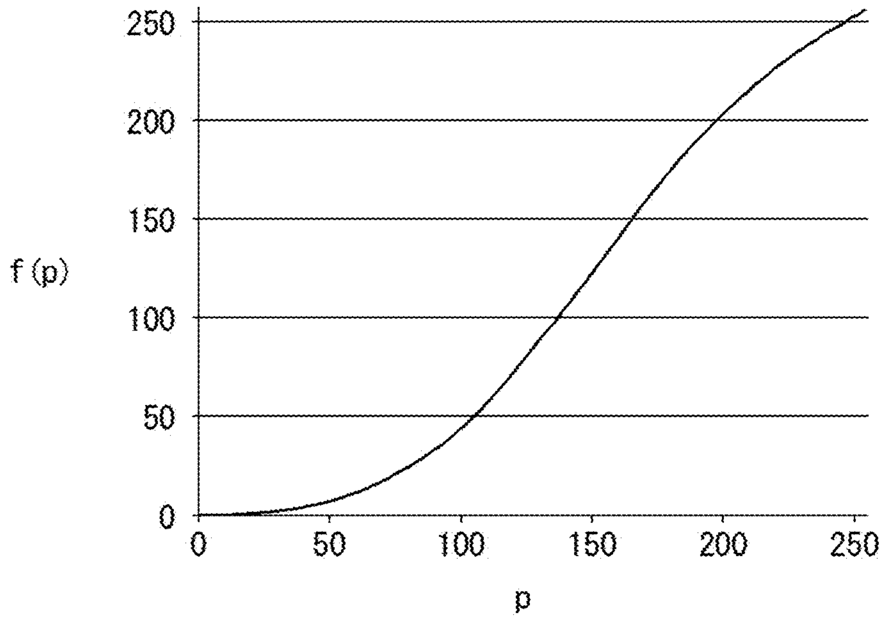
FIG. 15 illustrates one example of a graph of a function f(p) used for a contrast correction.

For example, a contrast correction can be achieved by using a dither table 44C determined so as to satisfy the above-described requirements (a) and (b) defined with the function f(p), the graph of which is illustrated in FIG. 15. It should be noted that the function f(p) may be specified with a lookup table in the generation of the dither table 44C in an actual implementation. FIG. 16 conceptually illustrates the contents of the dither table 44C defined with the function f(p) illustrated in FIG. 15. The use of the dither table 44C illustrated in FIG. 16 allows achieving a contrast correction concurrently with dithering.

Figure 17:
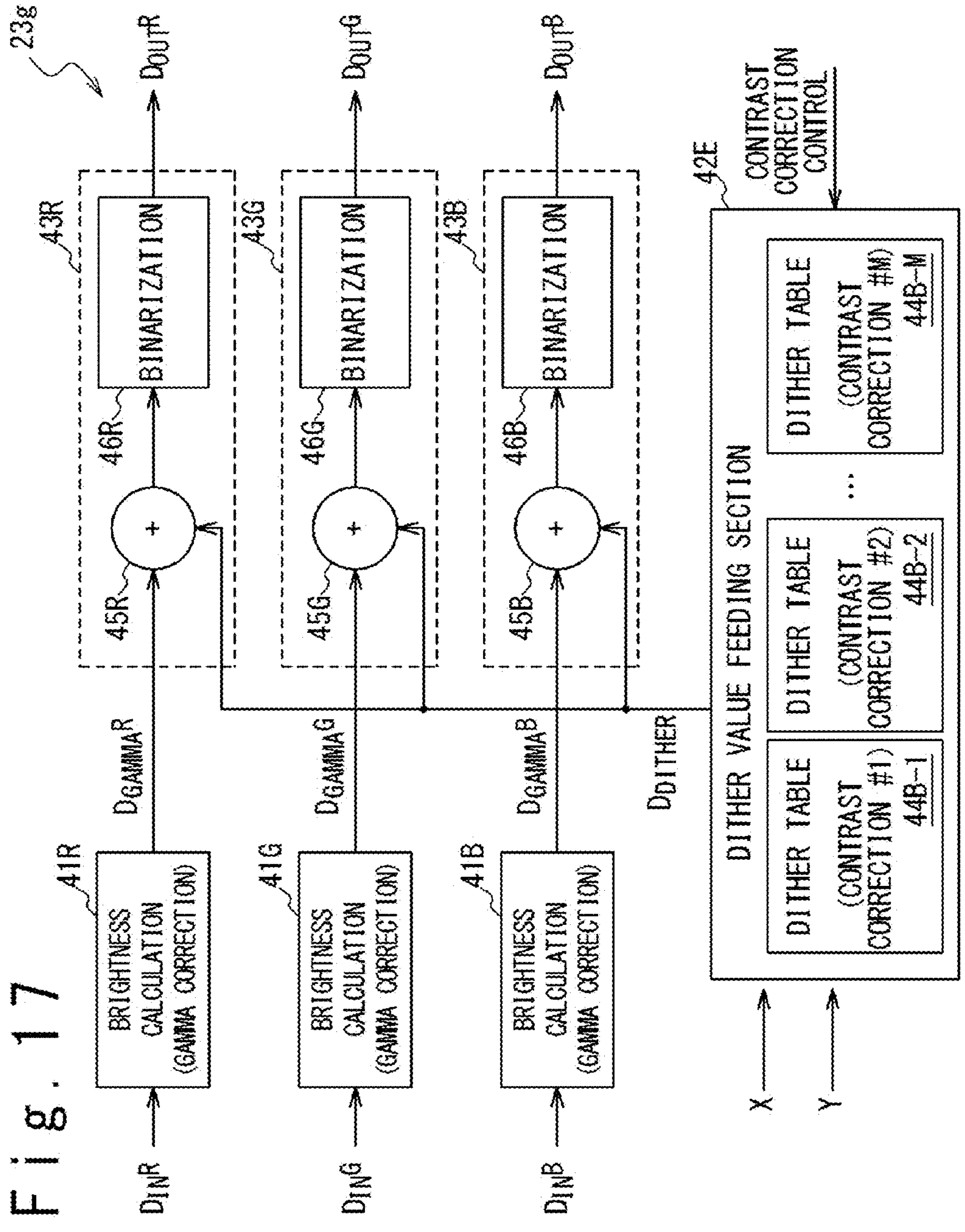
FIG. 17 is a block diagram illustrating an exemplary configuration of an eight-color halftoning circuit section configured to perform a contrast correction in the second embodiment.

In the configuration illustrated in FIG. 14, it is possible to switch the contrast correction by preparing a plurality of dither tables corresponding to contrast corrections specified by functions, the graphs of which are different in the shape, and selecting a desired one of the prepared dither tables. FIG. 17 is a block diagram illustrating an exemplary configuration of an eight-color halftoning circuit section 23*g*.

The configuration of the eight-color halftoning circuit section 23*g* illustrated in FIG. 17 is almost similar to that of the eight-color halftoning circuit section 23*f* illustrated in FIG. 14. The difference is that the eight-color halftoning circuit section 23*g* includes a dither value feeding section 42E containing a plurality of dither tables 44C-1 to 44C-M, which correspond to different contrast corrections #1 to #M. The dither value feeding section 42E receives a contrast correction control signal from the command control circuit 21 and selects the dither table corresponding to the contrast correction specified by the contrast correction control signal from the dither tables 44C-1 to 44C-M. For example, when contrast correction #t is specified by the contrast correction control signal, the dither value feeding section 42E selects the dither table 44C-t. The dither value feeding section 42E selects the dither value $D_{DITHER}$ from the elements of the selected dither table. The dither value $D_{DITHER}$ is selected from the selected dither table in response to the addresses X and Y of the target pixel (the pixel 11 of interest of the eight-color halftoning). This configuration allows switching the contrast correction when the contrast correction is achieved concurrently with the dithering.

Figure 18:
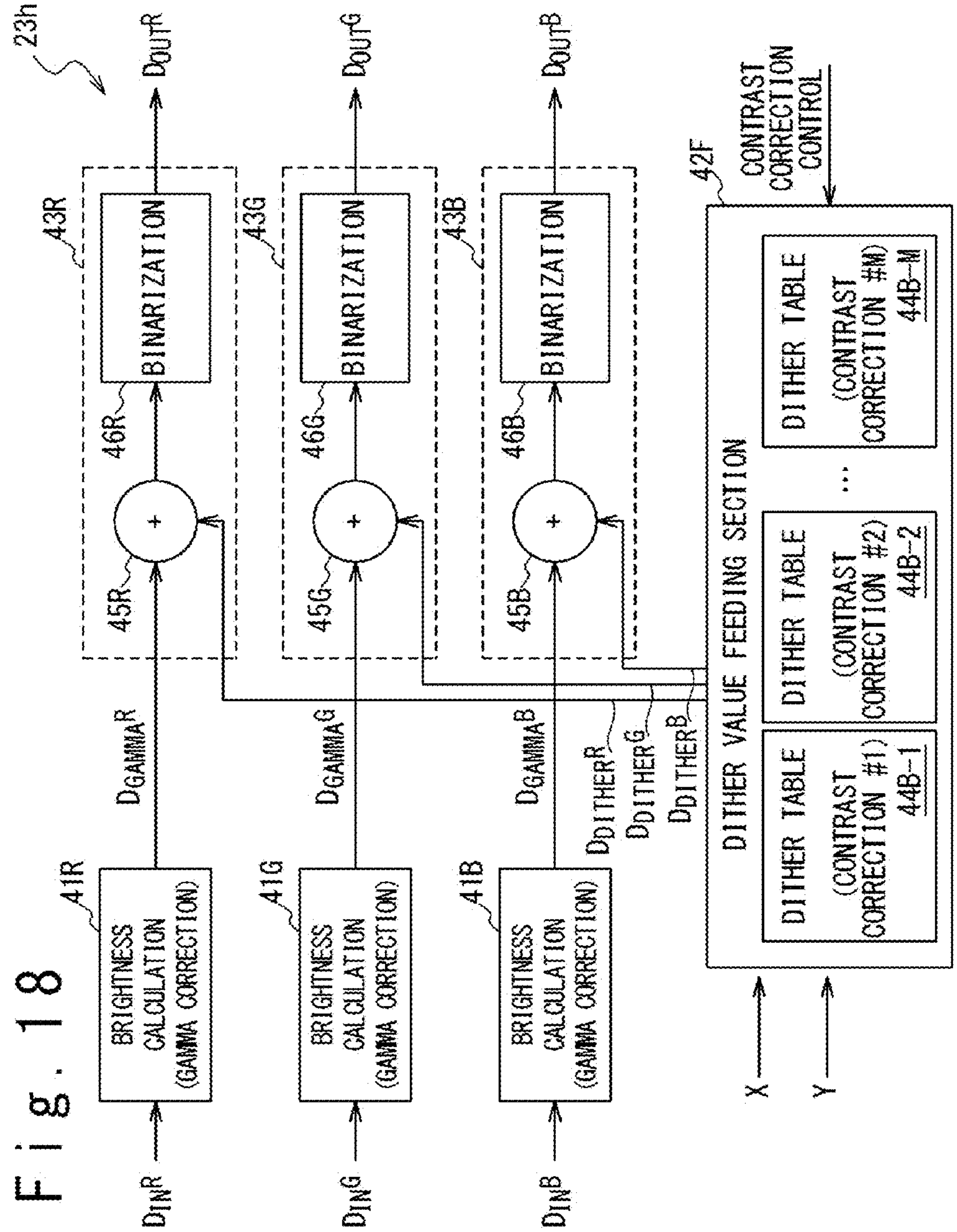
FIG. 18 is a block diagram illustrating another exemplary configuration of an eight-color halftoning circuit section configured to perform a contrast correction in the second embodiment.

In an alternative embodiment, the contrast correction may be individually configured for each color by individually selecting a dither table for each color and individually supplying a dither value generated by using the selected dither table to each of the dithering sections 43R, 43G and 43B. FIG. 18 is a block diagram illustrating an exemplary configuration of an eight-color halftoning circuit section 23*h* thus configured. The configuration of the eight-color halftoning circuit section 23*h* illustrated in FIG. 18 is almost similar to that of the eight-color halftoning circuit section 23*g* illustrated in FIG. 17.

The difference is that the eight-color halftoning circuit section 23*h* illustrated in FIG. 18 is configured to supply the dither values $D_{DITHER}^{R}$, $D_{DITHER}^{G}$ and $D_{DITHER}^{B}$ to the dithering sections 43R, 43G and 43B, respectively. In detail, in the eight-color halftoning circuit section 23*h* illustrated in FIG. 18, the dither value feeding section 42F contains dither tables 44C-1 to 44C-M and supplies the dither values $D_{DITHER}^{R}$, $D_{DITHER}^{G}$ and $D_{DITHER}^{B}$ by using these dither tables.

The dither value feeding section 42F selects a dither table specified by the contrast correction control signal for each of red, green and blue from the dither tables 44C-1 to 44C-M. The dither value feeding section 42F further selects the dither values $D_{DITHER}^{R}$, $D_{DITHER}^{G}$ and $D_{DITHER}^{B}$ from the dither tables selected for red, green and blue, respectively. The dither values $D_{DITHER}^{R}$, $D_{DITHER}^{G}$, and $D_{DITHER}^{B}$ are respectively selected from the elements of the corresponding dither tables in response to the addresses X and Y of the target pixel (the pixel 11 of interest of the eight-color halftoning). This configuration allows individually setting and switching the contrast correction for each color.

Third Embodiment

In the first and second embodiments, eight-color halftoning (or many-bit color reduction) is achieved through dithering to represent the changes in the graylevel in a pseudo manner. This effectively improves the image quality.

One issue of the eight-color halftoning through dithering is an increase in the power consumption due to large variations in the voltages on the respective source lines 13. As described above, each subpixel 14 is "turned on" or "turned off" in the eight-color halftoning. Since dithering represents the graylevel in a pseudo manner by spatially distributing the "turned-on" subpixels 14, an increased number of "turned-on" subpixels 14 are positioned adjacent to "turned-off" subpixels 14, especially when an intermediate graylevel is displayed. When a "turned-on" subpixel 14 is positioned adjacent to a "turned-off" subpixel 14 and these subpixels 14 are connected with the same source line 13, this requires driving the source line 13 from the voltage corresponding to the allowed lowest graylevel to that corresponding to the allowed highest graylevel or vice versa. This implies that the power consumption is increased.

In the present embodiment, as discussed later in detail, the values of elements of a dither table are determined so as to suppress an increase in the power consumption due to dithering. In the following, a description is given of the contents of a dither table used in the present embodiment. It should be noted that, in the following description, pixels 11 arrayed in one column in the direction in which the source lines 13 are extended (that is, the Y-axis direction) may be collectively referred to as a "pixel column". According to this notation, the address X of each pixel 11 specifies the pixel column in which each pixel 11 is positioned.

Figure 19:
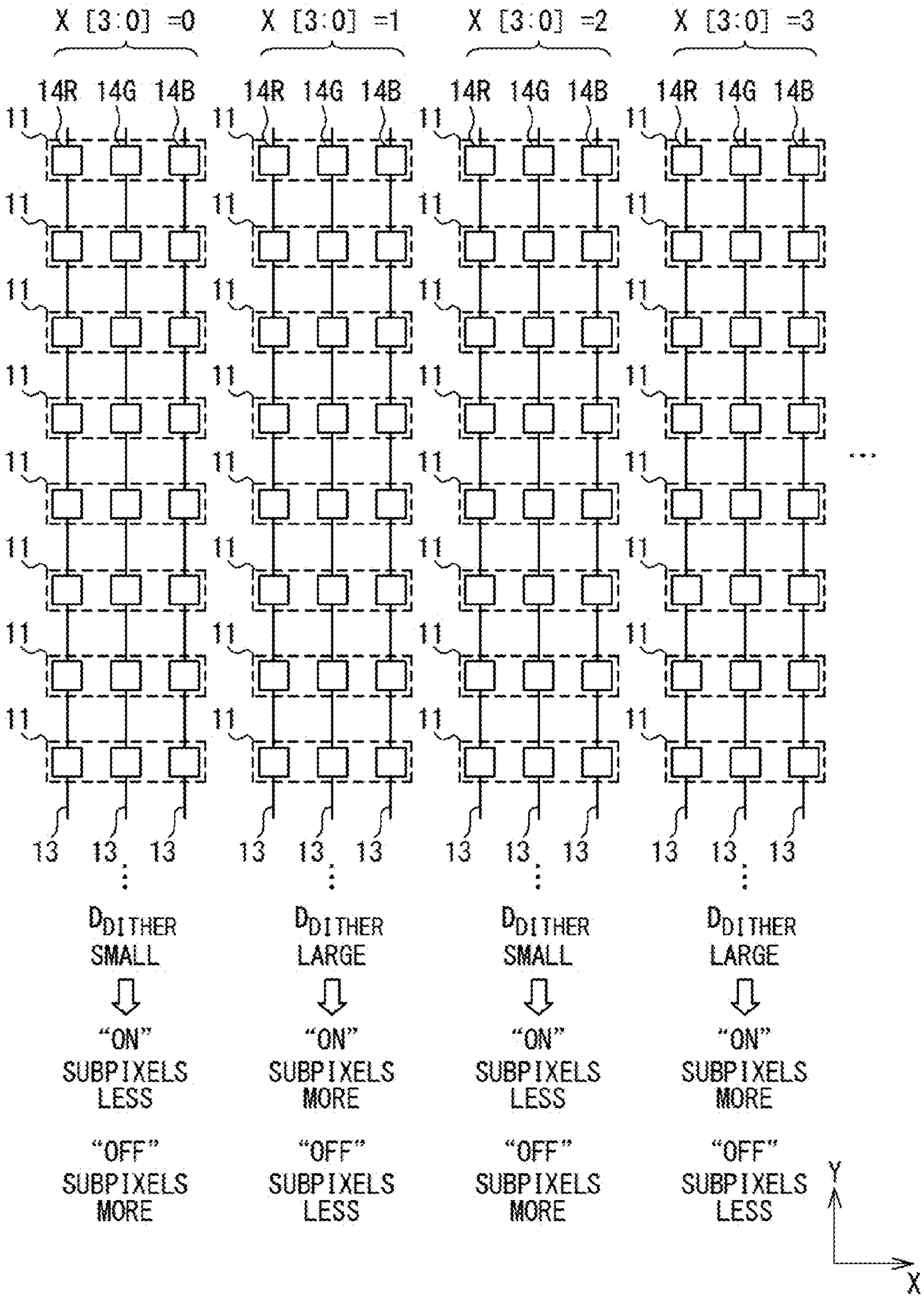
FIG. 19 is a diagram illustrating pixel columns associated with addresses X for which the values of the lower four bits X[3:0] are from zero to three, and one example of dither values used for dithering performed on image data of the subpixels of the pixel columns.

FIG. 19 is a diagram illustrating selection of the dither values $D_{DITHER}$ for each pixel column in the present embodiment. Illustrated in FIG. 19 are pixel columns associated with lower four bits X[3:0] of the address X from 0 to 3. In the present embodiment, as illustrated in FIG. 19, all the elements in one of adjacent two columns (first column) of a dither table belong to a half of $2^n$ elements of the dither table having smaller values, and all the elements in the other of the adjacent two columns (second column) belong to the other half of the $2^n$ elements having larger values. In FIG. 19, a pixel column for which dither values $D_{DITHER}$ are selected from the half of the elements having smaller values is denoted by the legend "$D_{DITHER}$ SMALL" and a pixel column for which dither values $D_{DITHER}$ are selected from the other half of the elements having larger values is denoted by the legend "$D_{DITHER}$ LARGE"

In this configuration, many of subpixels 14 of pixels 11 in the pixel column for which dither values are selected from the elements in the one of the adjacent two columns (the first column) of the dither table are "turned off" and many of subpixels 14 of pixels 11 in the pixel column for which dither values are selected form the elements in the other of the adjacent two columns (the second column) are "turned on". In this case, a decreased number of "turned-on" subpixels 14 are adjacent to "turned-off" subpixels 14 with respect to each source line 13. This reduces the number of times of driving each source line 13 from the voltage corresponding to the lowest graylevel to the voltage corresponding to the highest graylevel and vice versa, thereby reducing the power consumption.

It should be noted that memory elements storing the respective values of the elements of the dither table are not necessarily spatially (or physically) arrayed in rows and columns in an actual implementation. In this application, a "column" of a dither table does not necessarily mean a column in a physical or special arrangement, but a group of elements associated with the same address X. In the following, a description is given of examples of a dither table for which the values of respective elements are determined as described above.

FIG. 20 is a diagram illustrating contents of the dither table 44 for reducing the power consumption in the case when the eight-color halftoning circuit section 23*a* illustrated in FIG. 6 is used. The dither table 44 illustrated in FIG. 20 includes 16×16 elements and the value of the element selected by the lower four bits X[3:0] of the address X and lower four bits Y[3:0] of the address Y is supplied to the dithering sections 43R, 43G and 43B as the dither value $D_{DITHER}$. The number of bits of the dither value $D_{DITHER}$ is eight and the 256 elements of the dither table 44 take different values from 0 to 255. As described above, dithering using the dither table 44 thus configured corresponds to gamma characteristics of a gamma value γ of one.

In the dither table 44 illustrated in FIG. 20, all the elements in the columns corresponding to addresses X for which the values of the lower four bits [3:0] are even numbers (that is, the least significant bit is "0") belong to a half of the 256 elements having smaller values, and all the elements in the columns corresponding to addresses X for which the values of the lower four bits [3:0] are odd numbers (that is, the least significant bit is "1") belong to the other half of the 256 elements having larger values. For example, the values of the elements in the column corresponding to the address X for which the value of the lower four bits X[3:0] is 0 are 0, 71, 110, 5, 83, . . . , 105, respectively, which all belong to the half of the elements of the dither table 44 having smaller values. Meanwhile, the values of the elements in the column corresponding to the address X for which the value of the lower four bits X[3:0] is 1 are 159, 216, 241, 154, . . . , 246, respectively, which all belong to the other half of the elements of the dither table 44 having larger values. It should be noted that the dither table 44 illustrated in FIG. 20 may be obtained by rearranging the elements of the dither table 44 illustrated in FIG. 6.

When dithering is performed with the dither table 44 thus configured, an increased number of subpixels 14 of the pixels 11 in pixel columns corresponding to addresses X for which the values of the lower four bits X[3:0] are even numbers are "turned off" and an increased number of subpixels 14 of the pixels 11 in pixel columns corresponding to addresses X for which the values of the lower four bits X[3:0] are odd numbers are "turned on". Accordingly, the number of times of driving each source line 13 from the voltage corresponding to the lowest graylevel to the voltage corresponding to the highest graylevel and vice versa is reduced and this effectively reduces the power consumption.

In an alternative embodiment, all the elements in the columns of the dither table 44 corresponding to addresses X for which the values of the lower four bits [3:0] are even numbers (that is, the least significant bit is "0") belong to a half of the 256 elements having large values, and all the elements in the columns corresponding to addresses X for which the values of the lower four bits [3:0] are odd numbers (that is, the least significant bit is "1") belong to the other half of the 256 elements having smaller values. Also in this case, the power consumption is reduced due to the same principle.

FIG. 21 is a diagram illustrating contents of the dither table 44A for reducing the power consumption in the case when the eight-color halftoning circuit section 23*b* illustrated in FIG. 9 is used. The number of bits of the dither value $D_{DITHER}$ is eight and the 256 elements of the dither table 44A each take a value from 0 to 255. The frequency distribution of the values of the elements of the dither table 44A is determined so as to achieve dithering corresponding to a gamma correction with a gamma value γ of 2.2.

In the dither table 44A illustrated in FIG. 21, all the elements in the columns corresponding to addresses X for which the values of the lower four bits [3:0] are even numbers (that is, the least significant bit is "0") belong to a half of the 256 elements having smaller values, and all the elements in the columns corresponding to addresses X for which the values of the lower four bits [3:0] are odd numbers (that is, the least significant bit is "1") belong to the other half of the 256 elements having larger values. It should be noted that the dither table 44A illustrated in FIG. 21 may be obtained by rearranging the elements of the dither table 44A illustrated in FIG. 10A.

When dithering is performed with the dither table 44A thus configured, an increased number of subpixels 14 of the pixels 11 in pixel columns corresponding to addresses X for which the values of the lower four bits X[3:0] are even numbers are "turned off" and an increased number of subpixels 14 of the pixels 11 in the pixel columns corresponding to addresses X for which the values of the lower four bits X[3:0] are odd numbers are "turned on". Accordingly, the number of times of driving each source line 13 from the voltage corresponding to the lowest graylevel to the voltage corresponding to the highest graylevel and vice versa is reduced and this effectively reduces the power consumption.

In an alternative embodiment, all the elements in the columns of the dither table 44A corresponding to addresses X for which the values of the lower four bits [3:0] are even numbers (that is, the least significant bit is "0") belong to a half of the 256 elements having large values, and all the elements in the columns corresponding to addresses X of the dither table 44A for which the values of the lower four bits [3:0] are odd numbers (that is, the least significant bit is "1") belong to the other half of the 256 elements having smaller values. Also in this case, the power consumption is reduced due to the same principle.

Also with respect to the eight-color halftoning circuit sections 23*c*, 23*d* and 23*e* illustrated in FIGS. 11, 12 and 13, respectively, it is possible to reduce the power consumption by determining the values of the elements of the dither tables 44A-1 to 44A-M, 44R, 44G and 44B in the same way.

FIG. 22 is a diagram illustrating contents of the dither table 44C for reducing the power consumption in the case when the eight-color halftoning circuit section 23*f* illustrated in FIG. 14 is used. The number of bits of the dither value $D_{DITHER}$ is eight and the 256 elements of the dither table 44C each take a value from 0 to 255. The frequency distribution of the values of the elements of the dither table 44C is determined so as to achieve dithering corresponding to a contrast correction in accordance with the function f(p) illustrated in FIG. 15.

In the dither table 44C illustrated in FIG. 22, all the elements in the columns corresponding to addresses X for which the values of the lower four bits [3:0] are even numbers (that is, the least significant bit is "0") belong to a half of the 256 elements having smaller values, and all the elements in the columns corresponding to addresses X for which the values of the lower four bits [3:0] are odd numbers (that is, the least significant bit is "1") belong to the other half of the 256 elements having larger values. It should be noted that the dither table 44C illustrated in FIG. 22 may be obtained by rearranging the elements of the dither table 44C illustrated in FIG. 16.

When dithering is performed with the dither table 44C thus configured, an increased number of subpixels 14 of the pixels 11 in the pixel columns corresponding to addresses X for which the values of the lower four bits X[3:0] are even numbers are "turned off" and an increased number of subpixels 14 of the pixels 11 in the pixel columns corresponding to addresses X for which the values of the lower four bits X[3:0] are odd numbers are "turned on". Accordingly, the number of times of driving each source line 13 from the voltage corresponding to the lowest graylevel to the voltage corresponding to the highest graylevel and vice versa is reduced and this effectively reduces the power consumption.

In an alternative embodiment, all the elements in the columns of the dither table 44C corresponding to addresses X for which the values of the lower four bits [3:0] are even numbers (that is, the least significant bit is "0") belong to a half of the 256 elements having large values, and all the elements in the columns of the dither table 44C corresponding to addresses X for which the values of the lower four bits [3:0] are odd numbers (that is, the least significant bit is "1") belong to the other half of the 256 elements having smaller values. Also in this case, the power consumption is reduced due to the same principle.

Also with respect to the eight-color halftoning circuit sections 23*g* and 23*h* illustrated in FIGS. 17 and 18, respectively, it is possible to reduce the power consumption by determining the values of the elements of the dither tables 44C-1 to 44C-M in the same way.

It should be noted that performing a gamma correction is not necessarily required in the present embodiment in view of power consumption reduction. Even in the case when the brightness calculation sections 41R, 41G and 41B are removed from the configuration illustrated in FIG. 6, for example, an improved image quality can be achieved to some extent by performing dithering by the dithering sections 43R, 43G and 43B. Also in this case, the power consumption can be effectively reduced by determining the values of the respective elements of the dither table so that all the elements in one of adjacent two columns (first column) of a dither table belong to a half of $2^n$ elements of the dither table having smaller values, and all the elements in the other of the adjacent two columns (second column) belong to the other half of the $2^n$ elements having larger values.

Fourth Embodiment

As discussed in the third embodiment, the power consumption can be effectively reduced by the approach in which the values of the respective elements of the dither table are determined so that all the elements in one of adjacent two columns (first column) of a dither table belong to a half of $2^n$ elements of the dither table having smaller values, and all the elements in the other of the adjacent two columns (second column) belong to the other half of the $2^n$ elements having larger values. When this approach is combined with a column inversion driving method, however, the average voltage level of the source lines 13 over the liquid crystal display panel 3 may become largely different from the common level $V_{COM}$ (the voltage level on the common electrode) of the liquid crystal display panel 3. This is not preferable since it may cause flickering. Flickering is easy to be observed especially when the leakage current of the liquid crystal display panel 3 is large.

Figure 23:
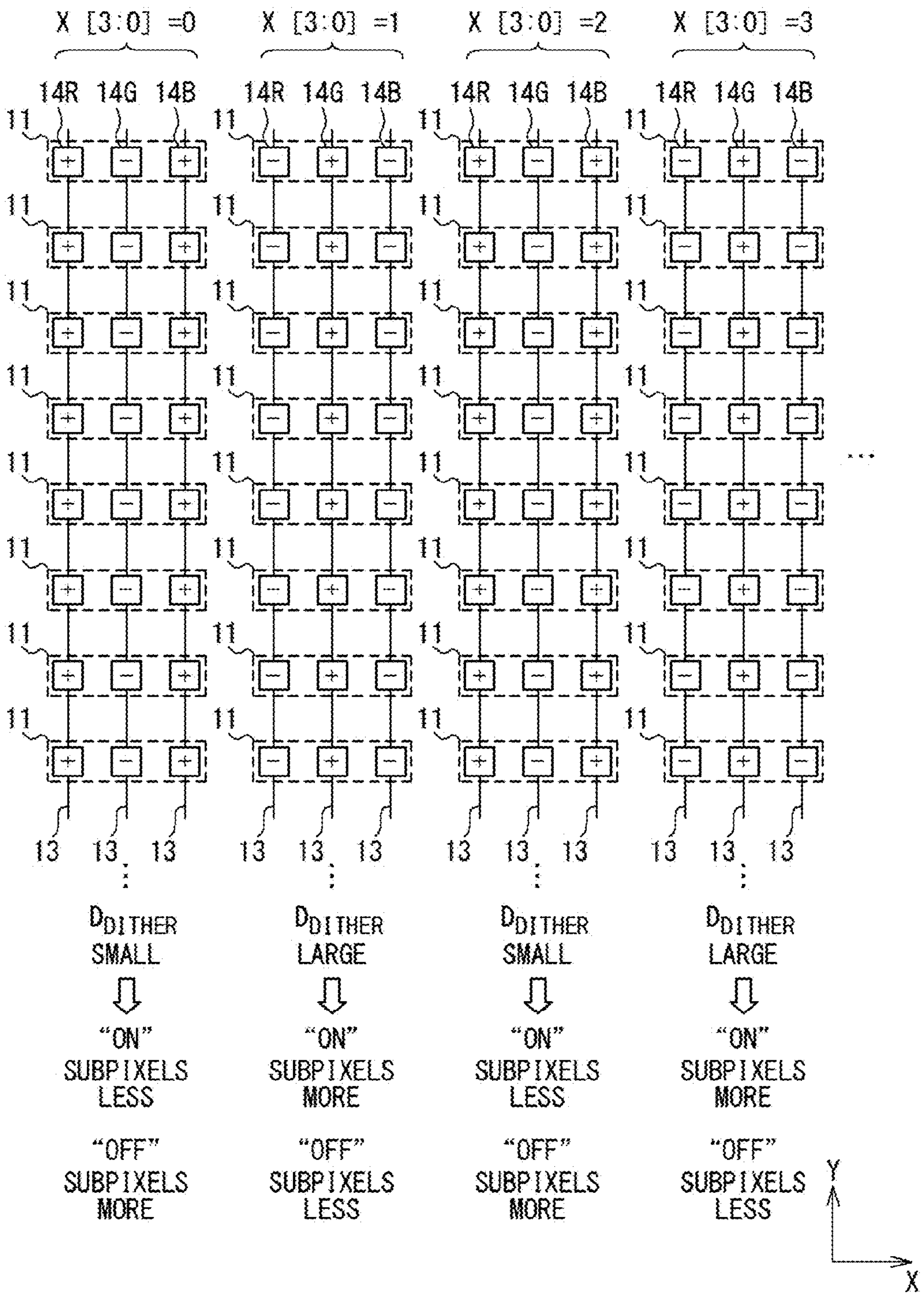
FIG. 23 is a diagram illustrating one example in which the average voltage level of the source lines over the liquid crystal display panel has become largely different from the voltage level on the common electrode of the liquid crystal display panel.

FIG. 23 is a diagram illustrating one example in which the average voltage level of the source lines 13 over the liquid crystal display panel 3 has become largely different from the common level $V_{COM}$ (the voltage level on the common electrode) of the liquid crystal display panel 3.

When a column inversion driving method is used, subpixels 14 connected to adjacent source lines 13 are driven with drive voltages of opposite polarities. In FIG. 23, for example, the subpixels 14 connected to the odd-numbered source lines 13 from the left are driven with positive drive voltages, and the subpixels 14 connected to the even-numbered source lines 13 are driven with negative drive voltages.

Meanwhile, when the values of the respective elements of the dither table are determined so that all the elements in one of adjacent two columns (first column) of a dither table belong to a half of $2^n$ elements of the dither table having smaller values, and all the elements in the other of the adjacent two columns (second column) belong to the other half of the $2^n$ elements having larger values, an increased number of subpixels 14 of the pixels 11 belonging to the one of the adjacent two pixel columns are "turned on", while an increased number of subpixels 14 of the pixels 11 belonging to the other of the adjacent two pixel columns are "turned off". In the example illustrated in FIG. 23, for example, a reduced number of subpixels 14 are turned on with respect to the pixels 11 belonging to the pixel columns corresponding to the addresses X for which the values of the low lower four bits X[3:0] are "0" and "2" and an increased number of subpixels 14 are turned on with respect to the pixels 11 belonging to the pixel columns corresponding to the addresses X for which the values of the low lower four bits X[3:0] are "1" and "3".

This undesirably causes a large difference between the number of the subpixels 14 driven with positive drive voltages out of the "turned on" subpixels 14 and the number of the subpixels 14 driven with negative drive voltages. In the example illustrated in FIG. 23, with respect to the pixel columns corresponding to the addresses X for which the values of the lower four bits X[3:0] are "0" and "2", an decreased number of subpixels 14 are "turned-on" while an increased number of subpixels 14 are driven with positive drive voltages. With respect to the pixel columns corresponding to the addresses X for which the values of the lower four bits X[3:0] are "1" and "3", on the other hand, an increased number of subpixels 14 are "turned-on" while an increased number of subpixels 14 are driven with negative drive voltages. As a result, the number of subpixels 14 driven with negative drive voltages out of the "turned-on" subpixels 14 becomes larger than the number of subpixels 14 driven with positive drive voltages. This means that the average voltage level of the source lines 13 over the liquid crystal display panel 3 is lower than the common level $V_{COM}$ (the voltage level on the common electrode) of the liquid crystal display panel.

Figure 24:
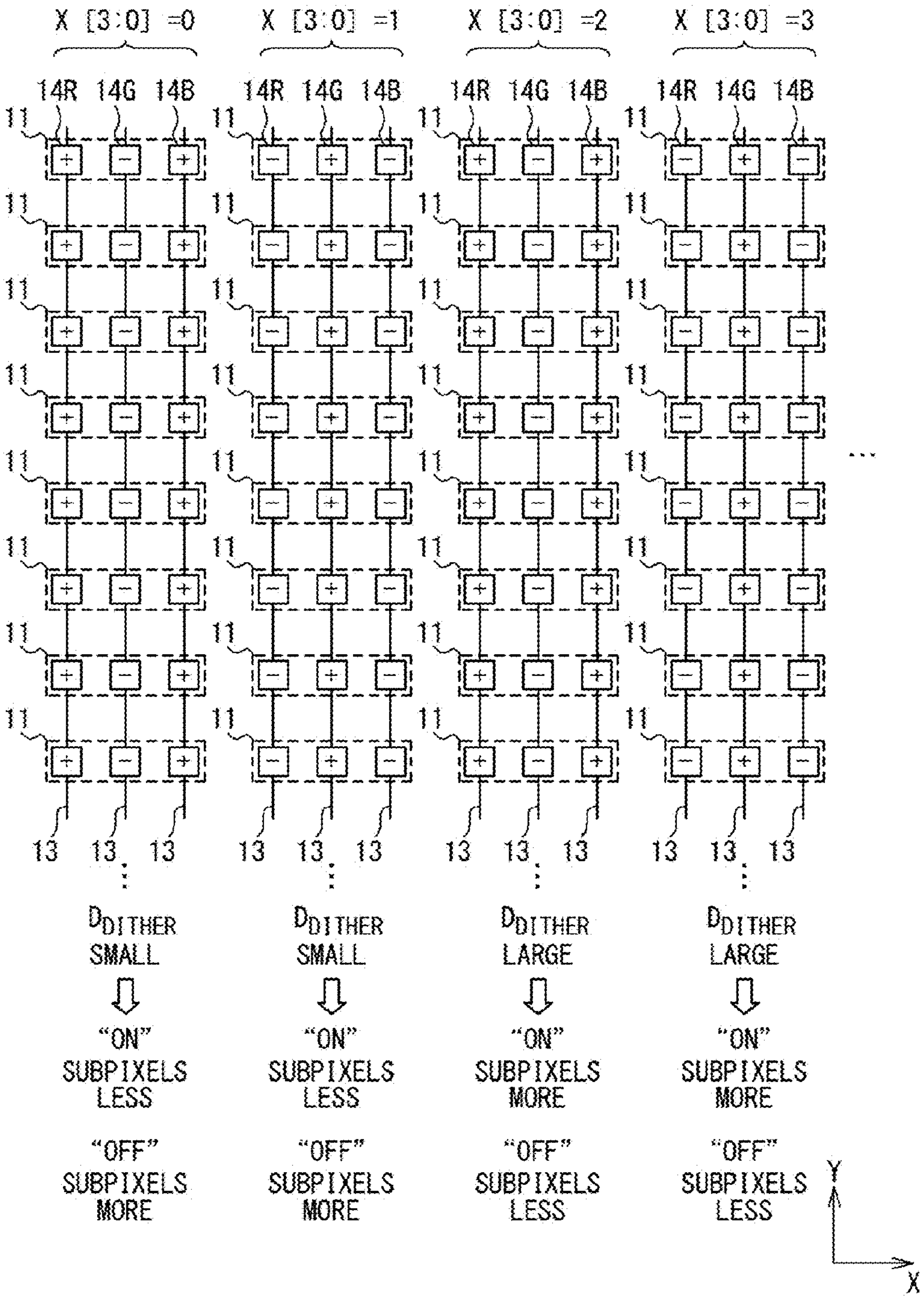
FIG. 24 is a diagram illustrating an exemplary operation in which a column inversion driving method is used while dithering is performed with a dither table configured so that two columns in which all the elements belong to a half of the elements of the dither table having smaller values and two columns in which all the elements belong to the other half of the elements of the dither table having larger values are alternately repeated.

To address this problem, in the present embodiment, a dither table is used which is configured so that two columns in which all the elements belong to a half of the elements of the dither table having smaller values and two columns in which all the elements belong to the other half of the elements of the dither table having larger values are alternately repeated. FIG. 24 is a diagram illustrating an example of the operation in which dithering is performed with a dither table thus configured, in combination with a column inversion driving method.

In the example illustrated in FIG. 24, a dither table is used which is configured so that all the elements in adjacent two columns corresponding to the addresses X for which the values of the lower four bits X[3:0] are "0" and "1" belong to a half of the elements of the dither table having smaller values, and all the elements in adjacent two columns corresponding to the addresses X for which the values of the lower four bits X[3:0] are "2" and "3" belong to the other half of the elements of the dither table having larger values; specific examples of such dither tables will be described later. In this case, the dither values $D_{DITHER}$ used in the dithering are reduced for the subpixels 14 of the pixels 11 in the pixel columns corresponding to the addresses X for which the values of the lower four bits X[3:0] are "0" and "1". As a result, a decreased number of subpixels 14 are "turned on" in the pixel columns corresponding to the addresses X for which the values of the lower four bits X[3:0] are "0" and "1", while an increased number of subpixels 14 are "turned on" in the pixel columns corresponding to the addresses X for which the values of the lower four bits X[3:0] are "2" and "3".

Meanwhile, subpixels 14 connected to adjacent source lines 13 are driven with drive voltages of opposite polarities. In FIG. 24, for example, the subpixels 14 connected to the odd-numbered source lines 13 from the left are driven with positive drive voltages, and the subpixels 14 connected to the even-numbered source lines 13 from the left are driven with negative drive voltages.

As a result, the difference between the number of subpixels 14 driven with positive drive voltages of the "turned-on" subpixels 14 and the number of subpixels 14 driven with negative drive voltages of the "turned-on" subpixels 14 is reduced. In the example illustrated in FIG. 24, with respect to the pixel columns corresponding to the addresses X for which the values of the lower four bits X[3:0] are "0" and "1", subpixels 14 connected to three source lines 13 are driven with positive drive voltages and subpixels 14 connected to the other three source lines 13 are driven with negative drive voltages. In this case, only a decreased number of subpixels 14 are "turned on" in the pixel columns corresponding to the addresses X for which the values of the lower four bits X[3:0] are "0" and "1", while the number of the subpixels 14 driven with positive drive voltages of the "turned-on" subpixels 14 is almost same as that of the subpixels 14 driven with negative drive voltages.

A similar discussion applies to the pixel columns corresponding to the addresses X for which the values of the lower four bits X[3:0] are "2" and "3". Also with respect to the pixel columns corresponding to the addresses X for which the values of the lower four bits X[3:0] are "2" and "3", subpixels 14 connected to three source lines 13 are driven with positive drive voltages and subpixels 14 connected to the other three source lines 13 are driven with negative drive voltages. An increased number of subpixels 14 are "turned on" in the pixel columns corresponding to the addresses X for which the values of the lower four bits X[3:0] are "2" and "3", while the number of the subpixels 14 driven with positive drive voltages of the "turned-on" subpixels 14 is almost same as that of the subpixels 14 driven with negative drive voltages.

Accordingly, the average voltage level on the source lines 13 over the liquid crystal display panel 3 is hard to become largely different from the common level $V_{COM}$ (the voltage level on the common electrode) of the liquid crystal display panel 3, even when a column inversion driving method is used.

FIGS. 25 to 27 illustrate specific examples of contents of dither tables for which the average voltage level on the source lines 13 over the liquid crystal display panel 3 is hard to become largely different from the common level $V_{COM}$ (the voltage level on the common electrode) of the liquid crystal display panel 3, even when a column inversion driving method is used.

FIG. 25 is a diagram illustrating contents of a dither table 44 when the eight-color halftoning circuit section 23*a* illustrated in FIG. 6 is used. The dither table 44 illustrated in FIG. 25 includes 16×16 elements and the value of the element selected by the lower four bits X[3:0] of the address X and the lower four bits Y[3:0] of the address Y is supplied to the dithering sections 43R, 43G and 43B as the dither value $D_{DITHER}$. The number of bits of the dither value $D_{DITHER}$ is eight and the 256 elements of the dither table 44 take different values from 0 to 255. As described above, dithering using the dither table 44 thus configured corresponds to gamma characteristics of a gamma value γ of one.

In the dither table 44 illustrated in FIG. 25, all the elements in the columns corresponding to addresses X for which the values of the lower four bits [3:0] are 4i and 4i+1 belong to a half of the 256 elements having smaller values, i being an integer from 0 to 3, and all the elements in the columns corresponding to addresses X for which the values of the lower four bits [3:0] are 4i+2 and 4i+3 belong to the other half of the 256 elements having larger values. For example, the values of the elements in the column corresponding to the address X for which the value of the lower four bits X[3:0] is 0 are 0, 71, 110, 5, 83, . . . , 105, respectively, which all belong to the half of the elements of the dither table 44 having smaller values. Similarly, the values of the elements in the column corresponding to the address X for which the value of the lower four bits X[3:0] is 1 are 32, 39, 113, 26, 51, . . . , 73, respectively, which all belong to the half of the elements of the dither table 44 having smaller values. Meanwhile, the values of the elements in the column corresponding to the address X for which the lower four bits X[3:0] is 2 are 159, 216, 241, 154, . . . , 246, respectively, which all belong to the half of the elements of the dither table 44 having larger values. Similarly, the values of the elements in the column corresponding to the address X for which the lower four bits X[3:0] is 3 are 191, 184, 238, 133, 172, . . . , 214, respectively, which all belong to the half of the elements of the dither table 44 having larger values.

When dithering is performed with the dither table 44 thus configured, an increased number of subpixels 14 of the pixels 11 in the pixel columns corresponding to addresses X for which the values of the lower four bits X[3:0] are 4i and 4i+1 are "turned off" and an increased number of subpixels 14 of the pixels 11 in the pixel columns corresponding to addresses X for which the values of the lower four bits X[3:0] are 4i+2 and 4i+3 are "turned on". Accordingly, the number of times of driving each source line 13 from the voltage corresponding to the lowest graylevel to the voltage corresponding to the highest graylevel and vice versa is reduced and this effectively reduces the power consumption. In addition, the number of the subpixels 14 driven with positive drive voltages of the "turned-on" subpixels 14 is almost same as that of the subpixels 14 driven with negative drive voltages, even when a column inversion driving method is used. Accordingly, the average voltage level on the source lines 13 over the liquid crystal display panel 3 is hard to become largely different from the common level $V_{COM}$ (the voltage level on the common electrode) of the liquid crystal display panel 3, even when the column inversion driving method is used.

In an alternative embodiment, all the elements in the columns of the dither table 44 corresponding to addresses X for which the values of the lower four bits [3:0] are 4i and 4i+1 belong to a half of the 256 elements having large values, and all the elements in the columns of the dither table 44 corresponding to addresses X for which the values of the lower four bits [3:0] are 4i+2 and 4i+3 belong to the other half of the 256 elements having smaller values.

FIG. 26 is a diagram illustrating contents of a dither table 44A when the eight-color halftoning circuit section 23*b* illustrated in FIG. 9 is used. The number of bits of the dither value $D_{DITHER}$ is eight and the 256 elements of the dither table 44A each take a value from 0 to 255. The frequency distribution of the values of the elements of the dither table 44A is determined so as to achieve dithering corresponding to a gamma correction with a gamma value γ of 2.2.

In the dither table 44A illustrated in FIG. 26, all the elements in the columns corresponding to addresses X for which the values of the lower four bits [3:0] are 4i and 4i+1 belong to a half of the 256 elements having smaller values, i being an integer from zero to three, and all the elements in the columns corresponding to addresses X for which the values of the lower four bits [3:0] are 4i+2 and 4i+3 belong to the other half of the 256 elements having larger values. It should be noted that the dither table 44A illustrated in FIG. 26 may be obtained by rearranging the elements of the dither table 44A illustrated in FIG. 10A.

Also when dithering is performed with the dither table 44A thus configured, the power consumption is effectively reduced and the average voltage level on the source lines 13 over the liquid crystal display panel 3 is hard to become largely different from the common level $V_{COM}$ (the voltage level on the common electrode) of the liquid crystal display panel 3, even when a column inversion driving method is used.

In an alternative embodiment, all the elements in the columns of the dither table 44A corresponding to addresses X for which the values of the lower four bits [3:0] are 4i and 4i+1 belong to a half of the 256 elements having large values, and all the elements in the columns of the dither table 44A corresponding to addresses X for which the values of the lower four bits [3:0] are 4i+2 and 4i+3 belong to the other half of the 256 elements having smaller values.

It should be noted that, also with respect to the eight-color halftoning circuit sections 23*c*, 23*d* and 23*e* illustrated in FIGS. 11, 12 and 13, respectively, if the values of the elements of the dither tables 44A-1 to 44A-M, 44R, 44G and 44B are determined similarly, the power consumption is effectively reduced and the average voltage level on the source lines 13 over the liquid crystal display panel 3 is hard to become largely different from the common level $V_{COM}$ (the voltage level on the common electrode) of the liquid crystal display panel 3, even when a column inversion driving method is used.

FIG. 27 is a diagram illustrating contents of a dither table 44C when the eight-color halftoning circuit section 23*f* illustrated in FIG. 14 is used. The number of bits of the dither value $D_{DITHER}$ is eight and the 256 elements of the dither table 44C each take a value from 0 to 255. The frequency distribution of the values of the elements of the dither table 44C is determined so as to achieve dithering corresponding to a contrast correction in accordance with the function f(p) illustrated in FIG. 15.

In the dither table 44C illustrated in FIG. 27, all the elements in the columns corresponding to addresses X for which the values of the lower four bits [3:0] are 4i and 4i+1 belong to a half of the 256 elements having smaller values, i being an integer from zero to three, and all the elements in the columns corresponding to addresses X for which the values of the lower four bits [3:0] are 4i+2 and 4i+3 belong to the other half of the 256 elements having larger values. It should be noted that the dither table 44C illustrated in FIG. 27 may be obtained by rearranging the elements of the dither table 44A illustrated in FIG. 16.

When dithering is performed with the dither table 44C thus configured, an increased number of subpixels 14 of the pixels 11 in the pixel columns corresponding to addresses X for which the values of the lower four bits X[3:0] are 4i and 4i+1 are "turned off" and an increased number of subpixels 14 of the pixels 11 in the pixel columns corresponding to addresses X for which the values of the lower four bits X[3:0] are 4i+2 and 4i+3 are "turned on". Accordingly, the number of times of driving each source line 13 from the voltage corresponding to the lowest graylevel to the voltage corresponding to the highest graylevel and vice versa is reduced and this effectively reduces the power consumption. In addition, the number of the subpixels 14 driven with positive drive voltages of the "turned-on" subpixels 14 is almost same as that of the subpixels 14 driven with negative drive voltages, even when a column inversion driving method is used. Accordingly, the average voltage level on the source lines 13 over the liquid crystal display panel 3 is hard to become largely different from the common level $V_{COM}$ (the voltage level on the common electrode) of the liquid crystal display panel 3, even when the column inversion driving method is used.

In an alternative embodiment, all the elements in the columns of the dither table 44C corresponding to addresses X for which the values of the lower four bits [3:0] are 4i and 4i+1 belong to a half of the 256 elements having large values, and all the elements in the columns of the dither table 44C corresponding to addresses X for which the values of the lower four bits [3:0] are 4i+2 and 4i+3 belong to the other half of the 256 elements having smaller values.

It should be noted that, also with respect to the eight-color halftoning circuit sections 23*g* and 23*h* illustrated in FIGS. 17 and 18, respectively, if the values of the elements of the dither tables 44C-1 to 44C-M are determined similarly, the power consumption is effectively reduced and the average voltage level on the source lines 13 over the liquid crystal display panel 3 is hard to become largely different from the common level $V_{COM}$ (the voltage level on the common electrode) of the liquid crystal display panel 3, even when a column inversion driving method is used.

It should be also noted that, as is the case of the third embodiment, performing a gamma correction is not necessarily required in the fourth embodiment in view of power consumption reduction. Even in the case when the brightness calculation sections 41R, 41G and 41B are removed from the configuration illustrated in FIG. 6, an improved image quality can be achieved to some extent by performing dithering by the dithering sections 43R, 43G and 43B. Also in this case, if a dither table is used which is configured so that two columns in which all the elements belong to a half of the elements of the dither table having smaller values and two columns in which all the elements belong to the other half of the elements of the dither table having larger values are alternately repeated, the power consumption can be effectively reduced while the average voltage level on the source lines 13 over the liquid crystal display panel 3 is hard to become largely different from the common level $V_{COM}$ (the voltage level on the common electrode) of the liquid crystal display panel 3, even when a column inversion driving method is used.

Although various embodiments are specifically described in the above, the present invention must not be construed as being limited to the above-described embodiments; it would be apparent to a person skilled in the art that the present invention may be implemented with various modifications. It should be also noted that two or more of the above-described embodiments may be combined in an actual implementation as long as no technical contradiction occurs.

What is claimed:

1. A display panel driver for driving a display panel which includes a plurality of source lines and a plurality of pixel columns each comprising a plurality of pixels arrayed in a first direction in which the source lines are extended, the pixels including subpixels respectively connected to associated one of the source lines, the driver comprising:

a dithering section configured to receive first m-bit image data and generate second image data by performing dithering on the first image data with n-bit dither values, wherein m is an integer of three or more and n is an integer from 2 to m; and a driver circuit configured to drive the plurality of source lines of the display panel in response to the second image data, wherein the dither values are each selected from elements of a dither table, each of the elements is an n-bit value, wherein, in generating the second image data corresponding to first pixels belonging to a first pixel column of the plurality of pixel columns, the dither values are selected from elements in a first column of the dither table in response to addresses of the first pixels, wherein, in generating the second image data corresponding to second pixels belonging to a second pixel column adjacent to the first pixel column in a second direction perpendicular to the first direction, the dither values are selected from elements in a second column of the dither table in response to addresses of the second pixels, wherein all the elements of the first column of the dither table belong to a half of the elements of the dither table having smaller values, and wherein all the elements of the second column of the dither table belong to the other half of the elements of the dither table having larger values.

2. The display panel driver according to claim 1, wherein, in generating the second image data corresponding to third pixels belonging to a third pixel column adjacent to the first pixel column in a third direction opposite to the second direction, the dither values are selected from elements in a third column of the dither table in response to addresses of the third pixels, wherein, in generating the second image data corresponding to fourth pixels belonging to a fourth pixel column adjacent to the second pixel column in the second direction, the dither values are selected from elements in a fourth column of the dither table in response to addresses of the fourth pixels, wherein all the elements of the third column of the dither table belong to the half of the elements of the dither table having smaller values, and wherein all the elements of the fourth column of the dither table belong to the other half of the elements of the dither table having larger values.

3. The display panel driver according to claim 1, wherein a frequency distribution of values of the elements of the dither table is uneven.

4. The display panel driver according to claim 1, wherein values of the elements of the dither table are determined so that there exist integers $p_1$ and $p_2$ from 0 to $2^n-1$ for which the number $N(p_1)$ of elements of the value of $p_1$ in the dither table is different from the number $N(p_2)$ of the elements of the value of $p_2$.

5. The display driver according to claim 3, wherein n is equal to m, and wherein the dither table is generated so that f(p) elements of $2^m$ elements of the dither table are equal to or larger than $2^m-p$ for $p<(2^m-1)/2$, and f(p) elements of $2^m$ elements of the dither table are equal to or larger than $2^m-p-1$ for $p>(2^m-1)/2$, where f(p) is a desired brightness of a subpixel of a graylevel of p indicated by the first image data, in an image displayed on the display panel.

6. The display panel driver according to claim 1, further comprising a brightness calculation circuit configured to generate the first image data by performing a gamma correction on input image data.

7. The display panel driver according to claim 1, wherein the second image data is generated as binary image data representing each of graylevels of the subpixels of the plurality of pixels as a first value or a second value, and wherein the driver circuit is configured to drive the display panel in response to the binary image data.

8. A display panel driver for driving a display panel including a plurality of pixels, the driver comprising:

a dithering section configured to receive first m-bit image data and configured to generate second image data by performing dithering on the first image data with n-bit dither values, wherein m is an integer of three or more and n is an integer from 2 to m; and a driver circuit configured to drive a plurality of source lines of the display panel in response to the second image data, wherein the dither values are each selected from elements of a dither table, each of the elements is an n-bit value, wherein in generating the second image data for the pixels of the display panel, the dither values are each selected from the elements of the dither table in response to addresses of the pixels, and wherein a frequency distribution of values of the elements of the dither table is uneven.

9. The display panel driver according to claim 8, wherein the values of the elements of the dither table are determined so that there exist integers $p_1$ and $p_2$ from 0 to $2^n-1$ for which a number $N(p_1)$ of the elements of a value of $p_1$ in the dither table is different from a number $N(p_2)$ of the elements of a value of $p_2$.

10. The display panel driver according to claim 8, wherein n is equal to m, and wherein the dither table is generated so that f(p) elements of $2^m$ elements of the dither table are equal to or larger than $2^m-p$ for $p<(2^m-1)/2$ and f(p) elements of $2^m$ elements of the dither table are equal to or larger than $2^m-p-1$ for $p>(2^m-1)/2$, where f(p) is a desired brightness of a subpixel of a graylevel of p indicated by the first image data, in an image displayed on the display panel.

11. A display panel driver for driving a display panel including a plurality of pixels each comprising a given number of subpixels, the display panel driver comprising:

a brightness calculation circuit configured to generate m-bit corrected image data by performing a gamma correction on input image data, m being an integer three or more;

a dithering section configured to receive the corrected image data and configured to generate binary image data representing each of graylevels of the subpixels of the plurality of pixels as a first value or a second value, by performing dithering on the corrected image data with n-bit dither values, n being an integer from 2 to m; and a driver circuit configured to drive the display panel in response to the binary image data, wherein the display panel includes a plurality of source lines, wherein a plurality of pixel columns are provided in the display panel, each of the pixel columns including a given number of pixels arrayed in a first direction in which the source lines extend, wherein the dither values are each selected from a dither table including elements each having an n-bit value, wherein, in generating the binary image data corresponding to first pixels belonging to a first pixel column of the plurality of pixel columns, the dither values are selected from elements in a first column of the dither table in response to addresses of the first pixels, wherein, in generating the binary image data corresponding to second pixels belonging to a second pixel column adjacent to the first pixel column in a second direction perpendicular to the first direction, the dither values are selected in a second column of the dither table in response to addresses of the second pixels, wherein all the elements of the first column of the dither table belong to a half of the elements of the dither table having smaller values, and wherein all the elements of the second column of the dither table belong to the other half of the elements of the dither table having larger values.

12. A display device, comprising:

a display panel including a plurality of source lines and a plurality of pixel columns each comprising a plurality of pixels arrayed in a first direction in which the source lines are extended, the pixels including subpixels respectively connected to an associated one of the source lines; and a display panel driver including:

a dithering section configured to receive first m-bit image data and configured to generate second image data by performing dithering on the first image data with n-bit dither values, wherein m is an integer of three or more and n is an integer from 2 to m; and a driver circuit configured to drive the plurality of source lines of the display panel in response to the second image data, wherein the dither values are each selected from elements of a dither table, each of the elements is an n-bit value, wherein, in generating the second image data corresponding to first pixels belonging to a first pixel column of the plurality of pixel columns, the dither values are selected from elements in a first column of the dither table in response to addresses of the first pixels, wherein, in generating the second image data corresponding to second pixels belonging to a second pixel column adjacent to the first pixel column in a second direction perpendicular to the first direction, the dither values are selected in a second column of the dither table in response to addresses of the second pixels, wherein all the elements of the first column of the dither table belong to a half of the elements of the dither table having smaller values, and wherein all the elements of the second column of the dither table belong to the other half of the elements of the dither table having larger values.

13. The display device according to claim 12, wherein, in generating the second image data corresponding to third pixels belonging to a third pixel column adjacent to the first pixel column in a third direction opposite to the second direction, the dither values are selected from elements in a third column of the dither table in response to addresses of the third pixels, wherein, in generating the second image data corresponding to fourth pixels belonging to a fourth pixel column adjacent to the second pixel column in the second direction, the dither values are selected from elements in a fourth column of the dither table in response to addresses of the fourth pixels, wherein all the elements of the third column of the dither table belong to the half of the elements of the dither table having smaller values, and wherein all the elements of the fourth column of the dither table belong to the other half of the elements of the dither table having larger values.

14. A display device, comprising:

a display panel including a plurality of pixels; and a display panel driver including:

a dithering section configured to receive first m-bit image data and configured to generate second image data by performing dithering on the first image data with n-bit dither values, wherein m is an integer of three or more and n is an integer from 2 to m; and a driver circuit configured to drive a plurality of source lines of the display panel in response to the second image data, wherein the dither values are each selected from elements of a dither table, each of the elements is an n-bit value, wherein, in generating the second image data for the pixels of the display panel, the dither values are each selected from the elements of the dither table in response to addresses of the pixels, and wherein a frequency distribution of values of the elements of the dither table is uneven.

15. A display device, comprising:

a display panel including a plurality of pixels each comprising a given number of subpixels; and a display panel driver including:

a brightness calculation circuit generating m-bit corrected image data by performing a gamma correction on input image data, m being an integer three or more;

a dithering section configured to receive the corrected image data and configured to generate binary image data representing each of graylevels of the subpixels of the plurality of pixels as a first value or a second value, by performing dithering on the corrected image data with n-bit dither values, n being an integer from 2 to m; and driver circuit configured to drive the display panel in response to the binary image data, wherein the display panel includes a plurality of source lines, wherein a plurality of pixel columns are provided in the display panel, each of the pixel columns including a given number of pixels arrayed in a first direction in which the source lines extend, wherein the dither values are each selected from a dither table including elements each having an n-bit value, wherein, in generating the binary image data corresponding to first pixels belonging to a first pixel column of the plurality of pixel columns, the dither values are selected from elements in a first column of the dither table in response to addresses of the first pixels, wherein, in generating the binary image data corresponding to second pixels belonging to a second pixel column adjacent to the first pixel column in a second direction perpendicular to the first direction, the dither values are selected in a second column of the dither table in response to addresses of the second pixels, wherein all the elements of the first column of the dither table belong to a half of the elements of the dither table having smaller values, and wherein all the elements of the second column of the dither table belong to the other half of the elements of the dither table having larger values.

* * * * *